(12) United States Patent
Hill

(10) Patent No.: US 7,215,697 B2
(45) Date of Patent: May 8, 2007

(54) MATCHED IMPEDANCE CONTROLLED AVALANCHE DRIVER

(76) Inventor: Alan E. Hill, 17 El Arco Dr. NE., Albuquerque, NM (US) 87123-9542

( * ) Notice: Subject to any disclaimer, the term of this patent is extended or adjusted under 35 U.S.C. 154(b) by 0 days.

(21) Appl. No.: 10/910,740

(22) Filed: Aug. 3, 2004

(65) Prior Publication Data

US 2005/0069011 A1    Mar. 31, 2005

Related U.S. Application Data

(63) Continuation-in-part of application No. 10/220,541, filed as application No. PCT/US01/06812 on Mar. 1, 2001, now Pat. No. 6,771,684, application No. 10/910,740, which is a continuation-in-part of application No. 10/086,030, filed on Feb. 27, 2002, now Pat. No. 6,826,222, which is a continuation-in-part of application No. PCT/US00/23642, filed on Aug. 28, 2000.

(60) Provisional application No. 60/278,329, filed on Mar. 22, 2001, provisional application No. 60/186,430, filed on Mar. 2, 2000, provisional application No. 60/151,260, filed on Aug. 27, 1999.

(51) Int. Cl.
*H01S 3/091* (2006.01)

(52) U.S. Cl. .......................................... 372/76; 372/87

(58) Field of Classification Search ........... 315/111.21, 315/111.51, 111.91; 372/76, 87, 81; 307/106, 307/108

See application file for complete search history.

(56) References Cited

U.S. PATENT DOCUMENTS

| | | | |
|---|---|---|---|
| 3,982,200 A | 9/1976 | Hoag et al. | |
| 4,024,430 A | 5/1977 | Schneider | 315/289 |
| 4,210,877 A | 7/1980 | Pleasance et al. | 372/74 |
| 4,267,526 A | 5/1981 | McDermott et al. | 372/89 |
| 4,283,686 A | 8/1981 | Daugherty et al. | 372/35 |
| 4,325,033 A | 4/1982 | Shutt | 372/94 |
| 4,442,383 A * | 4/1984 | Hill | 315/349 |
| 4,549,091 A | 10/1985 | Fahlen et al. | 307/106 |
| 4,561,431 A | 12/1985 | Atkinson | 601/161 |

(Continued)

FOREIGN PATENT DOCUMENTS

JP    030004537    *    1/1991

OTHER PUBLICATIONS

Fenstermacher, C. A., et al., "Electron-Beam-Controlled Electrical Discharge as a Method of Pumping Large Volumes of CO2 Laser Media at High Pressure", *Applied Physics Letters*, vol. 20, No. 2,(Jan. 15, 1972),56-60.

(Continued)

*Primary Examiner*—Tuyet Vo
*Assistant Examiner*—Ephrem Alemu
(74) *Attorney, Agent, or Firm*—Jeffrey D. Myers; Philip D. Askenazy; Peacock Myers, P.C.

(57) ABSTRACT

Controlled avalanche driver circuits and apparatuses for gas lasers. One embodiment typically delivers short, rapid, high voltage ionizing pulses in combination with an electric field whose magnitude is too low to sustain a normal glow discharge. The plasma is typically impedance matched with the pulse-forming network. Pre-ionization pulses may be generated. The circuits enable very high power, stable lasers.

28 Claims, 23 Drawing Sheets

U.S. PATENT DOCUMENTS

| | | | |
|---|---|---|---|
| 4,657,722 A | 4/1987 | Bennett | 376/105 |
| 4,698,518 A | 10/1987 | Pacala | 307/106 |
| 4,849,984 A | 7/1989 | Hill | 372/87 |
| 5,023,897 A | 6/1991 | Neff et al. | 315/111.21 |
| 5,040,185 A | 8/1991 | Hill | 372/85 |
| 5,141,391 A | 8/1992 | Acton et al. | 415/119 |
| 5,142,166 A * | 8/1992 | Birx | 307/419 |
| 5,207,671 A | 5/1993 | Franken et al. | 606/9 |
| 5,234,641 A | 8/1993 | Rutt | |
| 5,243,230 A | 9/1993 | Itou et al. | 307/125 |
| 5,343,483 A | 8/1994 | Farrell et al. | 372/10 |
| 5,367,878 A | 11/1994 | Muntz et al. | 60/152 |
| 5,374,613 A | 12/1994 | Noda et al. | 505/477 |
| 5,394,415 A | 2/1995 | Zucker et al. | 372/82 |
| 5,412,254 A * | 5/1995 | Robinson et al. | 307/106 |
| 5,504,795 A | 4/1996 | McGeoch | 378/119 |
| 5,550,434 A | 8/1996 | King et al. | 315/160 |
| 5,602,865 A | 2/1997 | Laakmann | |
| 5,640,014 A | 6/1997 | Sauke et al. | 250/339.03 |
| 5,684,814 A | 11/1997 | Hollins et al. | 372/38.05 |
| 5,892,328 A | 4/1999 | Shang et al. | 315/111.51 |
| 5,942,854 A | 8/1999 | Ryoji et al. | 315/111.21 |
| 6,026,099 A * | 2/2000 | Young | 372/81 |
| 6,051,841 A | 4/2000 | Partlo | 250/504 R |
| 6,414,438 B1 | 7/2002 | Borisov et al. | 315/111.31 |
| 6,416,633 B1 | 7/2002 | Spence | 204/15.6 |
| 6,452,199 B1 | 9/2002 | Partlo et al. | 250/504 R |
| 6,501,780 B2 | 12/2002 | Carroll et al. | 372/90 |
| 6,771,684 B2 | 8/2004 | Hill | 372/58 |
| 6,826,222 B2 | 11/2004 | Hill | 372/89 |

OTHER PUBLICATIONS

Bhawalkar, J. D., et al., "High Power Repetitive Stacked Blumlein Pulse Generators Producing Waveforms with Pulse Durations Exceeding 500 N Sec", *Digest of Technical Papers of the International Pulsed Power Conference*, vol. 9, IEEE, New York,(Jun. 21, 1993),857-860.

Coogan, J. J., et al., "Production of high-energy photons from flash x-ray sources powered by stacked Blumlein generators", *Review of Scientific Instrum.ents*, vol. 61, No. 5, American Institute of Physics, New York,(May 1990),1448-1456.

Hashimoto, K. , et al., "Chemical Oxygen Iodine Laser Using the RF Discharge dissociation of 12", *Lasers '97*, Dept of Electrical Engineering, Keio University, Yokohahama Japan,(1997),1-14.

Hill, Alan E., "Continuous uniform excitation of medium-pressure $CO_2$ laser plasmas by means of controlled avalanche ionization", *Applied Physics Letters*, vol. 22, No. 12, American Institute of Physics,(Jun. 15, 1973),670-673.

Hill, Alan E., "Coupled Beam-Gas Dynamic Ionization Interactions in Continuous Laser Plasmas", *XIX International Conference on Phenomena in Ionized Gases, Invited Papers*, Faculty of Physics, University of Belgrade, Belgrade, Yugoslavia,(Jul. 10, 1989),372-383.

Hill, Alan E., "Role of Thermal Effects and Fast Flow Power Scaling Techniques in $CO_2$—$N_2$—He Lasers", *Applied Physics Letters*, vol. 16, No. 11, American Institute of Physics,(Jun. 1, 1970),423-426.

Hill, Alan E., "The Next Generation of Controlled Avalanche Discharge Lasers—Including and Extenson to the Electric Oxygen Iodine Laser", *Proceedings of the International Conference on LASERS 2000*, (2001),249-258.

Hill, Alan E., "Uniform Electrical Excitation of Large Volume High Pressure Gases with Application to Laser Technology", *AIAA 9th Aerospace Sciences Meeting, AAIA Paper* No. 71-65, American Institute of Aeronautics and Astronautics, New York, New York,(Jan. 25, 1971),1-5.

Hill, Alan E., "Uniform Electrical Excitation of Large-Colume High-Pressure Near-Sonic $CO_2$—$N_2$—HE Flowstream", *Applied Physics Letters*, vol. 18, No. 5, American Institute of Physics,(Mar. 1, 1971),194-197.

McClenehan, C. R., et al., "Repetitive, Electron-Beam Diode Development", *Digest of Technical Papers of the International Pulsed Power Conference*, vol. 9, IEEE, New York,(Jun. 21, 1993), 184-187.

Napartovich, A. P., et al., "Discharge production of the singlet delta oxygen for an iodine laser", *Journal of Physics D: Applied Physics*, vol. 34,(2001),1827-1833.

Somerville, C. , et al., "An efficient stacked-Blumelein HV pulse generator", *Measurement Science and Technology*, vol. 1, No. 9, IOP Publishing, Ltd., Bristol, Great Britain,(Sep. 1, 1990),865-868.

Yamaguchi, S. , et al., "Mechanical arcless dc circuit breaker by current zero operation", *Review of Scientific Instruments*, vol. 63, No. 8, American Institute of Physics, New York,(Aug. 1, 1992),3993-3999.

* cited by examiner

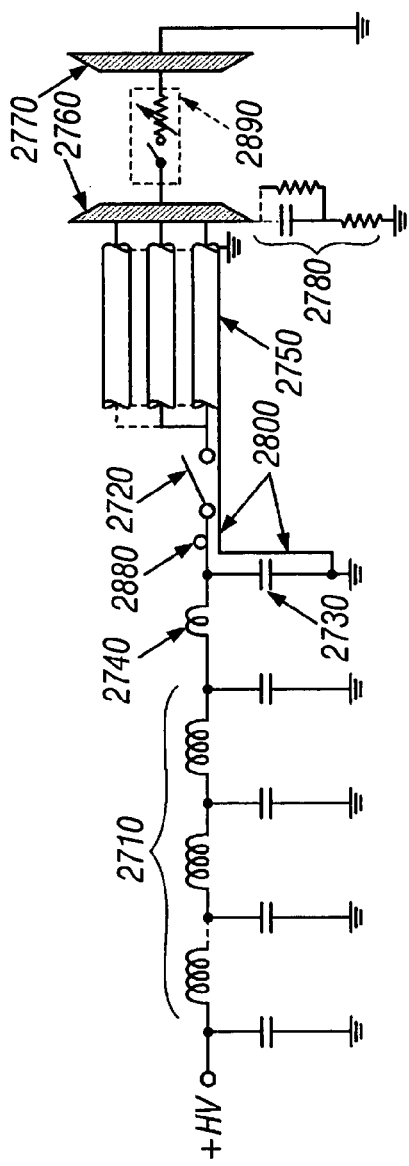
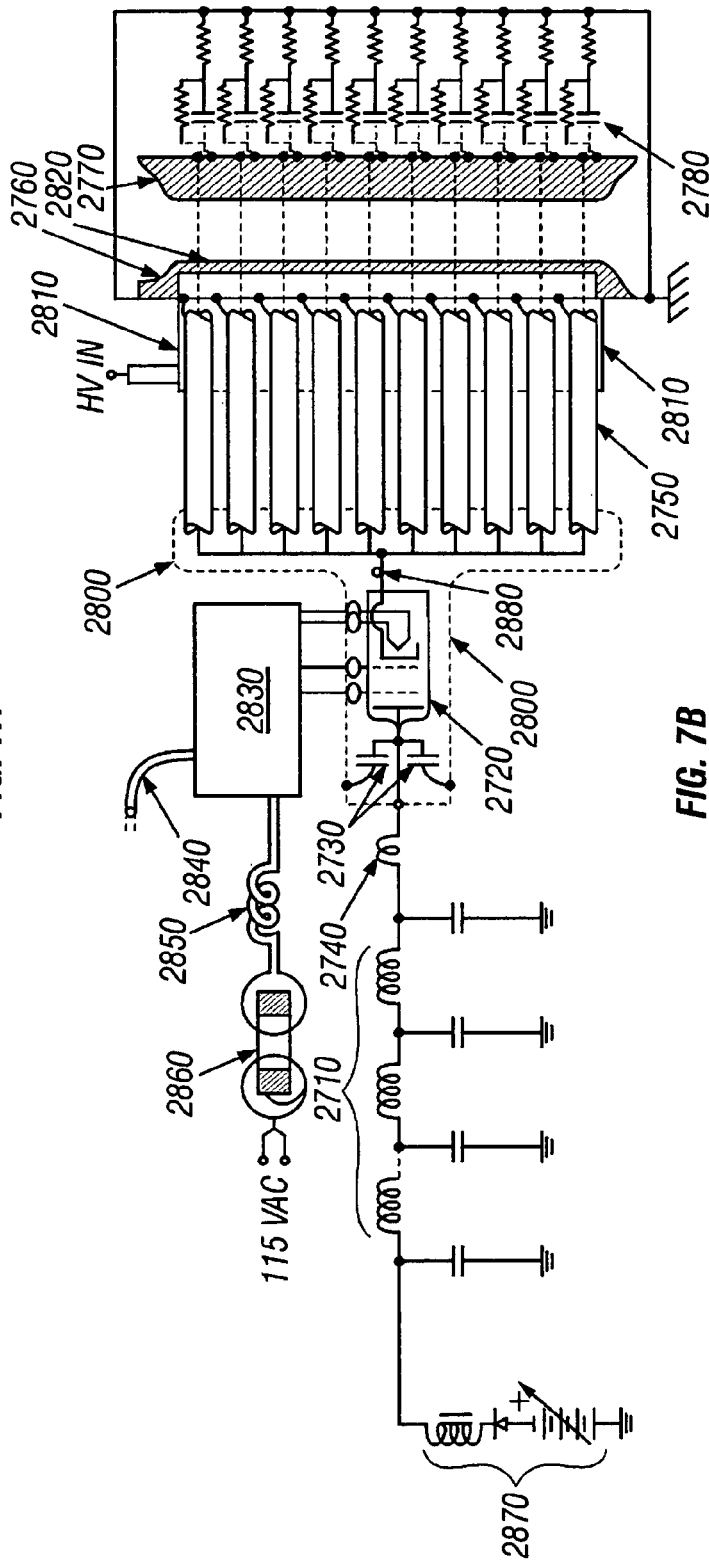
FIG. 7A
FIG. 7B

MATCHED IMPEDANCE CONTROLLED AVALANCHE DRIVER

CROSS-REFERENCE TO RELATED APPLICATIONS

This application is a continuation-in-part application of U.S. patent application Ser. No. 10/220,541, filed Aug. 30, 2002, entitled "Compact, Flexible, Rapid-Pulsed, Molecular Gas Laser", issued Aug. 3, 2004, as U.S. Pat. No. 6,771,684, which was a national entry application of Patent Cooperation Treaty Application PCT/US01/06812, filed Mar. 1, 2001, which claimed the benefit of the filing of U.S. Provisional Patent Application Ser. No. 60/186,430, filed on Mar. 2, 2000, and the specifications thereof are incorporated herein by reference.

This application is also a continuation-in-part application of U.S. patent application Ser. No. 10/086,030, filed Feb. 27, 2002, entitled "Electric Oxygen Iodine Laser", which was a continuation-in-part application of Patent Cooperation Treaty Application PCT/US00/23642, filed Aug. 28, 2000, which claimed the benefit of the filing of U.S. Provisional Patent Application Ser. No. 60/151,260, filed on Aug. 27, 1999. U.S. patent application Ser. No. 10/086,030 also claimed the benefit of the filing of Provisional Patent Application Ser. No. 60/278,329, filed on Mar. 22, 2001. The specifications of the applications cited in this paragraph are also incorporated herein by reference.

BACKGROUND OF THE INVENTION

1. Field of the Invention (Technical Field)

The present invention relates to molecular gas lasers and pulse circuits and excited atomic state and plasma generators related thereto.

2. Background Art

Note that the following discussion refers to a number of publications by author(s) and year of publication, and that due to recent publication dates certain publications should not be considered as prior art vis-a-vis the present invention. Discussion of such publications herein is given for more complete background and is not to be construed as an admission that such publications are prior art for patentability determination purposes.

SUMMARY OF THE INVENTION (DISCLOSURE OF THE INVENTION)

The present invention is of a gas laser comprising at least one reciprocating assembly, each reciprocating assembly comprising a driver housing, at least one flow reciprocator, and a driver diaphragm.

The present invention is additionally of a method of producing a laser beam using a gas laser, the method comprising the steps of providing to the gas laser a reciprocating assembly comprising a driver housing and employing within the reciprocating assembly a driver diaphragm and at least one flow reciprocator.

The present invention is also of a circuit for exciting a gas comprising a matched impedance controlled avalanche driver.

The present invention employs a pulse circuit for generating an output pulse, comprising for example a power supply; at least one Blumlein line wherein each line comprises a front end and an output end; a switch for grounding each front end of the at least one Blumlein line simultaneously; and a snubber for truncating the output pulse from the at least one Blumlein line. As described herein, this pulser circuit is useful for a variety of applications. In an embodiment of this pulser circuit, the circuit further comprises at least two Blumlein lines comprising electrically connected and simultaneously groundable front ends and serially connected output ends. In another embodiment of this pulser circuit, the circuit comprises discharge electrodes for discharging the output pulse to a gas wherein each of the discharge electrodes optionally bound a tube configuration comprising a surface for heat exchange.

The present invention also comprises an inventive generator for generating an excited atomic state of a molecule. According to one embodiment, this particular generator comprises a power supply; a pulse circuit; and an excited atomic state generating region wherein the pulse circuit discharges a pulse to a gas in the region and thereby generates an excited atomic state of at least one molecule in the gas and wherein the gas optionally comprises at least one inert gas. In a particular embodiment, the excited atomic state generating region optionally comprises electrodes, a loop, or a cavity wherein the cavity optionally comprises a resonant cavity or a capacitively coupled cavity (particularly useful for RF and microwave energy deposition). In another embodiment, the excited atomic state generating region optionally comprises a loop and at least two electrodes. In yet another embodiment, the excited atomic state generator optionally comprises an excited atomic state generating region comprising a loop and at least one transformer core comprising at least one winding wherein the excited atomic state generating region loop forms a second winding of the at least one transformer core. In many of the embodiments of the present invention, particularly the generator and laser embodiments, removal of heat from the system is useful. For example, one embodiment of the generator comprises an excited atomic state generating region that further comprises a component of a heat exchanger.

The present invention also comprises a laser. In one embodiment, the laser comprises a power supply; a pulse circuit; an excited atomic state generating region wherein the pulse circuit discharges a pulse to a gas in the region and thereby generates an excited atomic state of at least one molecule in the gas and wherein the gas optionally comprises at least one inert gas; and a resonant cavity for generating a laser beam. In a particular embodiment, the laser optionally comprises a heat exchanger for controlling the temperature of said excited atomic state generating region; and optionally comprising supersonic expansion nozzles for introducing the gas into the excited atomic state generating region.

The present invention also comprises several inventive methods. For example, the present invention comprises a method of generating a plasma. In one embodiment this method comprises the steps of: a) providing a gas; b) applying a pulse to the gas to over-volt the gas to an E/N value above ionization breakdown thereby forming a plasma; c) applying additional pulses, above ionization breakdown of the gas, to sustain quasi-continuous ionization of the plasma; and d) causing a current flow to the plasma by applying an electric field comprising an E/N value less than the glow potential of the plasma. In a particular embodiment of this method the gas comprises $O_2$ and the method generates an excited atomic state of $O_2$ and optionally wherein the excited atomic state comprises $O_2{}^1\Delta$.

The present invention also comprises a method for producing a laser beam. In one embodiment, this laser method comprises the steps of: a) providing a gas; b) applying a pulse to the gas to over-volt the gas to an electric field normalized to plasma density value above ionization breakdown thereby forming a plasma; c) applying additional pulses, above ionization breakdown of the gas, to sustain quasi-continuous ionization of the plasma; d) causing a current flow to the plasma by applying an electric field comprising an electric field normalized to plasma density value less than the glow potential of the plasma; e) contacting the plasma with a molecule of the gas to generate an excited atomic state of that molecule; f) contacting the excited molecule with iodine to excite the iodine; and g) lasing the excited iodine.

The present invention also includes a laser comprising a gas, a beam produced by the gas and a throat wherein the gas and beam pass through the throat. In one embodiment, the throat comprises a converging region and a diverging region to achieve supersonic flow of gas passing therethrough. This particular embodiment is optionally useful when a lasing molecule is capable of repetitive cycling over the length of a cavity. While iodine is suitable as a lasing molecule, this embodiment is not limited specifically to iodine.

A primary object of the present invention is to enable an electric oxygen iodine laser.

A primary advantage of the present invention is an efficient laser.

Another primary object of the present invention is to provide a compact, flexible, rapid-pulsed, molecular gas laser.

Another primary object of the present invention is to provide a controlled avalanche driver circuit.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 7A is a schematic of a hybrid pulse former circuit according to an embodiment of the present invention;

FIG. 7B is a schematic of a hybrid pulse former circuit according to another embodiment of the present invention;

FIG. 13b is a diagrammatic view of a housing of an embodiment for housing a tube bank, such as that shown in FIG. 13a;

FIG. 15c is a diagrammatic top view of the laser shown in FIG. 15a;

DESCRIPTION OF THE PREFERRED EMBODIMENTS

BEST MODES FOR CARRYING OUT THE INVENTION

Figure 1:
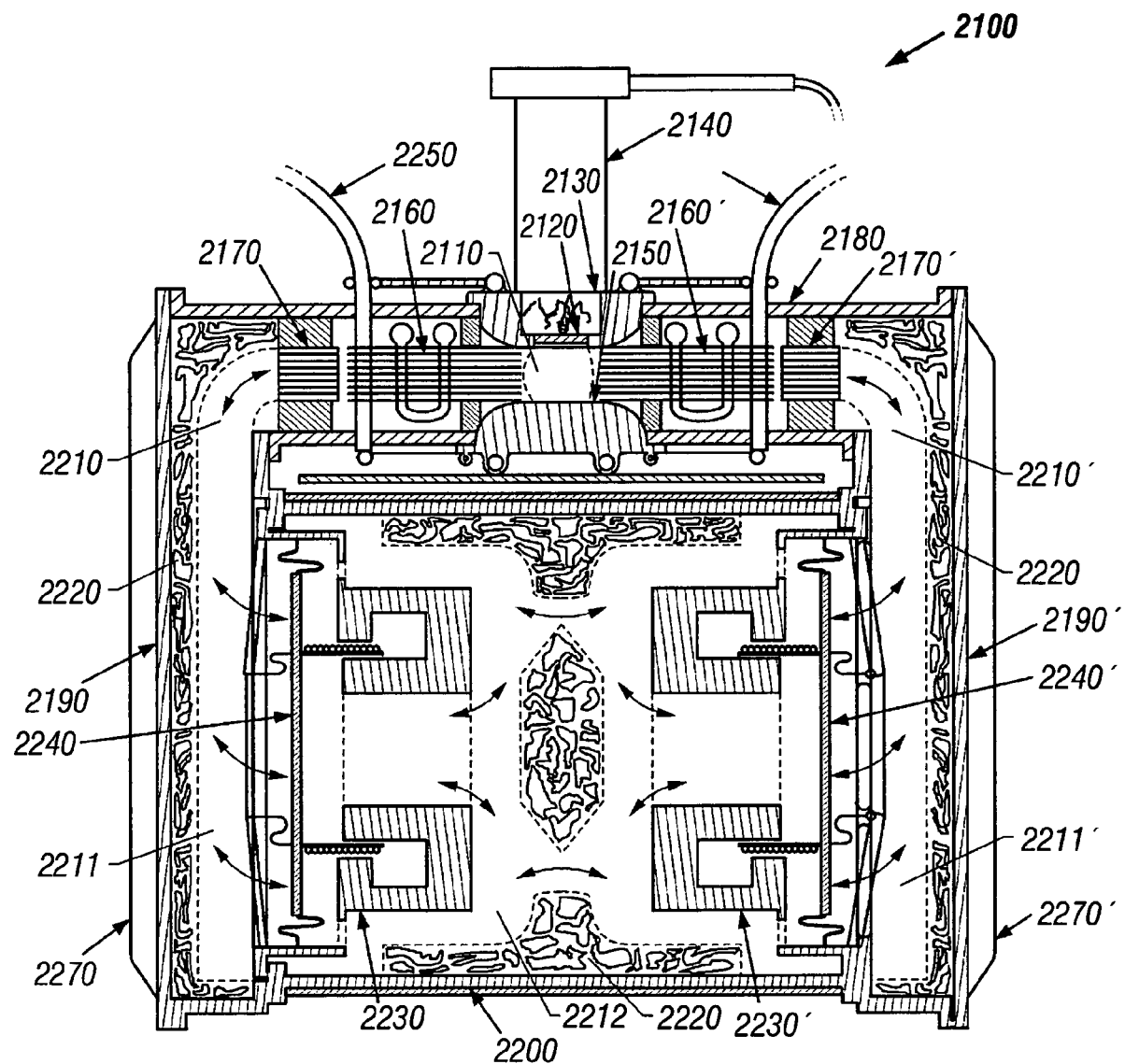
FIG. 1 is a schematic side view of a laser embodiment of the present invention.

The present invention provides for lasers with very high peak power pulses of variable duration, from approximately 0.1 µs to greater than approximately 10 µs, that are continuously pulsable at repetition rates continuously adjustable from approximately 1 pulse per second to greater than 200 pulses per second, thus capable of achieving high average power from approximately 100 watts to greater than 100 kW, and capable of achieving any combination of these parameters from a device packagable into a volume smaller than heretofore possible for a given set of requirements.

The present invention also reduces the cost of the laser over any other laser capable of achieving substantially the same performance using any other approach currently known.

The present invention additionally provides an overall system electrical efficiency higher than any other heretofore achieved when operating at high average power levels; i.e., at 1 kW average or above, while meeting a variety of performance conditions, for example, but not limited to, those given herein.

In one embodiment of the invention, lasers comprising means to extract radiation from the $CO_2$ molecule are used; however, alternative embodiments optionally apply generally to $NO_2$, CO or any gas laser system where large-volume, uniform, plasma excitation is used and where the gas temperature must be held below values easily achievable commensurate with applying large quantities of specific energy to the gas (A. E. Hill, Multi-joule pulses from $CO_2$ lasers: *Applied Physics Letters*, v. 12, no. 9, May 1, 1968).

According to various embodiments, suitably low temperatures are maintained by forcing gas through plasma excitation regions at high flow velocities (A. E. Hill, Role of thermal effects and fast-flow power scaling techniques in $CO_2$—$H_2$—He lasers: *Applied Physics Letters*, v. 16, no. 11, Jun. 1, 1970 ; A. E. Hill, Uniform electrical excitation of large-volume, high-pressure, near-sonic $CO_2$—$H_2$—He flowstreams: *Applied Physics Letters*, v. 18, no. 5, Mar. 1, 1970; and A. E. Hill, Uniform electrical excitation of large-volume, high-pressure gases with application to laser technology: AIAA 9th Aerospace Sciences Meeting #71–65, New York, Jan. 25–27, 1971). For the case of continuous lasers, gas circulation is optionally achieved by moving the gas through only a small pressure drop, which is relatively easy to accomplish. According to one embodiment, heat due to wasted energy consumed by the electrical discharge that excites the laser is removed by heat exchangers prior to reintroducing the gas within a closed-cycle flow loop back into the laser excitation region. In a variety of embodiments, e.g., for the case of continuous power extraction, only modest gas pressures (on the order of several tens of torr) are needed to produce even high powers (10's of kW), since the lasing molecule is "lased" multiple times in a single pass through the excitation region (which typically comprises an optical cavity). Furthermore, due to low pressure, it is relatively easier to cause the discharge (plasma) to occupy a sufficiently large volume needed to extract a high power laser mode (or modes).

To extract high average power from a rapidly pulsed laser, the task becomes much harder, owing to two primary differences:

(1) The gas pressure must be much higher in order to store a large quantity of available power extractable with only one (or relatively few) recycles of the lasing molecule during a single pulse; i.e., during a single cavity volume exchange period; and (2) A very large amount of energy must be applied to the plasma within a transient time period—an operation that is thermodynamically adiabatic.

The result of (1) is that the plasma does not fill the necessary mode volume uniformly—if at all—without resorting to extreme methods of plasma excitation. According to various embodiments, the present invention specifically provides a method by means of a superior approach.

The result of (2) is that the waste energy (that which is imparted to the plasma but not extracted as laser light) manifests itself as an acoustic shock wave in addition to creating heat. Both heat and acoustic energy must be substantially removed (ideally completely removed) between pulses, a task that typically becomes more severe as the pulse repetition rate is increased.

Heretofore acoustic energy was removed either by means of an extensive array of passive acoustic absorbent baffles and/or by localizing the shock wave to a small volume region by restricting the flow with orifice plates or gas dynamic nozzles. The end result was that either the laser system had to occupy a very large volume, and/or that the pump needed to recycle the gas (called the "prime mover") had to be very powerful in order to move the gas through a large pressure drop created by orifices. This resulted in a device that was expensive, energy-inefficient, and large. It also added many kW of heat to the gas, which had to be removed in addition to the plasma's waste heat. Generally this prior art approach doubled the total power requirement of the laser system, as well as its cost.

According to various embodiments, laser apparatuses of the present invention provide a novel means of moving the gas and absorbing the acoustic shock energy which neither necessitates a large gas volume nor creates a substantial pressure drop. Further, according to various embodiments, apparatuses of the present invention provide for removal of heat created by the plasma that is compatible with the other apparatus components, enabling the total effect as described. Taken together, these advancements revolutionize the capability, flexibility, cost effectiveness, and size reduction of a multi-megawatt peak-high, rep-rate, multi-kW, average, molecular, gas laser.

Method of Gas Cavity Exchange, Cooling, and Acoustic Abatement

Figure 2:
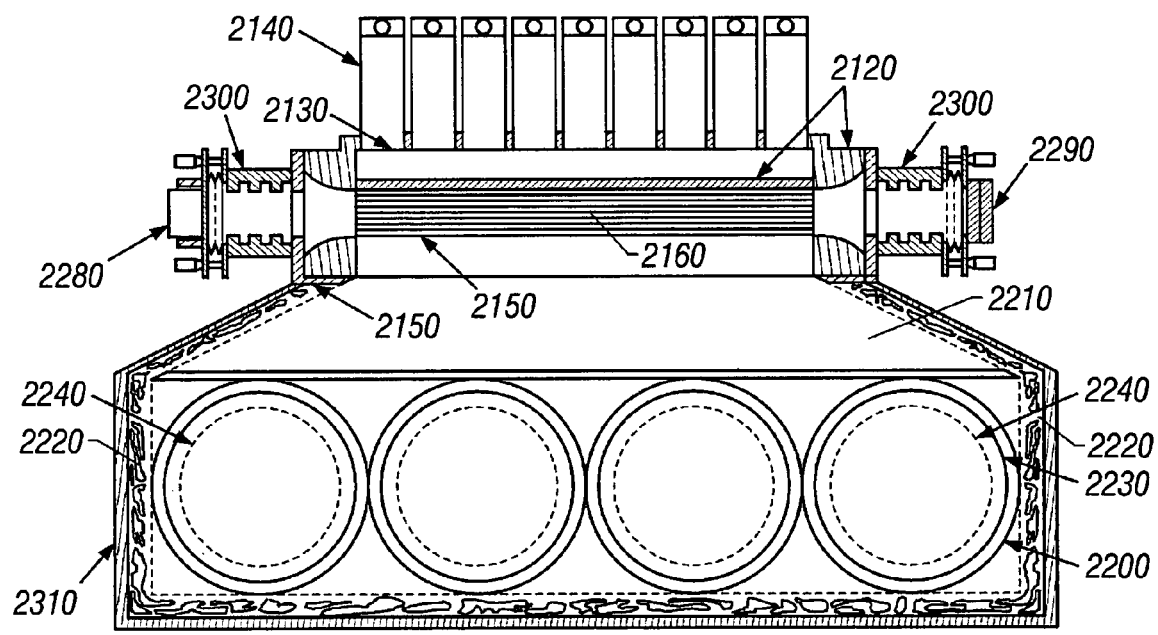
FIG. 2 is a schematic side view of the laser embodiment shown in FIG. 1.
Figure 3:
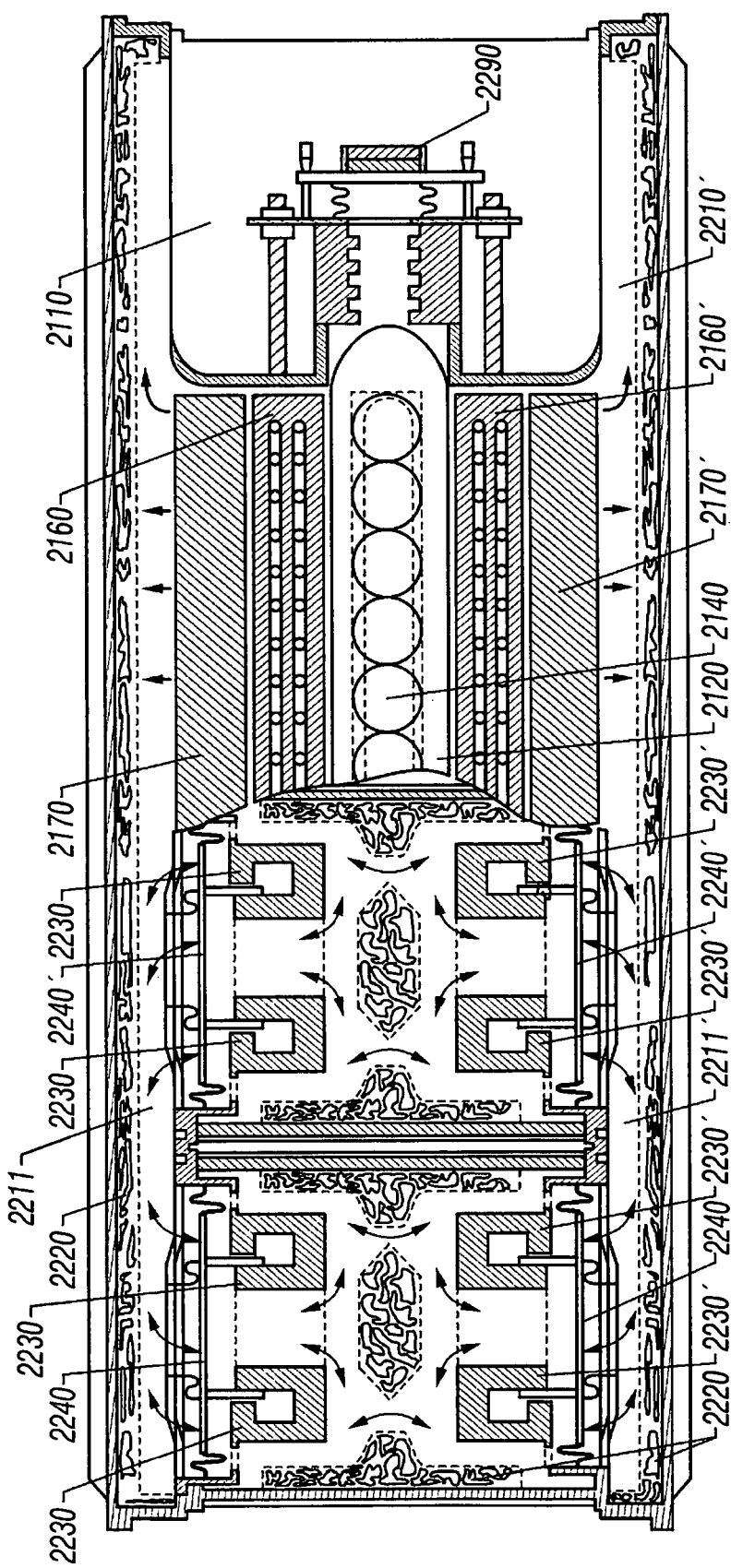
FIG. 3 is a schematic top view of the laser embodiment shown in FIGS. 1 and 2.

According to an embodiment of the present invention, the usual method of continuously pumping the laser gas flowstream in closed cycle through the cavity followed by heat exchangers is replaced by a process comprising at least two reciprocating steps. This process is briefly described here and in more detail below. Referring to FIG. 1, a laser embodiment of the present invention 2100 is shown. Note that the lasing mode volume 2110 is bounded by special field-shaping electrodes (top 2120 and bottom 2150) which form the electrical discharge, and is bounded to the left and right by a dielectric (essentially non-conducting) heat exchanger 2160, 2160' which protrudes nearly into contact with the plasma volume on either side. Progressing outward, porous-structured catalytic converters 2170, 2170' follow directly behind each dielectric heat exchanger 2160, 2160'. The loop is continued on either side by flow ducts at approximately right angles to the discharge channel, and are bridged by cylinders completing two opposing closed paths, referred to as "flow corridors" 2210, 2210'. These paths, however, are blocked by the at least two "loudspeaker" (like) drivers 2230, 2230' (linear motors connected to pistons) positioned back-to-back symmetrically about the center of the apparatus. Additionally, a labyrinth surrounded by acoustic "absorber structures," 2220 for example, but not limited to, structures comprising a Teflon "chips" filling, is positioned into the side flow ducts and woven into the space between the back-to-back drivers. FIGS. 1, 2, and 3 show three different views of this particular embodiment as described below.

Referring to FIG. 1, a schematic end view of a laser apparatus of an embodiment of the present invention is shown 2100. A plasma volume and active laser gain region 2110 is positioned centrally between two substantially symmetrical flow corridors 2210, 2210'. The laser gain region is further positioned between two electrodes, e.g., a field-contoured cathode 2120 and a field-contoured anode 2150. The electrodes, as shown, are connected to a plurality of parallel "hybrid" pulse drive coax cables 2250, 2250' and positioned on a rectangular dielectric flow channel 2180. Note that the field-contoured anode 2120 further comprises an X-ray window. The X-ray window allows for the introduction of X-rays produced by a broad area electron gun (or gun modules) 2140 aimed at an X-ray target and scatterer 2130. High voltage pulse drive coax cables are suitable for supplying power to the power electron gun (or gun modules) 2140.

The two substantially symmetrical flow corridors 2210, 2210' form an upside-down U-shaped flow path in the laser apparatus. In this particular embodiment, two dielectric heat exchangers (e.g., boron nitride dielectric) 2160, 2160' are positioned in the flow path, one on either side of the laser gain region 2110 (of course, one heat exchanger having two heat exchange regions is within the scope of the present invention). Further bounding the laser gain region 2110, are porous structured, catalytic converters 2170, 2170' through which the gas flows. Past the catalytic converters 2170, 2170', the flow corridors 2210, 2210' turn downward forming substantially symmetrical downward legs 2211, 2211'. The downward legs 2211, 2211' are positioned on opposing sides of an acoustic chamber 2212 and comprise rectangular metal flow ducts 2190, 2190' (see also, e.g., FIG. 3), which are reinforced with mechanical support ribs 2270, 2270'. The acoustic chamber 2212 comprises at least one cylindrical metal speaker driver housing 2200 for mounting at least two loudspeaker flow reciprocators 2230, 2230' (e.g., linear motors connected to pistons) thereto. The speaker driver housing 2200 further comprises, for example, an externally wrapped acoustic damping blanket. As shown in FIG. 1, the flow reciprocators 2230, 2230' comprise planar honeycomb loudspeaker driver diaphragms 2240, 2240' and the acoustic chamber 2212 further comprises acoustical absorber structures 2220 that comprise, for example, but not limited to, TEFLON chips. Note that additional acoustical absorber structures 2220 are also positioned throughout the apparatus, primarily along exterior walls of a low pressure enclosure 2310.

A schematic side view of the embodiment of FIG. 1 is shown in FIG. 2. This schematic side view shows a variety of components not described in FIG. 1. For example, a cavity mirror 2280, a cavity output coupler 2290, and a dielectric spacer and mode aperture 2300 are shown. This side view further shows nine electron gun modules 2140 and four speaker assemblies, each comprising a driver housing 2210, flow reciprocators 2230, and a driver diaphragm 2240. While nine electron guns and four speaker assemblies are shown, other combinations and equivalents thereof are within the scope of the present invention.

A schematic top view of the embodiment of FIG. 1 and FIG. 2 is shown in FIG. 3. This schematic top view, in combination with the views of FIGS. 1 and 2, allows one of ordinary skill in the art to appreciate the aspect ratios of various structures, according to this particular embodiment. Of course, other configurations, aspect ratios, etc., are within the scope of the present invention.

Descriptions of two embodiments of the present invention, referred to herein as Case I and Case II, respectively, follow. According to these embodiments, each case comprises approximately at least three successive steps.

Case I: Gas Expansion Followed by "Loudspeaker" Assist.

According to the embodiment of Case I, initially, the speaker drivers are positioned to their limit towards one side—e.g., the left side—and are momentarily stationary. Next, the laser discharge is fired. The resultant laser beam is formed, extracted, and the post-plasma gas volume doubles in temperature from its initial state (near room temperature for the case of $CO_2$). A shock wave emerges from this transiently heated volume, but the laser pulse is extracted before the acoustic disturbance develops. This disturbance, however, in some instances, can ruin the next laser pulse phase integrity if it is not sufficiently dispersed before the next pulse occurs.

Next, the shock is harnessed to provide the first of two cooling operations. Specifically, the expansion (soon to "shock" down to subsonic flow) drives much of the hot gas outward uniformly to the left and to the right into the adjacent heat exchangers. This process happens very quickly compared to the interpulse time, allowing the cooling process to begin.

The expansion waves propagate down through the ducts and impinge substantially simultaneously from opposite directions onto the speaker drivers where they are mostly absorbed, thus generating approximately equal and approximately opposite electrical pulses across each drivers' "voice" coil. A resistor (matched approximately to the net impedance of the drivers) soaks up this electrical pulse, thus dissipating most of the lower frequency content of the acoustic wave. Higher frequency components (containing far less energy) may still persist, and these are absorbed by the anechoic wedges and sidewalls. Multiple reflections absorb diminishingly small remnants of the shock expansion. Dimensions are small such that adequate acoustic loss (approximately 50 dB attenuation needed per pulse) affords operation up to approximately 200 pulse per second repetition rate for a laser that is sized to produce, for example, but not limited to, approximately 5 kW average.

The initial shock cooling is helpful, but in most circumstances not fully adequate to achieve maximum performance. Thus, the loudspeaker drivers optionally serve a second function: that of further cooling the gas. To accomplish this second function, an electrical drive signal is applied to all "voice coils" in unison and in phase to push the gas in one direction (no longer bilaterally symmetric) from the cavity and through one of the heat exchangers and catalytic converters, where it is to be cooled awaiting the next pulse. The gas reentering the cavity from the other side has been pre-cooled since the time of the previous pulse occurred. The audio-drive signals are synchronized in order to have moved all drivers to the extreme opposite lateral extent in time to receive the next pulse, wherein the direction of speaker-driven flow reverses. Audio-drive signals and laser-pulse synchronization are, for example, automatically electronically controlled and may be varied continuously at will.

The functions of both gas pumping and acoustic abatement of multiple reflections can occur simultaneously with the speaker operating both as generator and motor. This is possible because the left-hand and right-hand drivers are electrically driven in phase to produce a net motion in a given direction, but act 180° out of phase as generators when impacted by an acoustic wave. Hence, the dissipation resistor, which is connected to absorb acoustically generated pulses as additive, will not contribute to loading of the audio-drive signal which is phased to cancel across said resistor (see FIG. 4).

Figure 4:
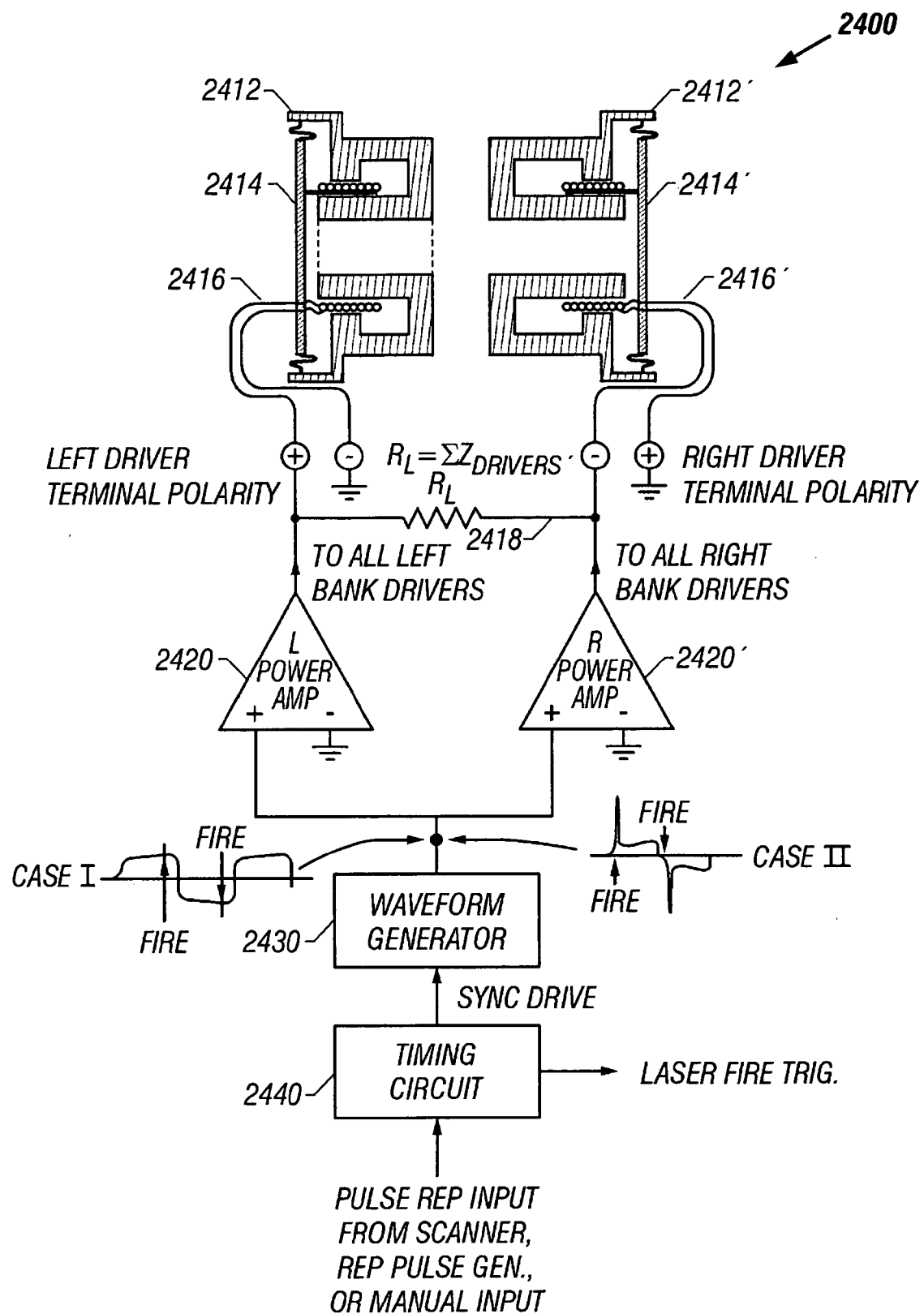
FIG. 4 is a schematic of loudspeaker driver and driver circuit according to an embodiment of the present invention.

In FIG. 4, a schematic for a combination gas reciprocator and acoustical damper driver circuit 2400 is shown, suitable for use with the embodiment shown in FIGS. 1 through 3. A cross-sectional view of a cylindrical acoustical speaker assembly 2410 is shown near the top of FIG. 4. The assembly 2410 comprises opposing driver pairs 2412, 2412', which comprise diaphragms 2414, 2414' and a pair of opposing driver circuits 2416, 2416'. Note that the circuits have opposite polarity, the circuit on the left 2416 has "–" to ground while the circuit on the right 2416' has "+" to ground.

Referring to FIG. 4, the circuits are connected by a resistor 2418, which has a resistance that is approximately equal to the sum of the impedance of the drivers. While only two opposing drivers are shown in FIG. 4, this or other circuits are suitable for driving more than two drivers, e.g., to drive the driver array of FIGS. 1 through 3. Each circuit 2416, 2416' is driven by a power amplifier 2420, 2420'. The power amplifiers are driven by a waveform generator 2430, which accepts, for example, input from a timing circuit 2440. The waveform generator 2430 produces, for example, a variety of waveforms, two of which are shown in plots in FIG. 4 as Case I and Case II. Case I, as described herein, comprises a process wherein gas expansion is followed by loudspeaker assist and Case II, as described herein, comprises a process wherein gas expansion is coincident with loudspeaker assist. The timing circuit 2440 comprises an output for firing the laser and an input, such as, but not limited to, providing pulse repetition information from, e.g., a scanner, a repetition pulse generator and/or a manual event.

Case II: Gas Expansion Coincident with "Loudspeaker" Assist.

Figure 5:
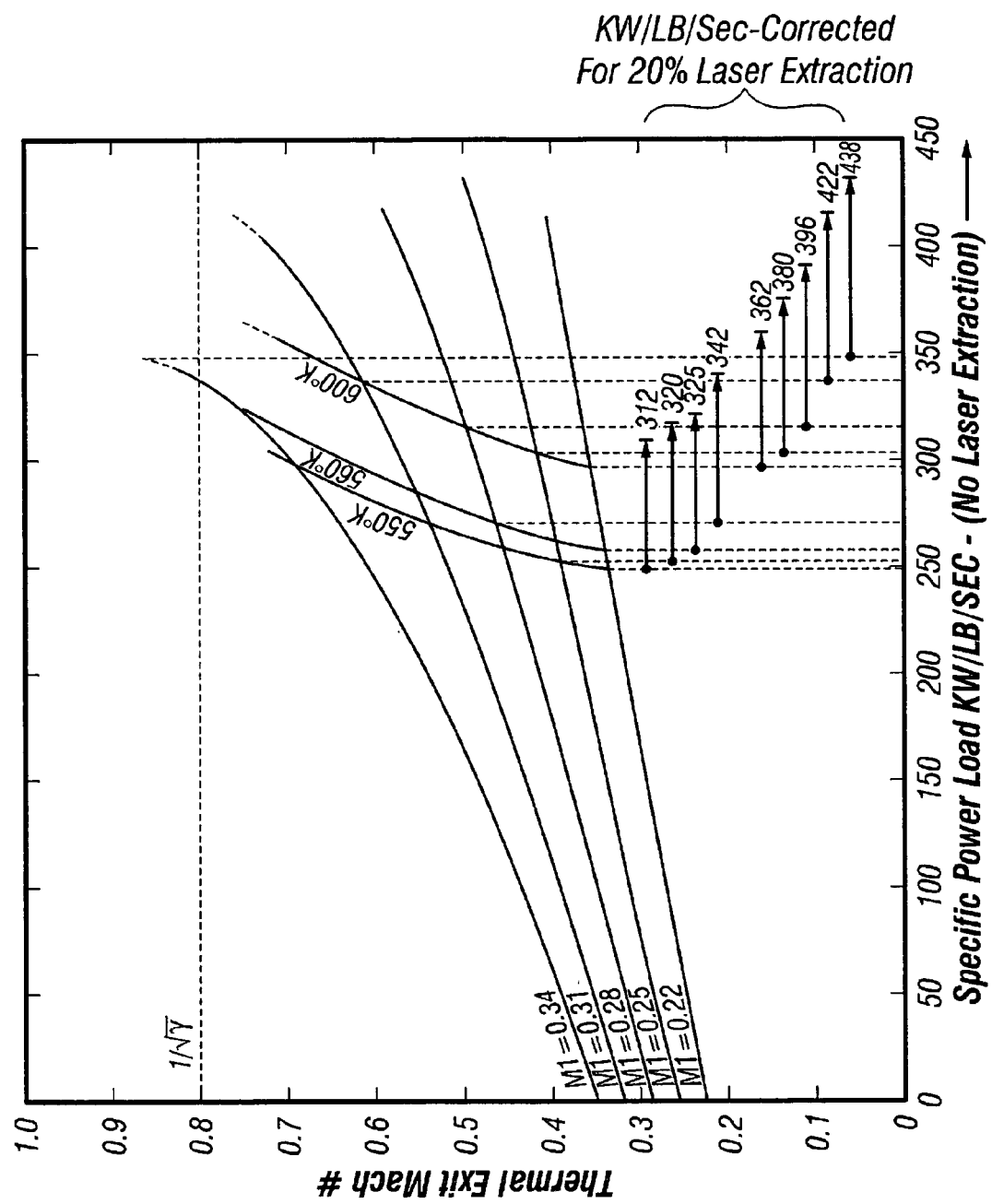
FIG. 5 is a plot of Rayleigh heating curves.

In another embodiment, laser operation comprises a speaker-driven, gas-flow stream that is coincident with the plasma-shock expansion such that the shock tends to drive the flow mostly in the same direction as its pre-existing motion, as a single event. The method of this embodiment invokes a gas dynamic principle know as Raleigh heating, wherein gas already in motion at a relatively high velocity (within the compressible flow range) will further accelerate the flow in that same direction. If the initial velocity exceeds approximately Mach 0.4 to approximately Mach 0.5, the expansion of the plasma can be harnessed to contribute an ever-increasing fraction of its energy toward further accelerating the gas as its initial velocity is increased. Under such circumstances, the heat exchanger may offer more flow resistance as the initial flow velocity is increased. However, in this scheme, a substantially intense, substantially sharp-leading edge is applied to the speaker-drive waveform is used to circumvent this issue. In so doing, more energy is required to reach the necessary extended velocity due to increased pressure drop, but this transient segment of the wave form is, for example, short—only a small fraction of one pump-cycle time. When the driver reaches peak velocity, the laser is then pulsed and the drive flow and expansion velocities are (mostly) additive, but in a non-linear fashion (FIG. 5). With each succeeding pulse, the flow stream reverses, as before. In FIG. 5, Rayleigh heating curves are shown plotted as thermal exit Mach number versus specific power load in kW per lb per second.

Detailed theoretical calculations and experimental data are used to confirm whether the embodiment of Case I or of Case II (or yet another alternative embodiment) works best for any given application. From a theoretical point of view, the first scheme is more straightforward.

For both Case I and Case II, the volume of gas trapped between each speaker pair transmits force, thus effectively coupling the drivers so that they share in doing the work of reciprocating the lasing gas media through the cavity.

Also for both Cases I and II, the driver signals are synchronized to the laser pulse rate according to the requirements for either case by means of the electronic circuit outlined in FIG. 4. The circuit affords real-time variation of the pulse repetition rate—either under manual or automatic control. For example, in the case of selective layer removal (i.e., paint), the repetition rate can be automatically tied to the scan velocity of the laser beam at the point of surface interaction, which in turn may be either manually or machine controlled. The benefit is that thermal damage to the substrate can be automatically eliminated. Moreover, the damage to the substrate may be eliminated by blocking out laser pulses wherever the substrate surface has been reached. The surface status is being monitored in real time by instruments that measure either color or spectral content of the laser plumb.

Plasma Formation and Control

This invention incorporates a special means of forming, pumping, and controlling a plasma which provides the laser gain media. It is based in part on a controlled avalanche process (see, e.g., A. E. Hill, Continuous uniform excitation of medium-pressure $CO_2$ laser plasmas by means of controlled avalanche ionization: *Applied Physics Letters*, v. 22, no. 12, Jun. 15, 1973) but specifically comprises, in one embodiment, for example, an inventive four-step process shown to yield a factor of two higher specific power loading and much greater range of applicability over any other known schemes using the Controlled Avalanche Process. Consider for example, a $CO_2$ laser embodiment that produces approximately 50 joule pulses of approximately 1.4 microseconds duration and operates at a sustained pulse rate of approximately 200 pulses per second. According to this embodiment, approximately 36 megawatts pulsed at approximately 10,000 watts average power results for an active cavity volume having dimensions of approximately 2"×2"×30". There is no other laser known that approaches such levels of performance.

Briefly, the Controlled Avalanche Process is, in a manner, somewhat similar to an E-beam ionization scheme (see, e.g., K. Boyer, C. Fenstermacher, W. Leland, and M. Nutter, Electron-beam-controlled electrical discharge as a method of pumping large volumes of $CO_2$ laser media at high pressure: *Applied Physics Letters*, v. 20, January, 1972) because the Controlled Avalanche Process permits independence of ionization and pump mechanisms, and also their associated E-field parameters. Therefore, a relatively large density of "cold" electrons may be supplied, which are subsequently conducted by application of an electric field whose magnitude is too low to sustain a normal glow discharge (i.e., to create ionization of its own accord). However, instead, the Controlled Avalanche Process serves only to pump the laser transitions by sustaining the electron bath at a low-lying, but optimal, mean temperature for exciting vibrational transitions. Since the ionization phenomenon is no longer associated with this pump E-field, the E-field may be tuned at will to optimize the excitation to any molecular state of any particular molecule. There are many situations where the net efficiency for pumping laser levels (or vibrational transfer levels) occurs when the pump E-field lies below that level needed to sustain ionization. Furthermore, this condition provides uniform stable excitation of very large volumes of high-pressure gas without arcing.

It should be noted that, while the electron-beam, ionized, sub-breakdown, field-plasma, formation schemes behave like and exhibit the same favorable characteristics as the Controlled Avalanche based scheme described herein, the E-beam technique is inherently unreliable. For that case, the electrons must pass from an evacuated accelerator region through thin foil windows into the medium (or high) pressure laser cavity. This window is blasted by shock waves as the heated laser plasma expands, and it is also subject to puncture by accidental cavity arcs. This arcing behavior can happen often and without warning, causing significant damage to the equipment and disruption of, for example, an industrial process.

A plasma generator embodiment, described herein, comprises a broad area pulsed X-ray source, two electrodes shaped to prevent field enhancement (such as Rogowsky contouring) and one of which contains an X-ray transmitting window (most ideally made of beryllium), a high voltage pulser to drive the X-ray gun, and a special "hybrid" pulser connected across the electrodes which serves to generate a multi-component pulse to be described. According to this embodiment, the "hybrid" pulser is an apparatus which generates a string of pulses, each comprising a very sharp, narrow, ultra-high, voltage transient, its leading edge followed by a longer, lower-voltage, flat wave form. The long pulse part of this waveform is derived from a pulse-forming network that can be impedance-matched to the plasma load. Both components of the pulse are optionally independently controllable and precisely provide design-specified parameters.

In one embodiment, a particular four-step process operates as follows:

Step 1: An electron-beam generated, broad-area, X-ray pulse is applied to the plasma, and is conducted from its source into the laser through the X-ray window in the electrode. This generates a uniform bed of seed ionization ($Ne^{preion} \geq 10^7$ electrons/cm$^3$) throughout the cavity (and discharge) region.

Step 2: Following a short delay, the uniformly distributed seed ionization is caused to avalanche to the full "working level" electron number density Ne according to design (perhaps $Ne_{pump}=10^{13}$ to $10^{14}$ electrons/cm$^3$) by means of applying an enormously high voltage pulse of ultra-short duration. The exact height and width of this pulse is application-specific, but most likely will fall into the range of 100 KV to 2 MV lasting 5 to 75 nanoseconds. More specifically it provides an initial open-circuit, reduced-field strength of typically 150 Townsends (Td), which amounts to a factor of ~3 to 8 times the glow potential for a particular gas mix. The avalanche is completed as the pulsed potential falls from its maximum field strength (~150 Td unloaded) to the loaded value of perhaps 75 Td for the case of a $CO_2$ laser. This field falls just below the "sparking" potential, but well above the "normal glow" potential.

Step 3: The second function of the hybrid pulse generator takes over the final phase of creating ionization as its applied potential falls from its pulse-forming network charge voltage to one-half that value as the plasma impedance falls to match the pulse-forming network impedance.

Step 4: The system is designed so that plasma impedance comes into match with the pulse-forming network impedance at the particular voltage which provides the optimal E/N condition for pumping the laser transition. Since for this condition E/N falls below the glow potential (i.e., does not contribute to an ionization avalanche), it may be maintained without causing an arc for a specified period of time. Should the ionization level drop unacceptably for the case where the pulse period is very long, multiple controlled avalanche pulses may be added to the first one to sustain ionization in a quasi-continuous mode.

The laser transition is continuously pumped under optimum conditions until terminated by the pulse-forming network. Most typically, the pulse network parameters will be selected to apply the maximum specific power load afforded by thermal bottlenecking (see, e.g., A. E. Hill, Role of thermal effects and fast-flow power scaling techniques in $CO_2$—$H_2$—He lasers: *Applied Physics Letters*, v. 16, no. 11, Jun. 1, 1970) subject to the optimal pump potential and the desired pulse width.

The maximum pulse width is typically limited by the time it takes for the hot gas to expand into the volume external to the laser cavity. In turn, this depends, for example, on the size of the cavity. For example, if a cavity were of 10×10 cm cross section, a few tens of microseconds may bound an achievable upper limit for pulse width.

Figure 6A:
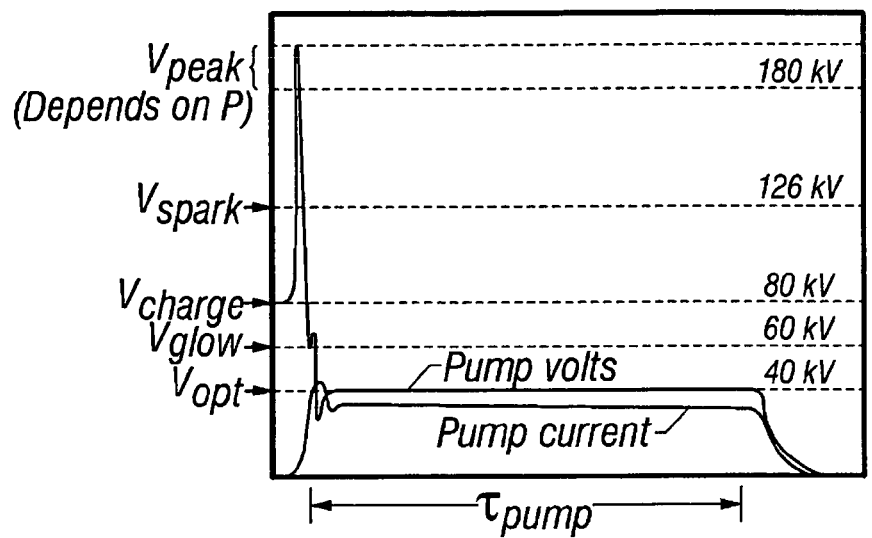
FIG. 6A is a plot of plasma voltage and current waveforms generated by an ideal matched impedance controlled avalanche driver according to an embodiment of the present invention, voltage and current values correspond to parameters for a 0.5 ATM, 10 liter volume laser with a pump current plateau of 12.5 kA and τ of between approximately 100 and approximately 400 nanoseconds.
Figure 6B:
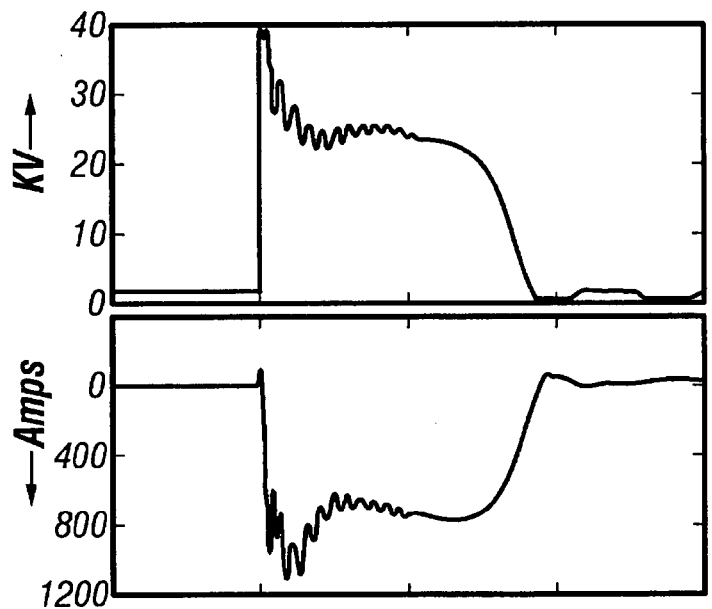
FIG. 6B is a plot of plasma voltage and current waveforms generated by an actual matched impedance controlled avalanche driver according to an embodiment of the present invention, plasma load is approximately 0.5 ATM with a 0.5 liter volume discharge and the upper trace is plotted with 10 kV per division and the lower trace is plotted with 400 A per division, both having a time base of 2 microseconds per division.
Figure 6C:
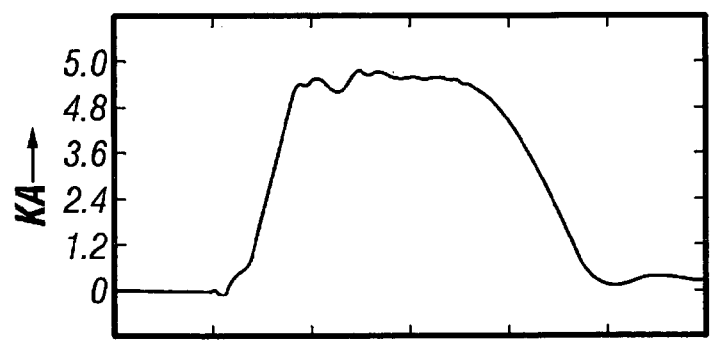
FIG. 6C is a plot of plasma voltage and current waveforms generated by an actual matched impedance controlled avalanche driver according to an embodiment of the present invention, plasma load is approximately 0.5 ATM with a 3 liter plasma volume and the vertical scale is 1200 A per division having a time base of 0.5 microseconds per division.

The discharge voltage/current characteristics leading to establishment of the plasma via the four-step process are shown in FIGS. 6A, 6B and 6C, explained in more detail below. Any network capable of establishing this process within the laser plasma load—herein called the "hybrid pulser"—is within the scope of the present invention.

FIG. 6A shows a plot of plasma voltage and current waveforms generated by an ideal matched impedance controlled avalanche driver according to an embodiment of the present invention, voltage and current values correspond to parameters for a 0.5 ATM, 10 liter volume laser with a pump current plateau of 12.5 kA and τ of between approximately 100 and approximately 400 nanoseconds.

FIG. 6B shows a plot of plasma voltage and current waveforms generated by an actual matched impedance controlled avalanche driver according to an embodiment of the present invention, plasma load is approximately 0.5 ATM with a 0.5 liter volume discharge and the upper trace is plotted with 10 kV per division and the lower trace is plotted with 400 A per division, both having a time base of 2 microseconds per division.

FIG. 6C shows a plot of plasma voltage and current waveforms generated by an actual matched impedance controlled avalanche driver according to an embodiment of the present invention, plasma load is approximately 0.5 ATM with a 3 liter plasma volume and the vertical scale is 1200 A per division having a time base of 0.5 microseconds per division;

Particular circuits that achieve this process by means of direct interaction with the plasma, i.e., wherein the plasma acts to form a controlling circuit element of the "hybrid pulser," are shown in FIG. 7A and FIG. 7B and are within the scope of the present invention.

FIG. 7A shows a schematic of a "simplified" circuit and FIG. 7B shows a schematic of a more elaborate circuit. The circuits of FIGS. 7A and 7B both comprise a pump store pulse forming network ("PFN") 2710, a thyatron switch (or spark gap) 2720, at least one transfer capacitor 2730, a transfer conductor 2740, impedance matched PFN transfer cables (also suitable as avalanche pulse forming cables) 2750, a laser discharge cathode 2760, a laser discharge anode 2770, at least one optional snubber circuit 2780, a low inductance current return structure 2800, and a switch inductance 2880. Variable resistor and switch 2890 models the plasma breakdown and is an equivalent circuit for the electrical discharge. Additional features shown in FIG. 7B and not in FIG. 7A include, a pulsed X-ray electron gun 2810, an X-ray window 2820, a floating filament supply and grid drive electronics 2830, a fiber optically coupled fire sync signal 2840, a common mode rejection filter 2850, an isolation transformer 2860, and a capacitor charging power supply (or command charge) 2870.

Referring to FIG. 6A, a lumped or distributed pulse-forming network (or line) is provided to store the energy which excites the laser transition at (nearly) a constant rate over a specified time. Distributed lines are preferred when the excitation line is short enough (i.e., designed to provide a $\tau_{pump}$ period of approximately a few hundred nanoseconds or less), but may be "lumped" using discrete elements (as shown in FIG. 6) to permit longer pulse lengths (typically 1 to 10 μs). For best discharge stability, a single lumped section should not exceed a time constant $\tau_{sect}=\sqrt{LC}\leq 200$ nanoseconds; the fall pump time period then equals $\tau_{pump}=2N\sqrt{LC}$ where N is the number of discrete LC sections used. Thus, the total pump period as well as the total stored energy may be defined by the number of sections and the total capacitance:

$$\Delta E = \frac{1}{2}NCV_{Charge}^2.$$

This quantity of energy is ideally selected to provide the (near) maximum energy allowed by thermal bottlenecking for the case of $CO_2$ lasers.

The inductance L of the line element, together with the values of C determine $\tau_{pump}$, but also establish the network impedance $$z_{line}=\sqrt{\frac{L}{C}}.$$

All parameters (including discharge composition and pressure, $\tau_{pump}$, C, L, N and Z) are chosen such that $Z_{line}$ will be matched to $Z_{plasma}$ in its final sub-breakdown condition when the laser transition is being pumped.

According to this embodiment, a desirable arrangement of $Z_{line}=Z_{plasma}$, provides that it is also true that the line will ultimately drive the plasma at one-half its initial charge potential, $\frac{1}{2}V_{charge}$ and conditions are also arranged so that $V_{pump}=\frac{1}{2}V_{charge}$ falls below the glow potential, most optimally $V_{pump}\cong\frac{2}{3}V_{glow}$, (derived from a rigorous kinetics calculation incorporating solutions to the Boltzmann electron energy distribution functions) wherein the reduced plasma electric field is ~25 Td (depending on the gas mix) for the case of $CO_2$.

Referring to FIG. 6A, it is a fortuitous condition of nature that the sparking potential is on the order of two times the glow potential, or (equivalently) the reduced electric field corresponding to breakdown conditions is on the order of two times the value corresponding to glow conditions. Hence, by choosing $V_{pump}<V_{glow}$, we have also arranged that $V_{charge}<V_{spark}$. The PFN may therefore be charged and sustained at $V_{charge}$ without causing an arc if the previously heated and ionized gas has been removed from the cavity prior to charging the capacitors. Hence, a "command" charge circuit is to be used, or an appropriate delay must be incorporated in the case of using a RF capacitor charging circuit.

The pump storage PFN (or PFL) is followed by an intermediate LC section, a low inductance switch (thyatron or spark gap) and a set of parallel cables whose combined impedance $Z_{cables}=Z_{pfn}$. The cables play a dual role. First, they serve as part of a circuit which generates the initial high voltage ionization voltage spike, and like the PFN, the cables interact with the plasma so as to control the collapse of the voltage spike, thus eliminating spark breakdown. Second, the cables provide an impedance matched corridor through which to transfer pump energy from the PFN to the plasma, becoming both passive and transparent during the laser excitation process (i.e., once $Z_{plasma}=Z_{cables}$). Like elements of the PFN, the cables must be precisely specified as to number, impedance, length, and correspondingly, their total capacitance.

Initial voltage spike formation begins when the energy transfer switch (i.e., thyatron) is closed. The intermediate transfer cap $C_t$ initially charged to $V_{charge}$ then dumps through the switch, thus charging the cables. The sum of the cable capacity is selected to be much less than $C_t$, so that its energy gets resonantly transferred to the cables through the self-inductance of the switch $L_t$, which is minimized. In the limit where $C_t>>C_{cable}$, the cables get charged to nearly double $V_{charge}$. Or, by properly selecting the ratio of $C_t/C_{cable}$, the voltage increase ratio can be selected anywhere between 1 and nearly 2. The transfer time, $\tau_{tr}$ is determined by:

$$\tau_{tr}=\pi\sqrt{\frac{L_{sw}C_\tau\sum_N C_{Cables}}{\left(C_\tau+\sum_N C_{Cables}\right)}}$$

Ideally, $\tau_{tr}$ should fall between 1 and 2 cable transient times $\tau_C$ where $\tau_C=l\sqrt{L_C C_C}$ and $L_C$ and $C_C$ are the cable's inductance and capacity per unit length, respectively, and l is the length. Finally, l is chosen such that the spike rise time, $\tau_C$, is on the order of avalanche rise time at full breakdown potential. Hence, upon its arrival the cable pulse is reflected by nearly an open circuit since the plasma ionization only the X-ray generated pre-ionization level ($10^7$ electrons/cm$^3$) is present. Hence, the reflected voltage under open circuit conditions heads toward $2\times V_{cable}$ or in turn $2\times$(nearly $2)\times V_{pfn}$, and $V_{pfn}\cong 2\times V_{glow}$. Hence, the reflected potential is heading toward producing 180 to 200 Td; i.e., 6 to 8 times the reduced field strength of $V_{pump}$ which is approximately 25 Td. As approximately 180 Td is approached, the avalanche breakdown accelerates, and the reflected potential gets reduced because the plasma impedance is becoming reduced, according to the reflection coefficient; i.e., $$V = V_{Cable}\left(1 + \left(\frac{Z_{Cable} - Z_{Plasma}}{Z_{Cable} + Z_{Plasma}}\right)^2\right).$$

It is furthermore possible to balance the selection of all parameters, particularly including the level of overvoltage achieveable at the point of avalanche onset such that the electron number density can be determined. The number density is, in fact, determined such that when the discharge potential has fallen to $V_{pump}$, then $n_e$ has fallen to a value which establishes the discharge impedance which matches $Z_{pfn}$, and $Z_{cable}$. Then: $j=n_{e(\tau)}\epsilon v_d$ and $\iint n_{e(\tau)}\epsilon v_d dA = \sigma \vec{E}_{pump}$, which in turn establishes:

$$Z_{Plasma} = \left(\frac{l_d}{\sigma_\tau A}\right)$$

where:

$v_d$=electron drift velocity
$\epsilon$=1.6×10$^{19}$ Coulombs/electron
A=net discharge area
$l_d$=discharge length
$\sigma$=plasma conductivity In order to match all of these parameters, it may be necessary to add one additional controlling circuit (but not in all cases). The additional control can be added by the RC network identified as the "snubber circuit" on FIG. 7. This small capacitive load can be used to reduce and fine tune the maximum potential reached prior to avalanche without affecting any other parameters.

When the cables run out of stored energy, they become an impedance matched line which connects the pump storage PFN to its Z-matched plasma load. The plasma now sees the $V_{pfn}$, which is near $V_{spark}$ and now readily conducts current at this potential since it is highly ionized. The ionization density continues to grow so $V_{plasma}$ continues to drop until the plateau $V_{plasma}=V_{glow}$ is reached. At this point, ionization losses due to recombination plus 3-body attachment exactly equal the volume ionization production rate, and could stabilize. However, we have it arranged so that $Z_{pfn}$ balances $Z_{plasma}$ at a somewhat lower voltage, $V_{pump}$, which is completely stable since ionization is being lost, not gained, and simultaneously the laser excitation process is near optimal.

Since the PFN (or PFL) is perfectly matched at $V_{pump}=\frac{1}{2}V_{charge}$ and $Z_{pfn}=Z_{plasma}$, the line simply deposits its energy in a constant or slightly rippled fashion owing to lumped elements until it runs out of energy and stops abruptly at time $\tau_b=2N$ (i.e., the double transverse time for the network).

One more matching condition must be met, namely that intermediate capacitor $C_t$ was chosen to establish the correct cable voltage transfer, and having done this, the inductor $LC_t$ must be chosen to preserve $Z_{line}=Z_{LtCt}$ for that $L_tC_t$ pair. The $L_t$ in turn restricts that charge transfer coming only from $C_t$.

Now that all parameters are properly selected we have energy balance condition:

$$\int_\tau\left[\int \vec{E}_\tau \cdot dl \iint j_\tau \cdot dA\right]d\tau = \frac{1}{2}NC\left(\frac{V_{Charge}}{2}\right)^2$$

All discharge processes are, in turn, controlled by the ionization rate equation:

$$\frac{dn_\varepsilon}{d\tau} = S + (\alpha_{\tau(E/P)} - \alpha_{a(E/P)})v_{d(E/P)}Pn_\varepsilon - \alpha_{r(E/P)}n_\varepsilon^2$$

where, $n_e$=electron number density, cm$^{-3}$
S=external ionization sources (X-ray production rate)
$\alpha_{\tau(E/P)}$=reduced Townsend ionization coefficient
$\alpha_{a(E/P)}$=reduced Townsend 2-body attachment coefficient
$v_{d(E/P)}$=electron drift velocity, cm/sec
$\alpha_{r(E/P, P)}$=3-body recombination coefficient
P=pressure, torr The coefficients $\alpha_{\tau(E/P)}$, $\alpha_{a(E/P)}$, $\alpha_{r(E/P, P)}$ and $v_{d(E/P)}$ are all calculated by means of solving the Boltzman electron energy distribution equation for incremental values of E/N, or $T_d$, which in turn is time dependent.

The network described and drawn in FIG. 7 accurately produces the conditions illustrated in FIG. 6 and in practice it has produced $CO_2$ laser plasmas of an unprecedented quality and power loading. Actual current-voltage characteristics for two different sized lasers are shown in FIGS. 6B and 6C, both of which correspond well with the idealized theoretical representation of FIG. 6A.

Applications of the Invention

Various embodiments of the present invention are suitable for use in servicing and/or cleaning of radioactive contaminated surfaces (e.g., buildings, floors, walls, ceiling, surfaces of equipment, such as gloves, boxes, tanks, machinery (painted or unpainted)). Various embodiments are suitable for use in the aircraft industry, for example, but not limited to, to remove paint from aluminum and composite aircraft skins, helicopter rotors, radomes, other piece parts, and differentially controlled layer removal from Stealth Aircraft surfaces. Various embodiments are suitable for removing paint without primer removal, etc. In the marine industry, various embodiments are suitable for surface paint/corrosion removal from ships and barges and/or special rubber-like surface removal from submarines. Also included are operations for off-shore structures, such as oil rigs, etc.

In the construction industry, various embodiments are suitable for lead-based paint removal from buildings—all surfaces, including wood buildings. With proper operation, the laser will not start fire and provides complete containment of lead contaminated debris. According to various embodiments, lasers of the present invention are suitable for use on bridges, water (or other) outdoor storage tanks and even road texturing.

In the automotive industry, various embodiments are suitable for use on trucks, cars, and all heavy equipment. Further applications include degreasing during fabrication, assembly and paint, coatings and/or wax removal.

Various embodiments are also suitable for use in the medical industry, including, but not limited to, burn debridement, surgical operations (e.g., skin cancer, blemishes, tumors, etc.), cosmetic surgery (e.g., wrinkle reduction, hair removal, etc.), surface sterilization of hands, wounds, etc.

Other applications include art restoration and/or graffiti removal (e.g., for paintings, sculptures, graffiti removal from nearly any surface) and rapid prototyping and/or force free machining. Larger versions of such lasers, are scalable to megawatts average, enabling the following classes of applications: steel industry (e.g., removal of scale from steel rolls); removal of space debris; meteor deflection (Earth protection); rocket/vehicle propulsion from ground or airborne craft; and military applications (e.g., target designators, weapons).

The preceding examples can be repeated with similar success by substituting the generically or specifically described reactants and/or operating conditions of this invention for those used in the preceding examples.

The present invention also pertains to pulse circuits, generation apparatus and methods of generating plasma and/or excited atomic molecular species, and lasers. The pulse circuits of the present invention comprise means for generating ultra-short pulses suitable for use in lasers. The generation apparatus and methods of the present invention comprise means for generating plasma and/or excited atomic molecular species. For example, various embodiments of the generators of the present invention are useful for exciting molecules to excited atomic states, wherein such molecules include, but are not limited to, oxygen, water, carbon monoxide, carbon dioxide, nitrogen, NO, $NO_x$, chlorine, fluorine, bromine, etc. This list is neither exhaustive nor exclusive but given to show that the present invention is not limited to excitation of oxygen molecules. While the embodiments that follow focus primarily on excitation of oxygen and/or generation of a plasma in the presence of oxygen, it would be understood by one of ordinary skill in the art of physical chemistry that the apparatus and methods of the present invention are useful for generating plasma and exciting chemicals other than oxygen. Likewise, the pulse circuit of the present invention has uses other than for generator apparatus and/or lasers.

Particular embodiments of the present invention pertain to oxygen-iodine laser systems for use in a variety of industrial applications including metal-working applications such as cutting, welding, drilling, and surface modification. Currently, $CO_2$ and NdYag type lasers are used for such metal-working applications. $CO_2$ lasers possess good beam quality, high efficiency, scalability to very high power levels (without loss of beam quality), and are an economical source of laser power on a per watt basis; however, they suffer from a long wavelength (10.6 microns) and, therefore, cannot be focused to a tight spot at high power levels without causing plasma formation. The long wavelength also prevents transmission via fiber optic cable and limits the ability to cut thick steel precisely and efficiently. Ultimately, a $CO_2$ laser cannot cut or weld steel more than a few inches deep. NdYag lasers operate at a much shorter wavelength, 1.06 microns, which is transmittable via fiber optic cable. The 1.06 micron NdYag wavelength beam, in combination with a suitable lens, allows for beam focusing to a spot area 100 times smaller, at 100 times greater beam intensity, compared to a 10.6 micron $CO_2$ wavelength beam. In general, the smaller wavelength beam of the NdYag laser does not cause plasma formation until reaching an intensity level that is 100 fold that of the level which causes air breakdown for the $CO_2$ laser (i.e., $10^9$ watts/cm$^2$ for NdYag verses $10^7$ watts/cm$^2$ for $CO_2$); however, maintenance of beam quality is a major problem of NdYag lasers scaled to a high average power—high power allows for an increase in work process rate. For example, a 2 KW to 3 KW multi-mode NdYag laser produces a focal spot that is blurred to a 1000 fold greater area than that produced by a 60 watt diffraction limited NdYag laser. Increased focal spot size also leads to heat loss to the sidewalls of the laser's "keyhole" cut—such heat loss can be a limiting factor in many cutting applications.

The oxygen-iodine laser systems of the present invention combine advantages of $CO_2$ and NdYag lasers while eliminating many of their disadvantages. An oxygen iodine ($O_2$-I*) laser operates at 1.315 microns and is thereby transmittable by fiber optic cable. The 1.315 micron wavelength allows for beam focusing characteristic of NdYag lasers operated below 60 watts average power. Likewise, the $O_2$-I* laser achieves an intensity of nearly $10^9$ watts/cm$^2$ without causing plasma formation or losing beam quality. Essentially, the $O_2$-I* laser is scalable to tens or hundreds of kilowatts—megawatts for that matter—without loosing beam quality. This allows for a sharp focus at high power. For example, $O_2$-I* laser systems of the present invention can cut easily through 12 inch-thick steel because such systems deliver a power density that is orders of magnitude higher than the rate at which the steel absorbs energy through the keyhole walls. A more detailed description of $O_2$-I* laser systems of the present invention follows.

$O_2$-I* laser systems of the present invention deviate from traditional chemical $O_2$-I* laser systems (COIL systems). Traditional COIL systems require liquid chlorine, concentrated hydrogen peroxide, and potassium hydroxide. During operation, these chemicals are provided at a substantial rate and mixed to form a chemical reaction that produces oxygen in a particular excited state called $O_2^1\Delta$ (O-2 singlet delta). In COIL systems, a flowstream of $O_2^1\Delta$ passes through a chilled heat exchanger to remove water vapor—an unwanted by-product of the chemical reaction. Next, the $O_2^1\Delta$ flowstream passes through a block of helium and iodine injection nozzles, then supersonic expansion nozzles that accelerate and cool the oxygen/helium/iodine stream to about Mach 2.8 and about 100 K. The $I_2$, which may be carried in buffer gas (e.g., helium), is generally mixed into the $O_2$ and $O_2^1\Delta$ flowstream just upstream of the supersonic expansion nozzles.

During this process, $I_2$ molecules collide with $O_2^1\Delta$ and disassociate into two iodine atoms. The individual iodine atoms, in turn, collide with additional $O_2^1\Delta$ molecules whereby energy stored in $O_2^1\Delta$ molecules is then transferred to iodine atoms. The transfer of energy causes a "populating" of the iodine's upper laser level. The change in energy level process is positioned to occur either just upstream of, or within, an optical resonator which is transverse to the supersonic flowstream. The $O_2$-I* laser beam is produced and directed transverse to the supersonic flowstream by the optical resonator. The chemical flowstream, post-resonator, passes through a supersonic/subsonic diffuser that causes a "shock down" to subsonic flow. The subsonic chemical stream is simply discharged from the system, for example, to the atmosphere, usually with the aid of an ejector pump. The aforementioned COIL system operates in an open-cycle configuration because the chemicals pass through the system only once.

Figure 16:
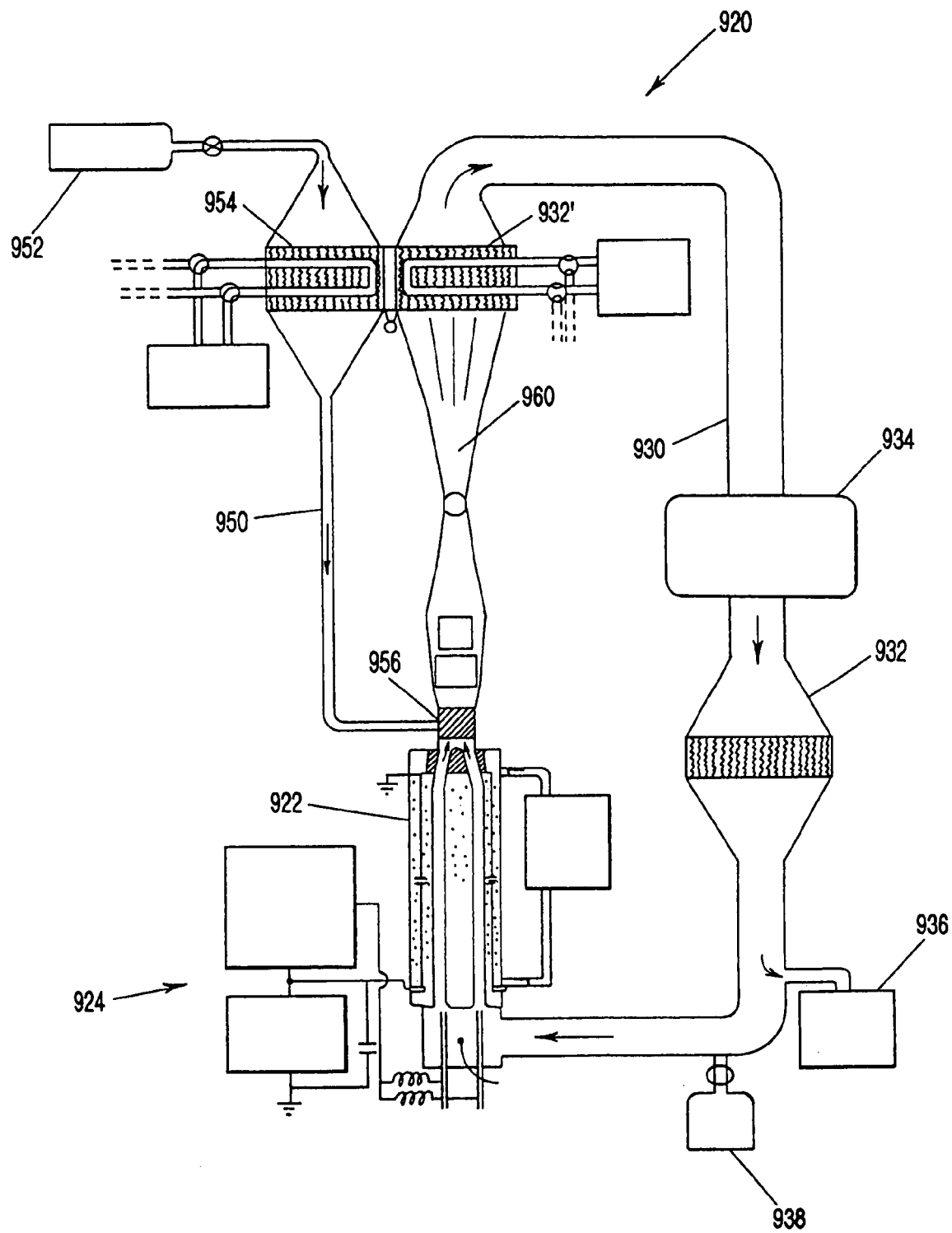
FIG. 16 is a diagrammatic view of a close-cycle laser according to an embodiment of the present invention.

The present invention encompasses both open-cycle and closed-cycle configurations; however, as shown below, closed-cycle configurations impart substantial benefits to some industrial applications, as do semi-closed cycle configurations. The present invention allows for a semi closed-cycle operation by virtue of electrical excitation of oxygen. For purposes of this invention, semi closed-cycle operation means that less than approximately 10% of system gas is lost as percentage of gas flow rate and preferably, this percentage is less than approximately 5% while most preferably, this percentage is less than approximately 1%. Electrical excitation eliminates the need for liquid chlorine, concentrated hydrogen peroxide, and potassium hydroxide. In the preferred embodiments of the present invention, electricity alone energizes the laser, transforming pure oxygen into $O_2{}^1\Delta$. Semi closed-cycle operation of a preferred embodiment of the present invention's $O_2$-I* laser system is illustrated in FIG. 16.

Unlike the COIL system, the closed-cycle operable, electrically driven system of the present invention allows for design of practical systems for industrial applications. For example, electrically driven $O_2$-I* systems of the present invention comprise a laser that operates at 1.315 microns having the physical size, cost per watt, power scalability, and beam quality advantages of a closed-cycle, fast-flow $CO_2$ laser system.

A preferred embodiment of a particular laser system of the present invention shares some operational similarities with a United States Air Force COIL system. The Air Force COIL system first provides for $I_2$ collisions with $O_2{}^1\Delta$ that dissociate $I_2$ into 2I and second, provides for additional iodine collisions with metastable oxygen whereby energy is resonantly transferred to iodine thereby exciting the iodine to the upper laser level. The most significant difference between the aforementioned preferred embodiment and the Air Force COIL system is that instead of producing the oxygen singlet delta from a chemical reaction of basic hydrogen peroxide and chlorine, the oxygen singlet delta is produced directly from ground-state oxygen by means of cold plasma electrical excitation.

Normally, the required fractional conversion of oxygen into $O_2{}^1\Delta$ cannot be accomplished by using either conventional (self-sustained) discharges or microwave discharges, because in both instances heat production is excessive and limiting, and also the electric field ("E-field") normalized to plasma density ("E/N") values encountered are much too high. More specifically, E/N is a measure of the E-field normalized to the plasma density, which plays a controlling role in nearly all plasma processes. E/N is typically measured in Townsends 1 Td (1Townsend)=10–17 volt-cm², a value equivalent to 263.9 volts/cm-Amagat. Therefore, an insufficient fraction of the input energy gets partitioned into the single reaction product of importance: $O_2{}^1\Delta$. Chemical kinetics/Boltzman electron energy distribution calculations reveal that the necessary concentrations of $O_2{}^1\Delta$ are generated only if the following (normally mutually exclusive) conditions are simultaneously met:

(1) A high specific energy deposition (approximately 100 KJ/mole $O_2$) must be applied to a large volume, low pressure (approximately 5 to 50 Torr) flowstream of oxygen. For instance, the system requires a volume that is scalable to produce whatever $O_2{}^1\Delta$ flowrate is required for a laser of specific power (e.g., a 100 KW laser might require on the order of 43 liters of total plasma volume, if operated at 15 Torr total stagnation pressure);

(2) The energy deposition must occur within approximately 10 milliseconds or less (generally due to kinetic losses);

(3) The electric field must be maintained well below the glow potential so that E/N values lie between approximately 7 and approximately 10 Townsends during the entire energy deposition period;

(4) The energy deposition process must be essentially isothermal; i.e., waste heat must be removed at a rate such that the maximum gas temperature does not build up beyond approximately 200° C.; and (5) Since self-sustained discharges cannot provide the aforementioned conditions, an external means of ionization must be used. The chosen method must not contribute substantially to the net thermal energy input, nor modify the electron energy distribution substantially over the drift condition calculated for E/N≅10 Td. Condition (5), as well as the occurrence attachment instabilities, rule out the use of electron beam ionization, which otherwise would seem to pose a self-evident solution.

Figure 8:
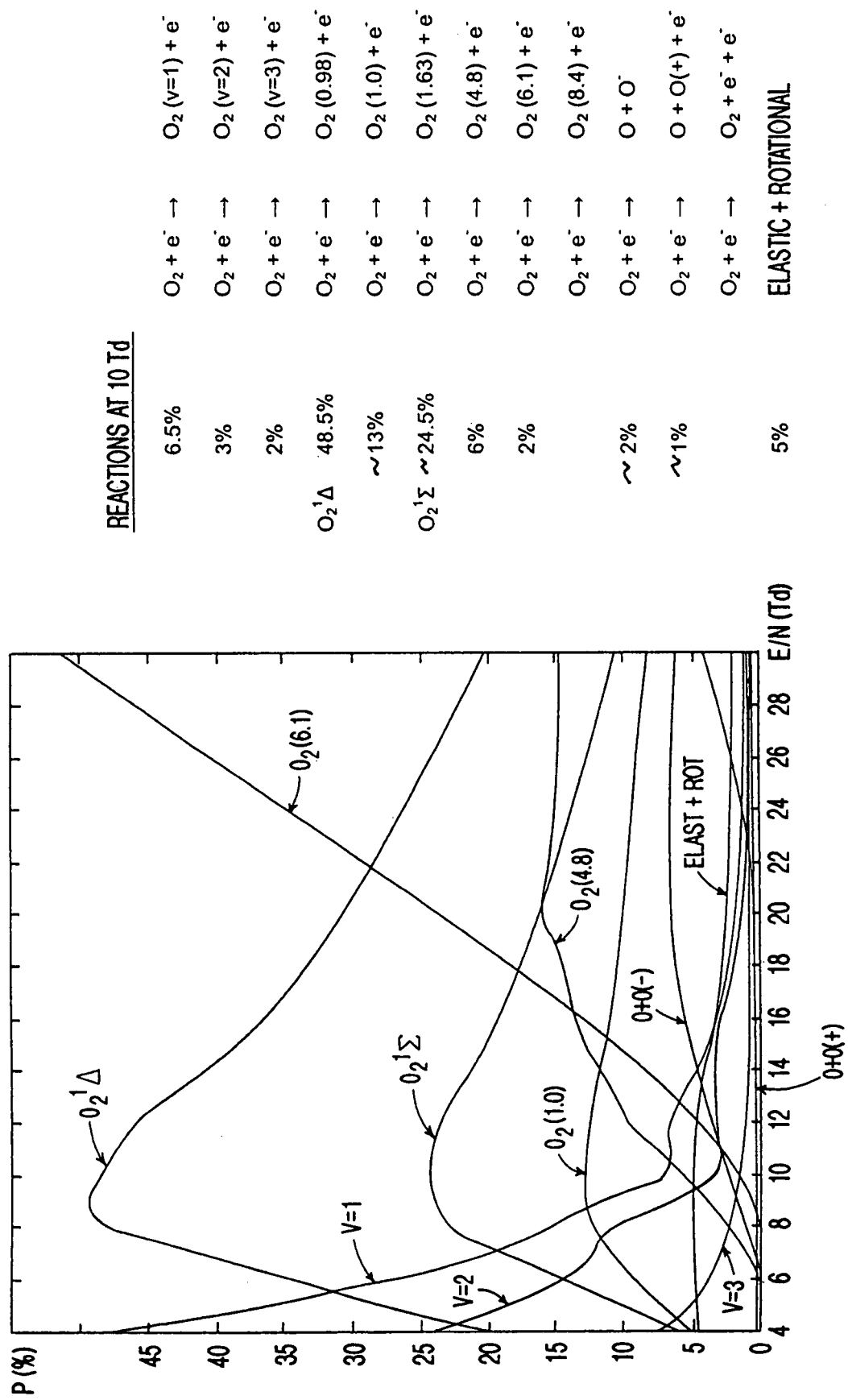
FIG. 8 is a graph of a variety of reactions versus E/N in Townsend.

The theoretical $O_2{}^1\Delta$ yield verses the applied electric field/density, E/N in Townsends (Td), is shown in FIG. 8. Here, the chemical branching efficiency ratios for all relevant reactions have been calculated for the electron energy distribution function corresponding to each E/N value. The graph presented in FIG. 8 illustrates that, for E/N falling between 7 and 10 Td, 50% of the applied electrical pump energy is directly stored in the $O_2{}^1\Delta$ it produces. The graph also shows that at the electric field necessary to sustain a normal glow discharge (i.e., E/N=40 Td), the amount of $O_2{}^1\Delta$ created is insufficient to sustain laser action.

In a preferred embodiment, the present invention's method of meeting the aforementioned criteria uses: ultrahigh E/N (initially greater than approximately 180 Townsends) and ultrashort (τ is approximately 5–15 nanoseconds) pulses at a rep rate sufficient to maintain an average electron number density of approximately $10^{13}$ to approximately $10^{14}$ electrons/cm³ during the pump period (typically approximately 20 KHz to approximately 40 KHz), while maintaining a constant DC pump field (or magnetically induced square wave potential) at a potential required to produce an E/N value of approximately 10 Td. In most systems of the present invention, ultrashort pulses of less than approximately 75 nanoseconds are desired while preferably pulses are less than approximately 25 nanoseconds and most preferably, pulses are less than approximately 15 nanoseconds. Through experimentation and investigation of a large number of generator configurations, preferred configurations comprise an integral electrical excitation generator and a heat exchanger. These configurations allow isothermal heat addition; i.e., rapid removal of waste heat is in equilibrium with internal rate of heat production. It is noted that the applied pump potential (E/N is approximately 10 Td) falls far below the electric field required to maintain ionization; therefore, a continuous sequence of ultra high voltage (E/N initially greater than or equal to approximately 180 Td), high repetition rate (e.g., 20,000 to 40,000 pps or more) pulses are applied to renew the ionization lost while the field is being sustained at only 10 Td (under fully developed equilibrium conditions, for example). Note that the residual ionization can reduce the E/N level needed to renew ionization from levels of approximately 180 Td to levels less than approximately 180 Td, in some instances, for example, down to levels of approximately 100 Td or less. These ionization pulses must be arrested to limit each pulse to less than a few tens of nanoseconds duration. Any ionization pulses of order E/N greater than or equal to approximately 100 Td to approximately 180 Td (depending on the initial ionization number density) lasting longer than approximately 75 nanoseconds would lead to arc breakdown. Furthermore, ionization pulses lasting longer than a few tens of nanoseconds generate $O^1D$ at a concentration which tends toward becoming deleterious. Of course the invention is not limited to the parameters set forth in this particular embodiment, for example, but not limited to, E/N is not limited to values given, the pulse length is not limited to the values given, and the electron number density is not limited to the values given. Furthermore, the invention is not limited to oxygen iodine lasers, because the pulse circuits and generators of the present invention have other uses as well. Depending on the particular use and configuration of any particular embodiment, E/N values of 150 Td are within the scope of the present invention for over-volting, as well as, for example, but not limited to, electron number density values from $10^{12}$ to $10^{15}$.

Figure 9:
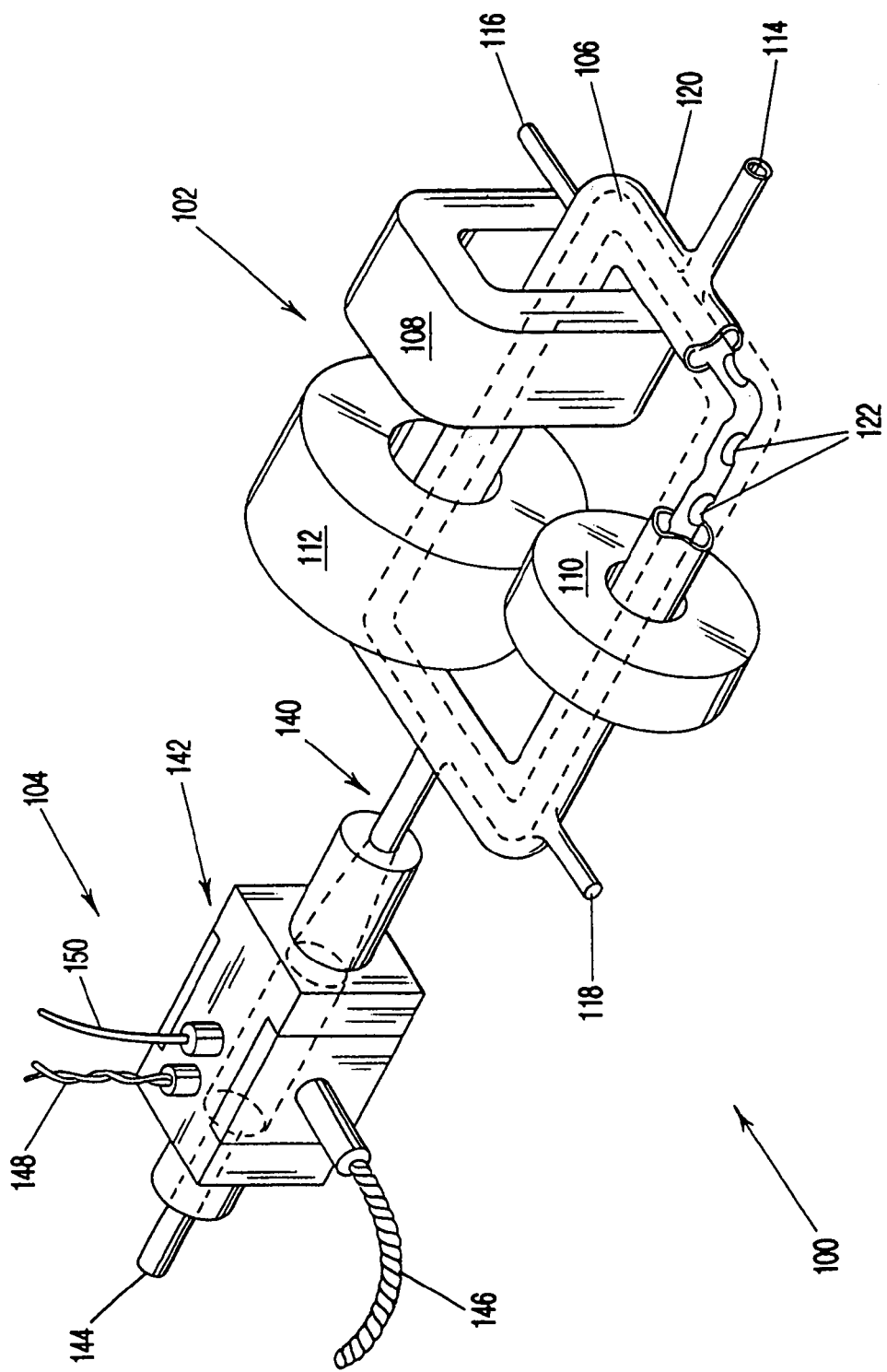
FIG. 9 is a perspective view of a loop configuration of a generator embodiment of the present invention.

An example of a magnetic induction loop generator is illustrated in FIG. 9. As shown in FIG. 9, the generator 100 comprises a loop portion 102 and a measurement/gas exit portion 104. The loop portion 102 comprises a core for providing a poler pulse 108, a current probe 110, a core for main power pulses 112, a gas loop 106 surrounded by a coolant shell 120. As depicted, the cores 108, 112 and the current probe surround the gas loop 106. The gas loop 106 further comprises surface indicia, fins, ribs, etc. 122, for increasing heat transfer to the coolant. The coolant shell comprises a coolant inlet 116 and a coolant outlet 118.

While not an essential part of the apparatus, the measurement/gas exit portion 104 comprises a connection 140 to the gas loop 106. The measurement/gas exit portion 104 also comprises a block for sensors and measurements 142, a gas exit 144, a fiber optic observation and/or communication connection 146, electrical leads for a thermocouple or other suitable temperature measurement device 148, and a pressure sensor device and/or port for measurement of pressure 150. The block 142 optionally comprises windows and a sensor volume, such a block is known to one of ordinary skill in the art. The gas exit 144 optionally comprises a throttling valve or similar device for controlling gas flow.

In an embodiment of this inventive generator system, a sequence of ionization pulses are magnetically induced into the loop 106 by means of a METGLAS® (Allied Signal Inc., Morristown, N.J.) (or ferrite core) transformer 112 or transformers. Another METGLAS® transformer 108 is used to induce a sub-breakdown potential, square wave into the loop 106. Of course, a "perfect" square wave having instantaneous rise and fall is not achievable in practice; therefore, it is understood that square waves referred to herein have a rise time and a fall time. In this particular embodiment of the present invention, each half cycle of the square wave is of sufficient duration as to drive a transformer's magnetic core to near saturation or to saturation. Likewise, the second half-cycle, which is, for example, of equal magnitude and opposite polarity to the prior half cycle, drives the core to near saturation or to saturation in an opposite manner. The cycling square wave acts to induce a substantially constant electric pump field (e.g., but not limited to, approximately 10 Td) for application to the loop to maintain electrons at their optimal temperature distribution for exciting $O_2$ into the desired $O_2{}^1\Delta$ state. The fact that the field reverses periodically whenever the core 112 reaches near saturation or saturation does not affect the process because of the relatively short cycling time as evidenced by the duration of the aforementioned ultrashort pulses.

In an embodiment of this particular example of a magnetic induction loop generator, as illustrated in FIG. 9, the plasma path length through loop 106 comprises a length of approximately 60 cm, a cross-sectional area of approximately 0.7 cm$^2$ and a volume of approximately 40 cm$^3$. In this embodiment, the gas flow path through the loop 106 comprises a length of approximately 30 cm and a cross-section of approximately 1.4 cm$^2$. In this embodiment, the exit volume (loop 106 to sensor/measurement block 142) comprises a length of approximately 14 cm, a cross-sectional area of approximately 0.7 cm$^2$ and a volume of approximately 23.1 cm$^3$.

Figure 10:
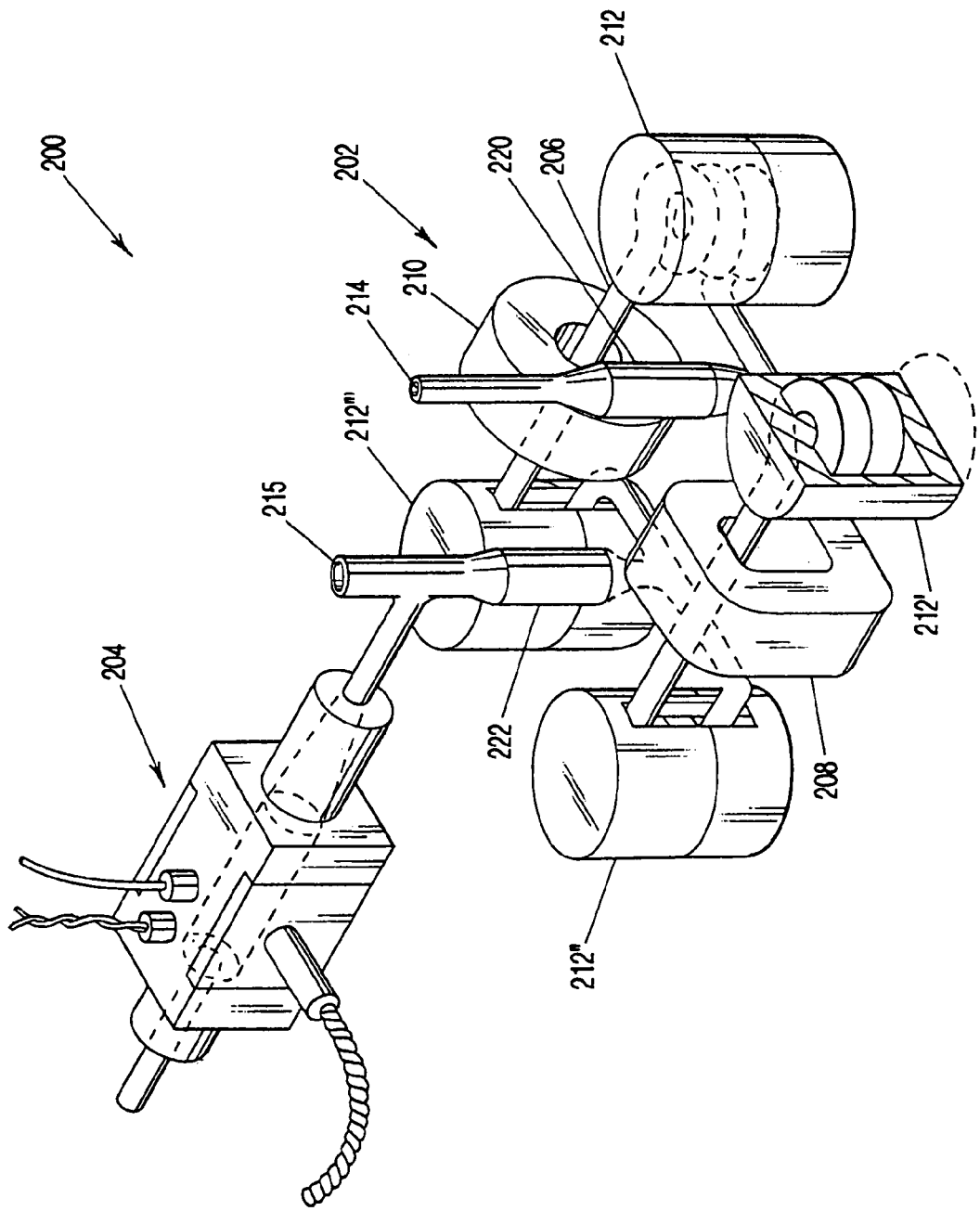
FIG. 10 is a perspective view of a loop and electrode configuration of a generator embodiment of the present invention.

Another embodiment of the present invention, more specifically of a magnetic induction loop generator 200, is shown in FIG. 10. This example comprises a loop portion 202 and a measurement/gas exit portion 204 (used to verify the proof of principle but not essential to this embodiment of the invention). The measurement/gas exit portion 204 comprises the same features as the measurement/gas exit portion 104 of generator 100. Thus, reference to FIG. 9 and its description is suggested for a description of measurement/gas exit portion 204. The loop portion 202 of the embodiment shown in FIG. 10 differs from the loop portion 102, as shown in FIG. 9, in several ways. Loop portion 202 comprises at least one pot core 212 and preferably four pot cores 212, 212', 212", 212'". The loop portion 204 also comprises a current probe 210 and a core for providing a poker (avalanche) pulse 208. A loop 206 passes through the at least one pot core 212 wherein the loop 206 makes at least one turn or winding and preferably approximately three windings. Gas enters the loop 206 through at least one inlet 214, which connects to and/or forms an anode 220. Gas exits the loop through at least one gas exit 215, which connects to and/or forms a cathode 222. As shown in FIG. 10, the gas exit 215 comprises a "T" wherein one path connects to the measurement/gas exit portion 204 and the other path exits through a dump valve and/or to a reservoir.

As shown in FIG. 10, this generator system 200 comprises multi-turn transformer windings comprising segments of the loop 206 in series. "Controlled avalanche" pulses are induced in the loop 206 by means of at least one ferrite pot core transformer segment 212. Again, the system is characterized by extremely short ionizing pulses (e.g., approximately tens of nanoseconds), ultrahigh E-field (e.g., approximately greater than or equal to 180 Td), and a delivered repetition rate of approximately tens of kilohertz. A sub-breakdown (10 Td) field (a continuous direct current) is delivered from a cathode 222 on one end of the loop to an anode 220 at the other end. In this embodiment, the direct current (DC) flows in parallel and in the same direction through two current paths (as shown in FIG. 10) of the loop 206 while the ionization pulse current flows continuously around the entire loop 206. Again, the DC's E-field is tuned to the resonant-like magnitude (E/N equals approximately 10 Td) which drives electron excitation of $O_2$ to form $O_2{}^1\Delta$.

Figure 11:
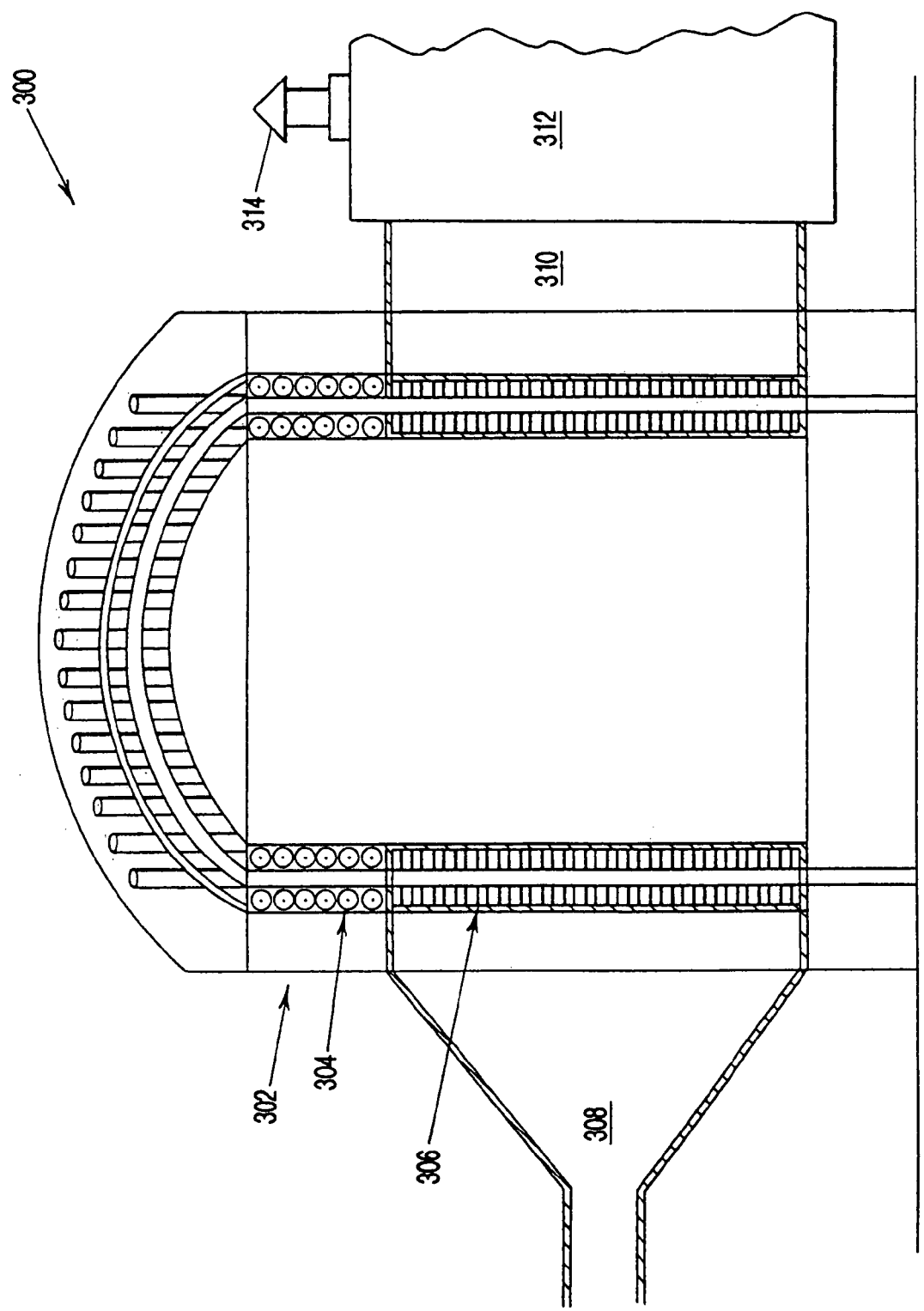
FIG. 11 is a cross-sectional view of a loop and core configuration of a generator embodiment of the present invention.

FIG. 11 illustrates an embodiment of the present invention comprising a cross-sectional view through a cylindrically configured transformer-coupled $O_2{}^1\Delta$ generator 300. This embodiment comprises a single ferrite core 302 to transform both a sequence of approximately greater than or equal to approximately 150 Td ionization pulses, and a sub-breakdown potential, square-wave pump field as described in the embodiment shown in FIG. 10. The ferrite core 302 comprises a coupled loop 304 lined with at least one heat exchanger 306, preferably electrically isolated, to efficiently remove the thermal energy created by the discharge. The generator further comprises a gas inlet 308 and an exit 310 which connects to, for example, a laser channel 312, for production of a laser beam 314. This particular embodiment, while shown with a single core, optionally comprises multiple cores.

Figure 12:
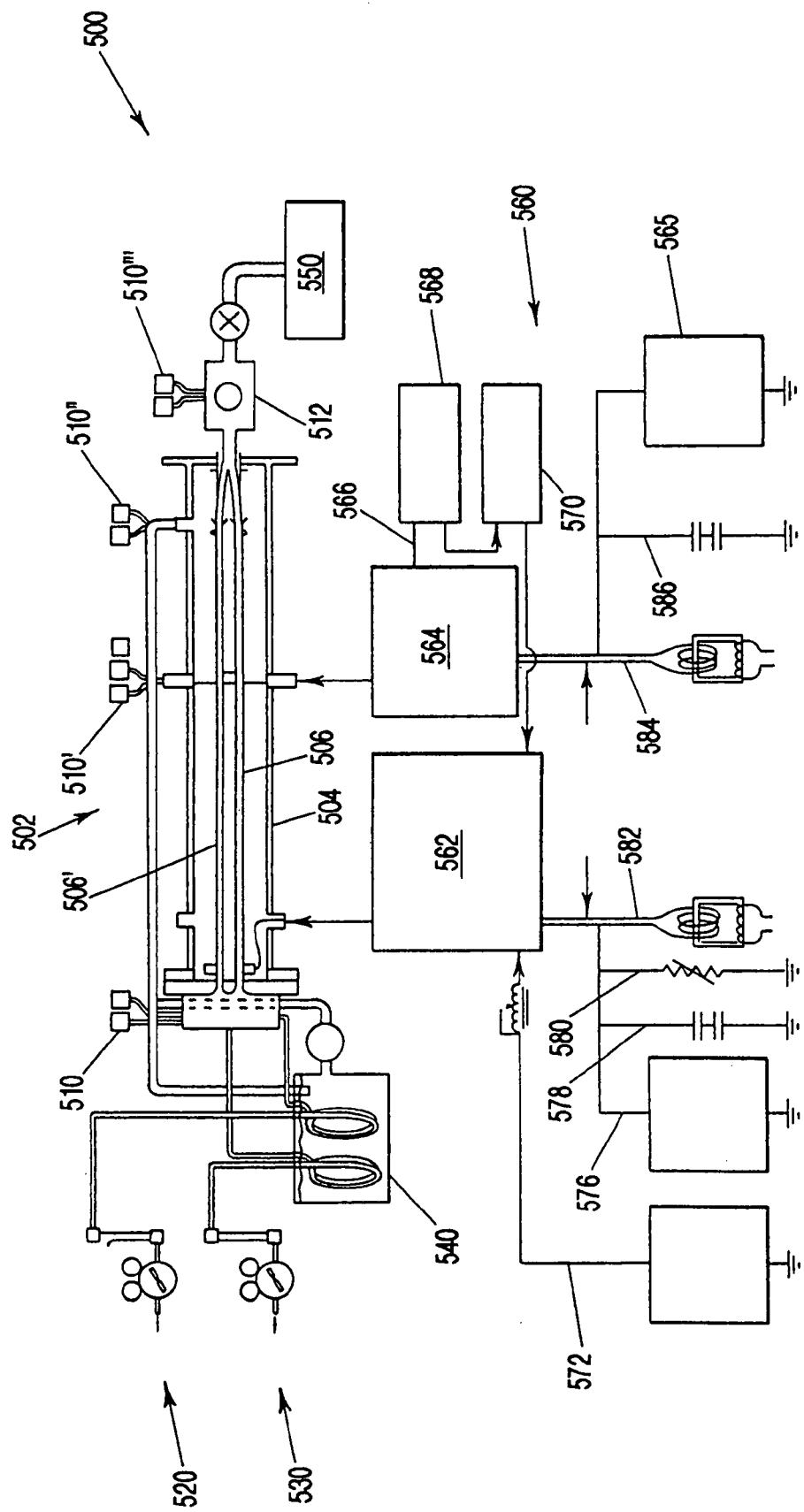
FIG. 12 is a diagrammatic view of a generator embodiment of the present invention.
Figure 13A:
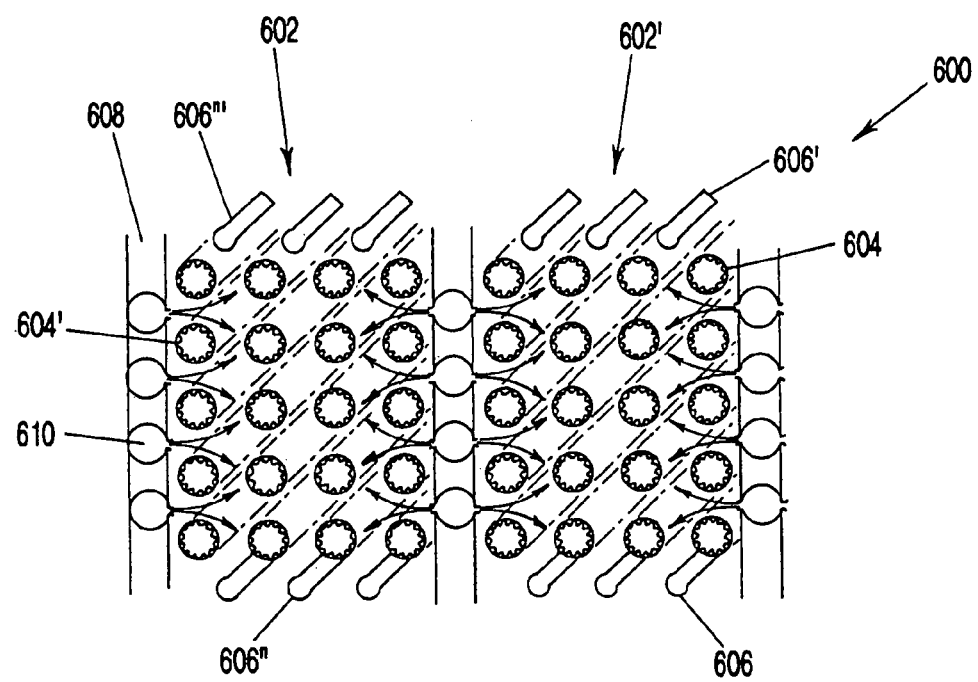
FIG. 13a is a diagrammatic view of a tube bank of a generator embodiment of the present invention.
Figure 13B:
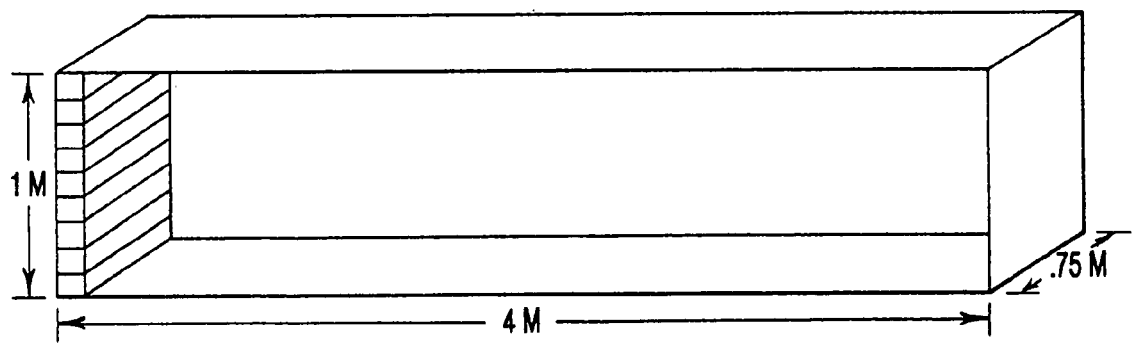

A preferred embodiment of the present invention is shown in FIG. 12. FIG. 12 shows a schematic of a two-tube version of a linear-type, DC-pumped $O_2{}^1\Delta$ generator. Actual operation of this preferred embodiment resulted in $O_2{}^1\Delta$ yields that were more than sufficient for use in an $O_2$-I* laser system. Of course, the number of tubes used in this embodiment is adjustable to generate flow rates needed for a particular laser system. By way of illustration, FIG. 13a shows a "strawman" apparatus for an $O_2{}^1\Delta$ generator configured to power, for example, but not limited to, a 5 MW continuous laser. Further description of the apparatus FIG. 13a is given below. FIG. 6b shows particular dimensions of an embodiment comprising the configuration shown in FIG. 6a.

In reference to FIG. 12, this particular generator embodiment 500 of the present invention comprises a generator with an integral heat exchanger 502. The generator/heat exchanger 502 further comprises, for example, but not limited to, two tubes 506, 506' housed within a shell 504. While two tubes are shown this embodiment is not limited to two tubes and, in general, the embodiment comprises at least one tube. In this particular example, tubes 506, 506' optionally comprise a length of approximately 1 meter, an inner diameter of approximately 1 cm, a material of construction of Be, or other suitable material, and fluting (or other surface indicia, etc.) on the inside to improve heat transfer.

Referring again to FIG. 12, this embodiment further comprises an $O_2$ inlet 520, optionally comprising a flow rate control mechanism, a He inlet 530, optionally comprising a flow rate control mechanism, a gas cooling bath 540, optionally comprising dry ice and/or alcohol(s), and a vacuum pump 550. Of course use of more than one vacuum pump is possible and, for example, but not limited to, such pump(s) is (are) rated individually and/or collectively at a flow rate of approximately 150 CFM. The generator 500 further comprises a variety of measurement/sensor ports and/or devices, known to one of ordinary skill in the art. Such ports and/or devices are shown generally in FIG. 12 (510, 510', 510'', 510''') and comprise, for example, but not limited to, ports and/or devices for measurement and/or sensing of temperature, pressure, optical properties, and the like.

FIG. 12 also depicts electronic circuitry 560 for providing pulses. One type of pulse is provided through circuitry 564, for example, but not limited to, a 50 KV pulse from a circuit comprising at least one vacuum tube. In general, circuitry 564 provides a "jump start" pulse. Circuit 564 further comprises a power supply 565, for example, but not limited to, a 50 KV power supply. Circuit 564 optionally comprises a connection 566, for example, but not limited to, a fiber optic connection, to timing electronics 568. Of course, "wireless" modes of connection, relying on electromagnetic transmission are also within the scope of the present invention. In turn, the timing electronics 568 optionally comprises a connection to a velonix driver 570. The velonix driver optionally comprises a connection to another pulse circuit 562. Pulse circuit 562 provides, for example, but not limited to, an approximately −180 KV pulse with a frequency of approximately 10 to approximately 25 KHz that floats approximately 25 KV above ground. Pulse circuit 562 optionally comprises a thyratron-based circuit. Power is provided to pulse circuit 562 through power supply 572, for example, but not limited to, a −45 KV power supply. Power from power supply 572 passes through command charger 574. The pulse circuit 562 further optionally comprises a DC power supply 576, for example, but not limited to, an approximately 12 KV to approximately 18 KV DC power supply. According to electronic circuitry 560, the pulsers 562, 564 further optionally comprise isolation transformers 582, 584. Such transformers 582, 584 optionally comprise, for example, but not limited to, 50 KV low capacitance isolation transformers. As shown in FIG. 12, the power supply 565 is connected to pulser 564 and further connected to ground, through the power supply and/or through additional circuitry 586, such as, but not limited to, capacitive and/or resistive circuitry. The power supply 576 is connected to pulser 562 and further connected to ground, through the power supply and/or through additional circuitry 578, 580, such as, but not limited to, capacitive and/or resistive circuitry.

The embodiment shown in FIG. 12 further optionally comprises plasma diagnostics, such as, but not limited to, avalanche current, avalanche voltage, pump current and/or pump voltage. The embodiment shown in FIG. 12 further optionally comprises gas diagnostics, such as, but not limited to, pressure, mixture/composition, flow rates, and/or temperatures. The embodiment shown in FIG. 12 further optionally comprises optical diagnostics and/or recorders. An optical diagnostics port 512 is shown in FIG. 12.

In an experimental apparatus according to this embodiment, a two tube generator was used wherein the tubes were submerged in a fluoroinert dielectric liquid bath which was, in turn, maintained at dry ice temperatures, approximately −78.5° C., by means of circulating pumps. Each tube was injected with metastable helium to pre-ionize the gas volume while a predominantly $O_2$ flowstream (with some helium) flowed through the tubes at approximately Mach 0.3 to approximately Mach 0.5.

Operation of this aforementioned system comprises, for example, but not limited to, application of up to approximately 180,000 volt pulses of approximately 30 nanosecond duration that are generated at the rate of approximately 25,000 pulses per second. Application of these pulses created ionization of the gas contained in the tubes. Between pulses, the ionization number density fell by about 15% (the percentage fall is dependent on pressure); however, each succeeding pulse compensated for this loss in number density. The emergent gas flowed through an optical diagnostic cell and into a 150 CFM vacuum pump. The ionizing pulse train floated on top of a pure DC electric field provided by an approximately 3 KV to approximately 5 KV power supply, which produced about 250 mA of current (average) in each tube. The $O_2{}^1\Delta$ yield was spectroscopically determined and exceeded 16% in pressures of several Torr of pure $O_2$. This particular preferred embodiment is a configuration that provides a basis for additional preferred embodiments of laser systems to be discussed.

Figure 14:
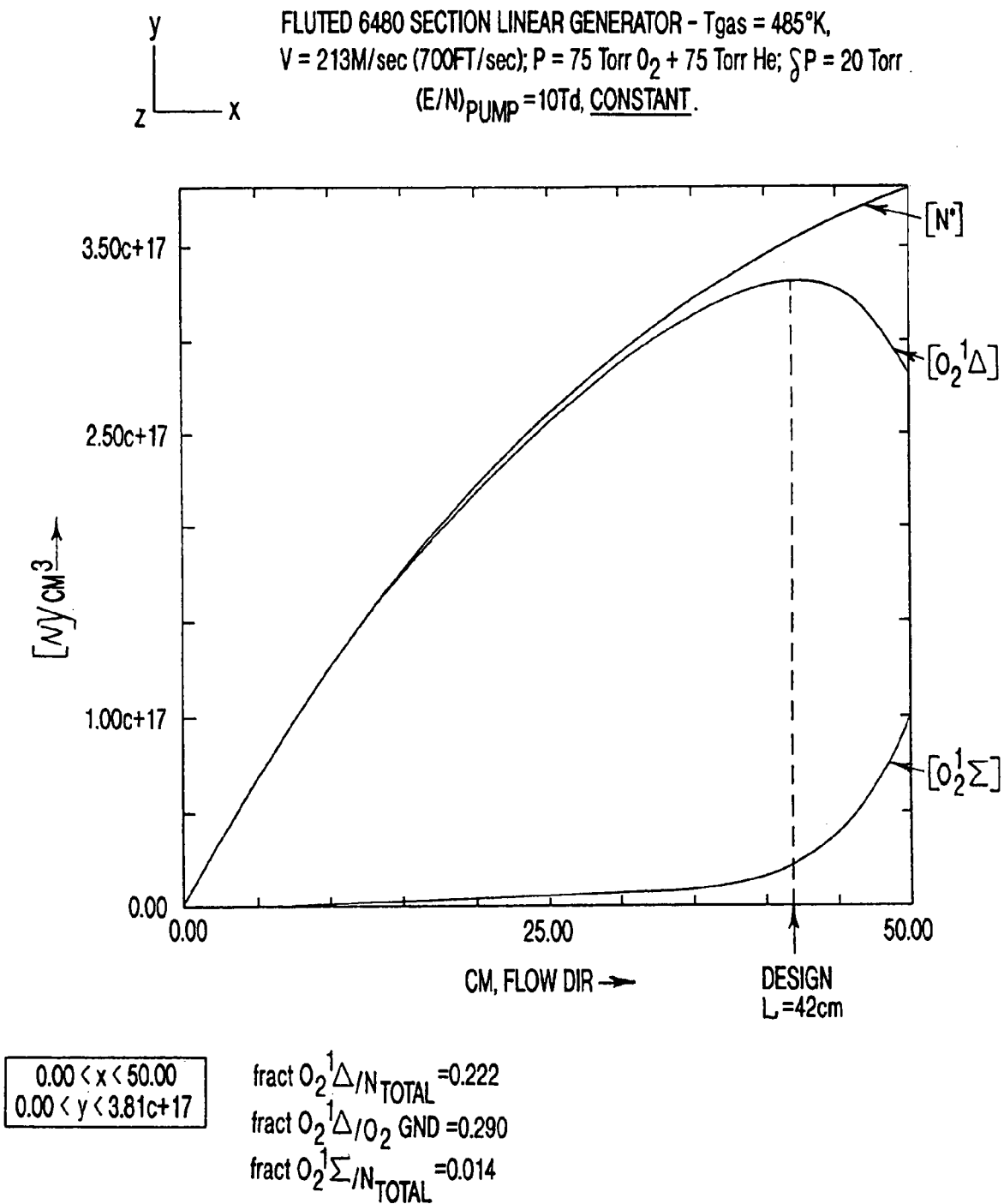
FIG. 14 is a graph of excited oxygen species shown as density versus distance for a particular embodiment of the present invention.

The generation of $O_2{}^1\Delta$, along with other competing processes, has been theoretically calculated along the length of the tubes subject to excitation as described above. The graph of the calculation, FIG. 14, shows that under these conditions the tube will generate its maximum yield of $O_2{}^1\Delta$ if its length is approximately 42 cm. Beyond approximately 42 cm, the "pooling" process causes the creation of $O_2{}^1\Sigma$ to dominate. At 42 cm, the theoretical yield Y (fraction $O_2{}^1\Delta/O_2{}^3\Sigma$) is approximately 29%—a value sufficient to produce superb laser performance. Under differing conditions the optimal length optionally differs; for example, but not limited to, lengths up to and beyond approximately one meter in length are within the scope of the present invention.

Referring to FIG. 13a, a "strawman" apparatus 600 for a $O_2{}^1\Delta$ generator configured to power, for example, but not limited to, a 5 MW continuous laser. As shown, the strawman apparatus 600 further comprises at least one individual bank of plasma tubes 602, 602'. The banks further comprise plasma tubes 604, 604' and current returns 606, 606', 606'', 606'''. Surrounding, or spaced between, each bank 602, 602' is a heat exchange fluid supply 608, 608', 608''.

In summary, preferred embodiments of the present invention comprise an electric oxygen iodine laser that comprises a generator for generating $O_2{}^1\Delta$ wherein the $O_2{}^1\Delta$ generator comprises:

(1) A means for generating low-level, pre-ionization of at least one chemical species—"pre-ionization means." In an aforementioned example, metastable helium was generated using an electric discharge pre-ionization generator, thereafter, the metastable helium was injected into a flowstream. Other means of achieving pre-ionization include: (a) dielectric barrier discharges; (b) photo-ionization; (c) X-ray ionization; (d) electron beam injection; (e) brush-cathode induced "runaway" electrons; (f) microwave; (g) RF induction (capacitively or magnetically induced); and/or (H) a nuclear radiation source;

(2) A means for sustaining a significant level of quasi-continuous ionization, for example, wherein such means comprises generation and application of a rapid sequence of ultrashort, ultrahigh voltage pulses to at least one pre-ionized chemical species—herein referred to as a "pulsing means." Where means for sustaining comprises ultrashort, ultrahigh voltage pulses, pulse magnitude significantly exceeds the arc potential required for creation of an avalanche of ionization to a degree (on the order, for example, but not limited to, of approximately $10^{12}$ to approximately $10^{15}$ electrons/cm$^3$) while pulse duration is sufficiently short as to prevent arc formation and to minimize formation of undesirable excited state oxygen, e.g., the O$^1$D state. Pulse duration, or pulse length, is preferably less than a few tens of nanoseconds, and in all instances, less than approximately 75 nanoseconds, and most preferably less than approximately 15 nanoseconds. In addition the pulse energy is capable of "over-volting" the plasma in its original pre-ionized state to typically an initial E/N of, for example, but not limited to, approximately 150 Td to approximately 180 Td. Following the initial ionization pulse of E/N equal to, for example, but not limited to, approximately 150 Td to approximately 180 Td, subsequent ionization pulses taper off to a lower E/N value of E/N equal to approximately 100 Td to approximately 120 Td in response to an increasing value of electron number density. As a result, the intended average quasi-continuous number density (approximately $10^{12}$ to $10^{15}$ electrons/cm$^3$) is controlled and maintained. The pulser circuit is especially designed to provide the initial 180 Td "jump starter" pulse, then fall off to a suitable, maintained E/N value by means of an interaction between the circuit and the plasma's conductivity which controls the process. Other comparatively short, "over-volted" forms of electrical excitation such as, but not limited to, microwave or RF bursts, may be used as alternatives to or in combination with other pulsing means and/or other sustaining means;

(3) A means of impressing a sub-breakdown voltage of controlled average magnitude or magnitudes. According to the present invention, means of impressing causes current to flow through a region of fluctuating ionization as created by the means for sustaining comprising, for example, the aforementioned pulsing means. Alternatively, a sub-breakdown voltage is magnetically induced as, for example, application of aforementioned square wave energy to maintain an approximately fixed potential through a square wave having alternating polarity. The potential, in either instance, is selected so that E/N falls well below the glow potential and preferably within the range of approximately 7 Td to approximately 10 Td, of course this value is adjustable to account for other system parameters. In preferred embodiments using a controlled "graded" E/N, E/N is continuously varied along the operational path and is a function of O$_2^1$Δ concentration (or O$_2^1$Δ pressure). Several preferred embodiments of the present invention use graded E/N technology. Grading of E/N over system operation allows for, in most instances, optimum efficiency. As mentioned previously, and with reference to FIG. 8, choice of E/N depends on levels of O$_2^1$Δ, whether measured in terms of concentration or pressure. In particular, O$_2^1$Δ levels are monitored (primarily for experimentation) with reference to concentrations and pressures of other chemical species within the system, for example, but not limited to, other oxygen species.

(4) A means of exchanging heat energy is desirable, and in most instances it is required, because the temperature dependence of the pooling rate for O$_2^1$Δ+O$_2^1$Δ→O$_2$Σ+ O$_2^3$Σ, and the very strong temperature dependence of the equilibrium constant for the excitation reaction O$_2^1$Δ+ I→O$_2^3$Σ+I*. Thus, it is imperative that the process be kept as cold as possible and occurs as quickly as possible. Within generators of the present invention, the aforementioned conditions are met by, for example, starting the process very cold, removing the generated heat immediately and flowing the gas through the apparatus as quickly as possible. Within the lasing volume, fast flow rate and cold temperature conditions are simultaneously met by expanding the flow to supersonic velocities.

EXAMPLES

Three specific point design examples of lasers intended for three distinct classes of applications are presented below. All of these examples are based on a linear O$_2^1$Δ generator/ integral heat exchanger concept as illustrated in FIG. 12.

Case I System: Open Cycle, 20 KW Class, Continuous Laser.

This configuration is intended to provide a very compact, light-weight laser for applications where only short-run times are needed but compact packaging concerns are at a premium. Typical applications for such laser systems include fracturing of rocks in mining or well-drilling operations, where field portability is advantageous. In FIG. 15, both side view (top drawing) and top view (bottom drawing) of a Case I System of the present invention are shown. The top view shows only a laser channel, which is common to two other configurations that follow (refer to FIG. 15 for other cases).

Figure 15A:
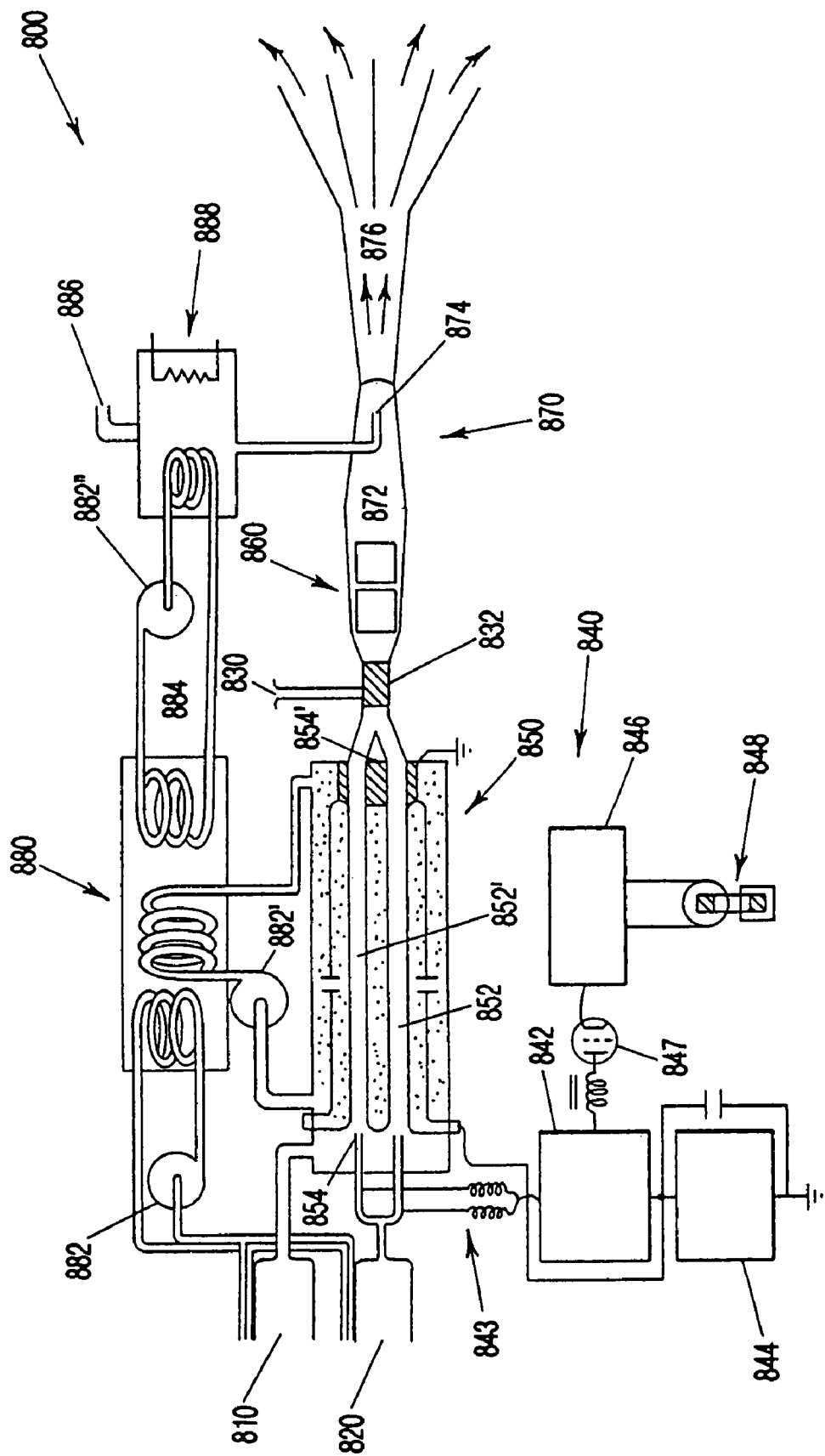
FIG. 15a is a diagrammatic side view of a laser of an embodiment of the present invention.

A laser 800 according to a preferred embodiment of the present invention is shown in FIG. 15a. This open cycle electric oxygen iodine laser 800 comprises an oxygen supply 810, a helium supply 820, an iodine supply 830, a power supply system 840, an O$_2^1$Δ electric generator/heat sink assembly 850, a resonator cavity 860, a supersonic/subsonic diffuser discharge assembly 870 and a heat exchange system 880.

Figure 15B:
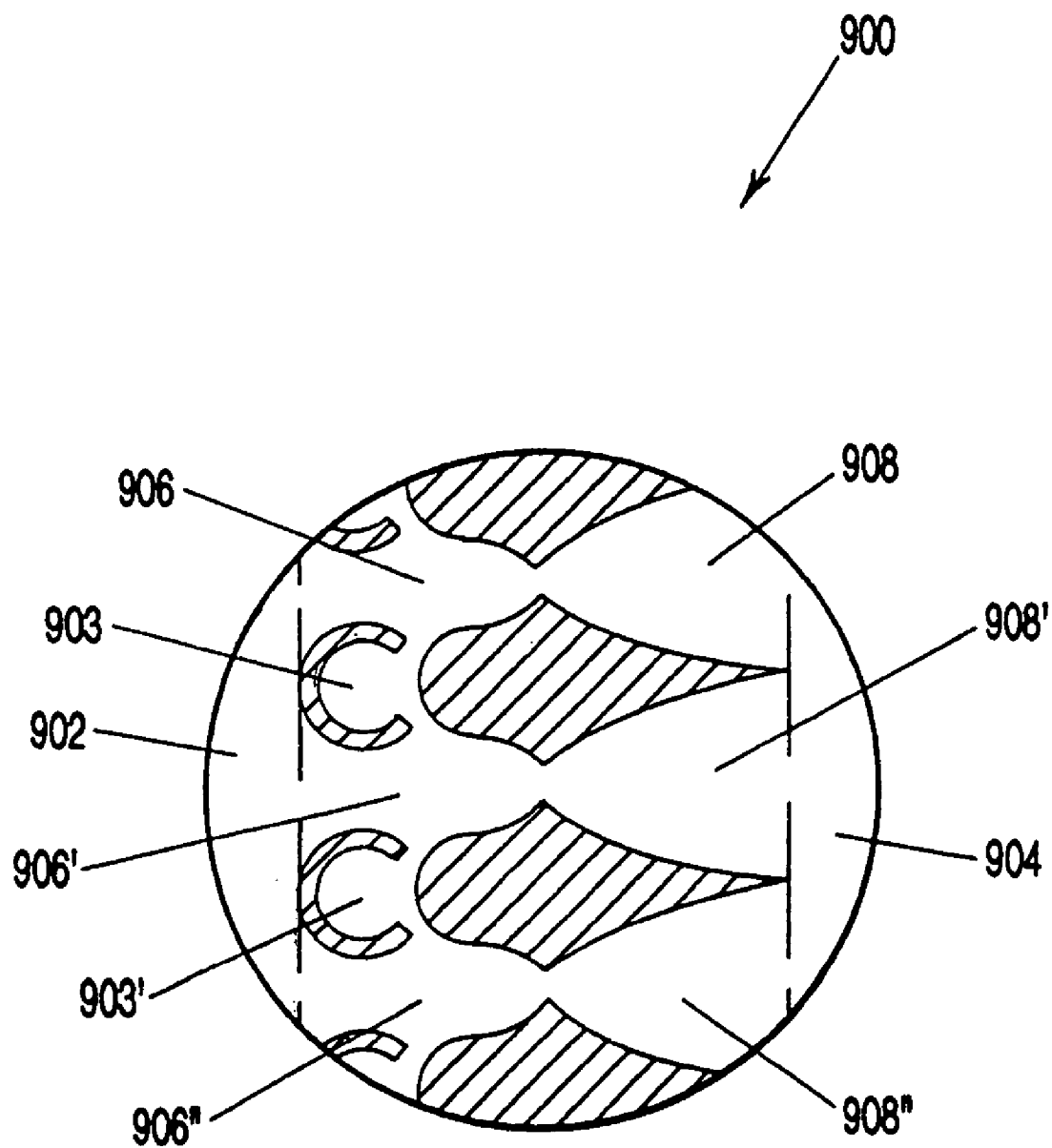
FIG. 15b is a diagrammatic view of an injector block of an embodiment of the present invention.
Figure 15C:
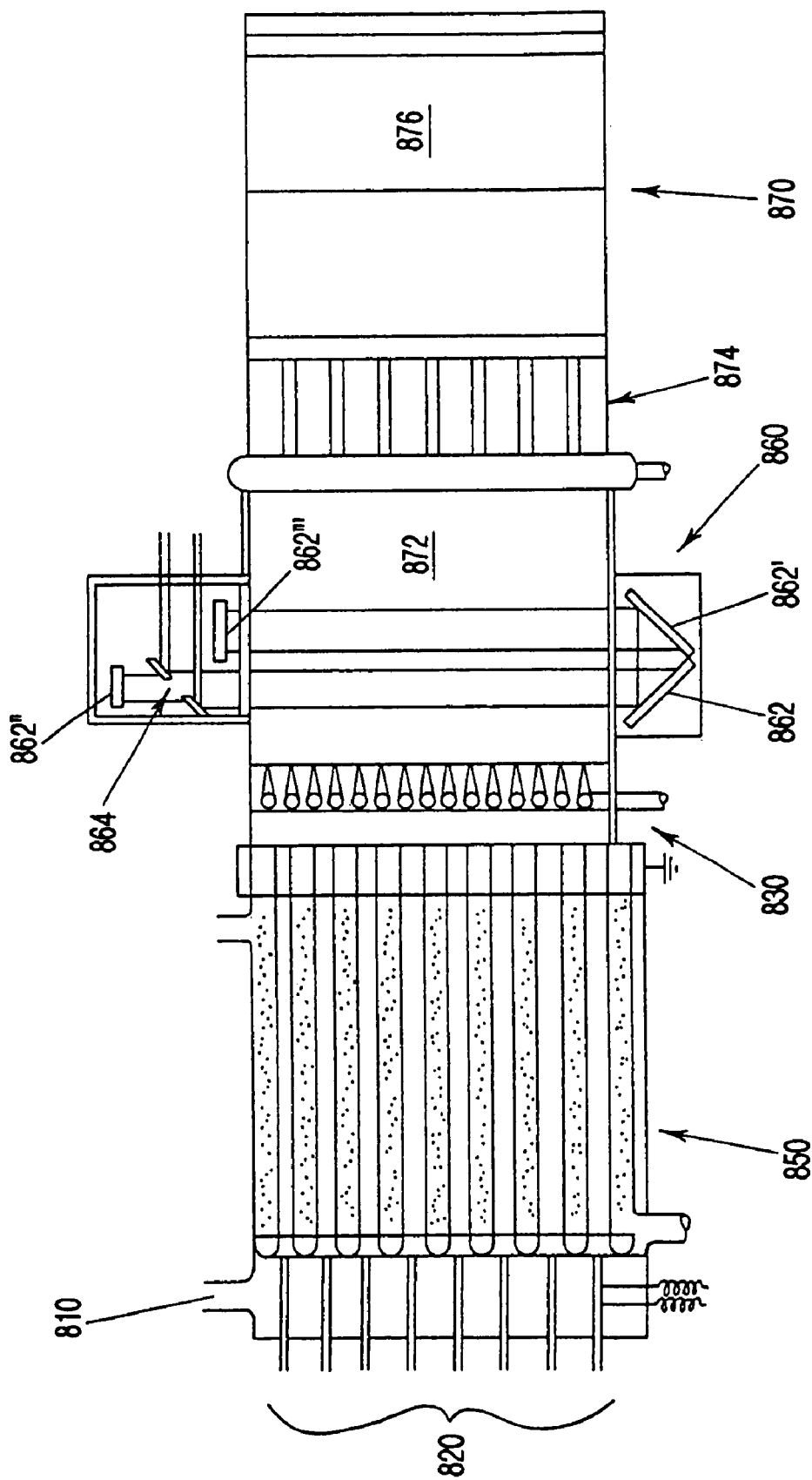

As shown in FIG. 15, the heat exchange system 880 of this embodiment connects to the oxygen and helium supplies 810, 820, the O$_2^1$Δ electric generator/heat sink assembly 850, and the supersonic/subsonic diffuser discharge assembly 870. The heat exchange system 880 further comprises at least one pump for pumping fluid and/or gas 882, 882', 882". The at least one pump provides for circulation of fluid/gas from the O$_2^1$Δ electric generator/heat sink assembly 850 to the heat exchange system 880. In this particular embodiment, the heat exchange system 880 further comprises, as shown, a heat exchange loop 884 for exchanging heat with an ejector gas from an ejector gas supply 886. This subassembly optionally comprises, in lieu of or in addition to the heat exchange loop 884, a thermal energy input 888 to achieve a suitable ejector gas temperature. An ejector gas manifold from the ejector gas supply 886 enters the supersonic/subsonic diffuser at a point upstream 874 from the subsonic portion 876 of the diffuser; however, the ejector gas does not enter the flow stream until approximately the shock region, which is substantially between the supersonic and subsonic regions (as shown more clearly in FIG. 15c below).

The $O_2{}^1\Delta$ electric generator/heat sink assembly 850 of this particular embodiment comprises at least two tubes 852, 852'. Located at opposite ends of the tubes 852, 852' are fore and aft electrodes 854, 854'. This particular embodiment is optionally configured with a fore cathode or anode and an aft anode or cathode, respectively, for purposes of discharging a direct or alternating current at sub-breakdown field strength into the plasma. In either instance, metastable helium is formed at or near the fore electrode, for which the fore electrode comprises a cathode, regardless of whether it comprises a cathode or anode for purposes of providing seed volume ionization from which to initiate an avalanche. Of course for low pressure operation and other types of operation, the invention does not have to rely on this particular apparatus or method of forming metastable helium. Other methods and apparatus for providing seed volume ionization are within the scope of the present invention and known to those of ordinary skill in the art.

The power supply system 840 comprises a floating, high repetition, nanosecond, high voltage pulser 842, a DC power supply 844, power conditioning electronics 846, a high voltage isolated power transformer 848, a command charger 847 and appropriate leads 843 to the $O_2{}^1\Delta$ electric generator/heat sink assembly 850. The command charger 847 is positioned between the power conditioning electronics 846 and the floating, high repetition, nanosecond, high voltage pulser 842. The high voltage isolated power transformer 848 is connected to the power conditioning electronics 846.

The laser beam is produced at the resonator 860, which in this particular embodiment comprises a two-pass unstable resonator cavity, shown in an end view in FIG. 15. The resonator 860 is positioned after an iodine injector 832 and before the supersonic diffuser 872. In this particular embodiment, the iodine injector 832 comprises a supersonic nozzle block, which a particular embodiment thereof is described in further detail below.

The iodine injector 832 shown in FIG. 15a comprises a supersonic nozzle block. A close-up of this block 900 is shown in FIG. 15b. This block comprises an inlet side 902 and an outlet side 904. Gases in subsonic flow enter the inlet side 902, mix with iodine, and optionally a combination of helium and iodine, supplied through iodine injection ports 903, 903', in a mixing region 906, 906', 906". This mixture of gases expands in the supersonic expansion region 908, 908', 908" to achieve supersonic flow. In a particular embodiment of the invention, gas leaving the supersonic nozzle block comprises a velocity of approximately Mach 2.5 to approximately Mach 3.0. The gas further optionally comprises a temperature of approximately 112 K or lower. The basic principles of the supersonic nozzle block of FIG. 15b are known to those in the art of COIL lasers.

FIG. 15c shows a top view of the inventive apparatus of FIG. 15a. In this view of this particular laser embodiment 800, the oxygen supply 810, the helium supply 820, the iodine supply 830, the $O_2{}^1\Delta$ electric generator/heat sink assembly 850, the resonator cavity 860, and the supersonic/subsonic diffuser discharge assembly 870 are shown. The resonator cavity 860 further comprises a plurality of resonator mirrors 862, 862', 862", 862'''. The resonator cavity additionally comprises at least one laser beam output coupler 864. This mirror optionally comprises an annulus for output of an annular laser beam, if used in conjunction with an unstable resonator, or a partially transmitting and partially reflecting optical element, if used in conjunction with a stable resonator.

In a Case I System, all laser gases pass through the channel only once (open cycle) and must be stored in a quantity sufficient to cover a particular application or mission. Storage of gases in cryogenic form provides a means of cooling, or exchanging heat energy, with the system and, in turn, heat energy absorbed into cryogens causes a change to a gaseous state and vaporization.

In a Case I System, a $O_2{}^1\Delta$ generator of the present invention consisting of, for example, but not limited to, approximately 80 tubes, each approximately 42 cm long (longer tubes, for example, but not limited to approximately one meter in length or longer are also within the scope of the present invention), produces an oxygen flow rate that is sufficient to power a 20 KW laser. The generator, in turn, comprises a pre-ionization means and a means for sustaining quasi-continuous ionization by the same kind of pulsers and power supplies described for the 2 tube experimental generator of FIG. 12. The physical operating conditions for this laser are summarized below.

Physical Operating Conditions for 20 KW Electric Oxygen Iodine Laser

Minimum Yield (Y)=0.16, $T_{cav}$=112 K Case
Resonator:
$\alpha_o$=0.0074, Mag=1.4 Resonator, L=3 meters total path
Scaled from ROTOCOIL according to:

$$\alpha_o \approx \left(1 - \left(\frac{1}{2K_{eq}+1}\right)\left(\frac{1}{Y}\right)\right)$$

Lumped Mirror Losses: $r_1, r_2$=0.998, $|\gamma|_{max}^2 = 1-\delta \approx 0.75$ $$\eta_{ext} = \eta_o \eta_s$$
$$= \frac{\ln(|\gamma|^2 r_1 r_2)}{2\langle\alpha_o L\rangle} + 1 + (2 - r_1 - r_2) \times \left[\frac{1}{\langle 2\alpha_o L\rangle} + \frac{1}{\ln(|\gamma|^2 r_1 r_2)}\right]$$
$$= 0.92$$

Kinetics:

$$\eta_{kin} = \frac{Y - \left(\frac{1}{2K_{eq}+1}\right)}{Y} = 0.888$$

where:

$$K_{eq} = 0.75 \times e^{402/112} = 27.16$$

$$Y = \frac{|O_2^1\Delta|}{|O_2^1\Delta| + |O_2^3\Sigma|} = 0.16$$

Power Output = 20 KW
Power Available = $P_{out} / (\eta_o \eta_s \eta_{pack} \times \eta_{kin})$
$\quad = 20\,\text{KW}/(0.92 \times 0.9 \times 0.888)$
$\quad = 27.2$ KW Stored Power $$P_{stored} = \dot{M}_{(moles/sec)} \times \left(Y - \left(\frac{1}{2K_{eq}+1}\right)\right) \times 91.3 KJ/\text{mole}$$

$$\dot{M} = \frac{27.2\,KW_{stored}}{(0.16 - 0.018) \times 91.3 KJ/\text{mole}} \cong 2.1 \text{ moles/sec}$$

Summary of 20 KW Laser
  Input Parameters:
    M=2.5 Flow
    $T_{cav}$=112 K
    $K_{eq}$=27.16
    M≅2.1 mole/s $O_2$ (+2.1 mole/sHe+0.02–0.04 mole/sI,)
    $P_{gen}$≅25 Torr$O_{2+25}$ Torr He
    $P_{cav}$≅5 Torr, Total
    Y=0.16, fraction $O_2^1\Sigma$=0.018
  Output Parameters:
    Power Out=20 KW
    $P_{stored}$≅=27.2 KW
    $\eta_{next}$≅0.92
    $\eta_{pack}$≅0.9 (assumed)
    $\eta_{kin}$≅0.888
    $\alpha_o$≅0.0072
    Mag 1.4 Res approximately 2 times diffusion limit Power Requirements

| I. Power Required to Drive Laser | |
| --- | --- |
| Plasma Ionization | 28 KW |
| Electric Pump Excitation | 140 KW |
| Gas Re-Circulation | 20 KW |
| Auxiliary Systems | 40 KW |
| Power Conditioning Losses (includes electrode losses) | 26 KW |
| Laser Power Requirements, subtotal* | 254 KW |
| Laser Wall Plug Efficiency (less cooling subsystems) | 8% |
| II. Power Required to Reject Heat For Closed Cycle Operation (if electrically refrigerated) | |
| Power Added to Reject 40 KW at +20° C. | 40 KW |
| Power Added to Reject 114 KW at −20° C. | 130 KW |
| Thermal Management Subtotal | 170 KW |
| Total System wall Plug efficiency (electrically refrigerated) | 4.7% |

*Assumes worst case performance estimates, and that all heat is exhausted into ambient air (no "cooling tower").
Specifically assumes:
Fraction $O_2^1\Delta$ generated    17.8%
Fraction $O_2^1\Delta$ lost to cooling    1.8%
Fraction $O_2^1\Delta$ reaching output of generator    16%
Efficiency of $O_2^1\Delta$ generation at 10.5% concentration    22%
Total kinetic energy in flow stream    30 KW
Pump power needed to generate 30 KW excited species    140 KW
Note that "II. Power Required to Reject Heat for Closed Cycle Operation" is also useful in describing open-cycle operation, wherein dynamic gas expansion from a source to the generator and/or cryogens are optionally used to maintain temperature.
Note that all of the numbers and calculations shown are for illustration of various embodiments of the present invention and do not limit the scope
of the invention.

As shown, subsequent to the oxygen plus helium (or, e.g., argon) buffer gas passing through the $O_2^1\Delta$'s generator structure, iodine vapor carried by a buffer gas (e.g., helium) is injected into the flow channel. Immediately past the mixing region, the flowstream is expanded to a flow velocity of Mach 2.5 where cooling occurs, to approximately 112 K at the resonator. The cavity is 1 m wide, utilizes a 2 pass transverse unstable resonator, which produces a 2 times diffraction-limited beam at approximately 20 KW. About 200 KW of electrical power is supplied to the system, and approximately 2.1 moles $O_2$ plus approximately 2.1 moles He are stored for each second of operation.

Although design calculations were based on 20 KW operation, the technology of a Case I System is scalable up or down as needed. In fact, the results presented above were based on $O_2^1\Delta$ yield measurements that are approximately a factor of two less than a realistically achievable, optimal yield. Therefore, a most optimistic scenario achieves 40 KW average power output from the same Case I System without need for further power input.

Case II System: 20 KW Average Power-Class, Closed-Cycle, Continuously Operational Laser.

This system employs the same basic cavity and operational specifications as a Case I System, except that it operates (nearly) closed cycle, so that laser gas make-up rates are relatively inconsequential. This responds to the requirements for a typical heavy-metal working industrial laser and results in a package which very closely resembles a 20 KW, $CO_2$ laser in terms of efficiency gas make-up and cost per watt; however, a Case II System of the present invention makes much narrower cuts, can cut up to ten times deeper, and nearly ten times faster than its $CO_2$ laser counterpart. FIG. 16 illustrates an embodiment of a Case II System showing how the gas flow loop is nearly closed.

Case II laser systems are truck-mountable and field operational, thereby enabling the disassembly of 12 inch-thick steel nuclear reactor vessels and centrifuges for which the U.S. Department of Energy has a most pressing need. Ships, tanks, and many other heavy manufacture operations are foreseen target users of Case II System embodiments of the present invention.

Referring to FIG. 16, a closed-cycle embodiment of a laser system 920 of the present invention is shown. This laser system 920 comprises a generator/heat exchanger 922; a power supply system 924 that comprises a floating, nano-second, high voltage pulser and a DC power supply; a gas return flow loop 930 and an iodine vapor-He return loop 950. The gas return flow loop 930 further comprises at least two heat exchangers 932, 932' (optionally comprising a chiller, see element 932'); a roots blower 934; a slow flush vacuum pump 936; and a make-up oxygen supply 938. The iodine vapor-He return loop 950 further comprises a helium supply 952 and a heat exchanger 954 that optionally comprises a heater.

Referring again to FIG. 16, a Roots blower pump 934 is used to recompress gases emerging from the subsonic diffuser 960, after which the heat introduced by the pump is removed by a heat exchanger 932', and the flowstream is reintroduced to the electric $O_2^1\Delta$ generator 922. This particular Case II System resembles a $CO_2$ laser system; however, with a unique need for handling recycle of iodine 950. In a preferred embodiment of a Case II System, Iodine vapor (carried by heated helium) must be injected just upstream of the supersonic nozzles 956 and removed from the flowstream before the flow reenters the $O_2^1\Delta$ generator 922. Hence, this particular Case II System requires two separate flow loops 930, 950, one for the bulk of the gas and another for a relatively small amount of iodine (amounting to approximately less than 1% of the net flowstream). Where buffer gas is used, the gas comprises oxygen species, buffer (e.g., He and/or Ar) and iodine species.

In the aforementioned Case II System, gaseous iodine is "frozen out" on a cooled structure, i.e., a condenser/heat exchanger, 932' downstream of the subsonic diffuser 960, as illustrated in FIG. 16. Solid state iodine resides in crystalline form solidified on the condenser's 932' extensive surface area. After a period of time, for example, a few hours operation, the condenser's surface becomes saturated. The saturated condenser surface is then moved into a second position 954 where it is heated thereby subliming and liberating the solidified 12 as vapor, which, in turn, re-enters the mixing nozzles. In preferred embodiments of a Case II System, there are at least two identical condensers 932', 954, at least one for condensing 12 vapor from the system 932' and at least one for subliming 12 solid for re-entry to the system 954 as vapor. As shown in FIG. 16, interchange of surfaces and/or condenser structures requires a downtime of, for example, a few minutes, every several hours; however, the interchange operation is fully automatable.

Case II Systems, as noted for $CO_2$ laser systems, do not operate as a completely closed-cycle: some exchange of gas is required. For Case II Systems, heated helium gas 952 must be injected to carry the iodine and a correspondingly small amount of laser gas must be pumped out of the system. This process disturbs the helium/oxygen ratio thereby requiring introduction of additional "make-up" oxygen 938 to maintain a proper balance. Hence, the system is not completely closed, but the make-up rates are tolerable and practical for the aforementioned applications.

In addition to powering the Roots blower 934, a formidable amount of energy must be spent to cool the $O_2^1\Delta$ generator 922. The power drain attributable to cooling is comparatively negligible because the laser per se is very efficient. For example, refer to the numbers presented in FIG. 14 and above as indicators of the comparative power requirements. Calculations for Case II Systems indicate that an overall efficiency of 5% is achievable—an efficiency comparable to that of a $CO_2$ laser system when one accounts for the costs of gas circulation, laser cooling, chilled water requirements, etc.

Case III: High Repetition, Pulsed, 150 KW Average Power, Approximately 200 Joules/Pulse (200 Megawatts Peak), Closed-Cycle Laser.

This particular embodiment of the present invention is intended to address applications such as, but not limited to: (1) nudging space debris out of orbit so that it burns up in the atmosphere; or nudging comets or asteroids repeatedly to gradually divert their path so that they miss striking the earth. Scaled-up Case III laser systems could also play a role in generating controlled nuclear fusion power or propelling rockets and/or satellites into space.

For purposes of this discussion, the calculated parameters for a Case III System appear below.

150 KW Ave. 200 J/Pulse Closed Cycle Electric Oxygen Iodine Laser

Minimum Yield (Y)=0.16 (assumed), Cavity Mach=2.5, $T_{cav}$=100 K Case

Resonator:

$\alpha_o$=0.002, $I_{sat}$≅1440 W/cm², L=600 cm, folded, Mag=1.4 Resonator $\alpha_o$ scaled from ROTOCOIL data according to:

$$\alpha_o \approx \left(1 - \left(\frac{1}{2K_{eq}}\right) \times \left(\frac{|O_2^3\Sigma|}{|O_2^1\Delta|}\right)\right) \frac{Y}{Y_{RC}}$$

$I_{sat}$ scaled from ROTOCOIL data, according to $I_s \approx \rho V_{cav}$
Lumped Mirror Losses: $r_1, r_2$=0.998, $|\gamma|_{max}^2$=1−δ≈0.75;

$\eta_{ext} = \eta_{opt}\eta_{sat} =$ $$1 + \frac{\ln(|\gamma|^2 r_1 r_2)}{2\langle\alpha_o L\rangle} + (2 - r_1 - r_2) \times \left[\frac{1}{\langle 2\alpha_o L\rangle} + \frac{1}{\ln(|\gamma|^2 r_1 r_2)}\right] = 0.87$$

Kinetics:

$$\eta_{kin} = 1 - \left(\frac{1}{\left(\frac{O_2^1\Delta}{O_2\text{total} - O_2^1\Sigma}\right)(2K_{eq} + 1)}\right) = 0.90$$

where:

$$\dot{M}\left(Y - \left(\frac{O_2\text{total} - O_2^1\Sigma}{O_2\text{tot}}\right) \times \left(\frac{1}{2K_{eq} + 1}\right)\right) \times 91.7 = 430 \text{ KW}$$

Continuous Wave Power Available from Flowstream Equals:

$$K_{eq} = 0.75 e^{\frac{402}{T_x}} = 31, T_c = 108K$$

Sanity Check: $\int\int\int\alpha_o I_{sat}dV$=696 KW (deviation probably due to scaling of $I_{sat}$).

Energy per pulse out=(334 J/pulse)×($\eta_{opt}\eta_{sat}$)×$\eta_{kin}$× $\eta_{kin}$334×(0.87)×0.9×0.9=235 J/pulse Number Cavity Exchange Rate=1290
Maximum Available Power Out=300 KW
Practical Available Power:
  for 2 exchanges per pulse—650 pps=153 KW
  for 3 exchanges per pulse—430 pps=100 KW Power Requirements: (33% Duty Cycle)

| | |
|---|---|
| Electrical Efficiency of Generator | 20% |
| Pooling Loss, Efficiency | 90% |
| Threshold Efficiency | 90% |
| Energy in Flow (100% Duty) | 430 KW |
| Pump Power | 700 KW |
| Continuous Avalanche Pre-Ionization | 100 KW |
| Cathode/Anode Loss | 15 KW |
| Auxiliary Systems | 33 KW |
| Prime Mover | 380 KW |
| Refrigeration | 700 KW |
| Power Conditioning | 200 KW |
| Total | 2128 KW |

Prime Mover/Gas Requirements:

approximately 400,000 CFM
10 Torr Inlet
δP = 10 Torr
$O_2$ Flow: 32 moles/s
He Flow: 32 moles/s
Make up:
Plug Efficiency at 3 exchange/pulse: 100/2128 = 4.7%

In particular, the feasibility of extracting giant pulses at a sufficient rep rate to enable the aforementioned types of applications is demonstrated.

A preferred embodiment of a Case III System comprises a closed-cycle, supersonically flowing, cavity configuration incorporating transverse optical extraction from an "unstable resonator." This embodiment comprises continuous pumping from a linear integral heat exchanger $O_2^1\Delta$ generator, followed by iodine vapor (plus, e.g., buffer) injection—then supersonic expansion. Lasing is retarded while excited gas fills the cavity by means of applying a "permanent" magnetic field that causes Zeeman-splitting of laser transitions states. Once the cavity is filled and acoustical disturbances have settled out, at least one Helmholz coil is electrically pulsed to nullify the permanent magnetic field. Through pulsed nullification of the permanent field and the resulting formation of spontaneous noise, the resonator builds a laser beam within several microseconds. Alternatively, a regenerative amplifier replaces the aforementioned unstable resonator. If pre-seeded from a local oscillator, this alternative system will provide much shorter pulses. Gordon D. Hager at Phillips Laboratory, Kirtland Air Force Base, USA, has reduced the Zeeman splitting method of Q-switching to practice. See, e.g., "Demonstration of a repetitively pulsed magnetically gain-switched chemical oxygen iodine laser," Hager et al., Chem. Phys. Letters., Vol. 204, No. 5, 6, pp. 420–429 (1993). The Zeeman splitting and Q-switching methods and apparatuses of Hager are hereby incorporated by reference.

There are some particular constraints that are driven by the nature of the technology, and the nature of the mission. For example, the laser's cavity must operate at low temperatures, for example, approximately 100 K is a preferred operating temperature, and the cost of conventional refrigeration reduces overall economy. Hence, supersonic flow provides the most practical way of reducing the cavity temperature. Also, hundreds of joules (perhaps kilojoules) must be extracted in each pulse, so the cavity must be large enough to store this energy. A large cavity combined with supersonic flow translates to seemingly high volumetric flow rates (approximately 480,000 CFM for the case presented); however, the pressure is low and therefore the prime-mover power amounts to a much smaller fraction of the total system power than normally encountered with high average power lasers; i.e., only 10% of the total system power is consumed by the prime mover for this "strawman" design if it were to run either CW or at full average power in the pulsed mode. Acoustic settling times may preclude pulsing the flow once per cavity exchange (which would deliver 225 KW average); however, operating at 2 to 3 cavity exchanges per pulse maintains an overall efficiency as high as approximately 5.5% or 4.5%, respectively. Under such circumstances, 230 joule pulses are extractable from the particular cavity analyzed.

Naturally, if the system is to operate continuously at a repetition rate falling between 430 and 660 pps, closed-cycle operation is greatly preferred. And for closed-cycle operation, the most severe energy penalty becomes the matter of removing waste heat. Half of the waste heat (approximately 1 MW) is efficiently carried off by water at room temperature, but an additional approximately 1 MW must be removed at reduced temperatures (−30° F.). Removal of additional waste heat will cost at a minimum 1 MW of electric power to drive, for example, a refrigerative heat exchanger. The remaining thermal task—that of maintaining approximately 110° K within the cavity—is accomplished by supersonic expansion. This thermal energy burden, in addition to the prime-mover power requirements, was included in the derivation of the 5% wall plug efficiency factor. Again, in terms of efficiency, the systems of the present invention rival $CO_2$ laser systems.

Regarding yield, or fraction of $O_2^1\Delta$, achievable by the lab generator used in several of the aforementioned examples, lab measurements indicate a yield of at least approximately 16%—the "strawman" design and calculations are based on this value. Theoretically, more than twice this yield is expected (i.e., approximately 32%), and in fact, high yields were measured on several occasions; however, these higher values were not measured repeatedly with statistical accuracy in mind. Additionally, a known artifact in lower measurements accounts for the possible anomaly of low yield measurements. Therefore, operation of the present invention can conservatively provide yields of at least 16%. Ultimately, higher yields will have a very positive impact in many ways, resulting in: a smaller system size; a higher pulse energy; a shorter cavity resonator for a given power level (owing to higher gain); a higher efficiency; less severe refrigeration/cooling requirements; and potentially subsonic operation for certain missions.

The aforementioned "strawman" designs assume that generator pressure is doubled over the levels demonstrated because it is theoretically and potentially achievable. If not achievable, the pulsed energy storage is halved. On the other hand, if the generator pressure is doubled again (which is quite probable), the pulse energy density doubles.

Finally, the prime-mover power requirement was based on an assumed diffuser recovery factor of 50%. Because there is a small, but yet unquantified, heat release in the supersonic flowstream due to the thermalization of energy stored in $O_2^1\Delta$, the diffuser operation is potentially adversely affected. This may potentially double the prime-mover power requirement resulting in an overall efficiency reduction from approximately 5% to approximately 4%.

Pulser Circuits and Generator Examples

Specifically it is the function of the "controlled avalanche" or pulser circuit to provide and sustain a quasi-continuous level of ionization within the $O_2^1\Delta$ generator needed to conduct current during the off periods between the pulses it generates. Regarding ionization, information disclosed in "Continuous Uniform Excitation of Medium Pressure $CO_2$ Laser Plasma by Means of Controlled Avalanche Ionization," Alan Hill, Applied Phys. Letters 22(12), 15 Jun. 1973 is relevant to this point; however, such technology was not previously applied to generation of atomically excited molecular species. This article is incorporated herein by reference. This current, in turn, is driven by the application of a second, DC potential (or equivalent) whose magnitude is of a specified value falling well below that value needed to contribute to the ionization process.

In addition to providing a continuous stream of pulses that sustain ionization, it may also provide an associated string of pulses used to generate pre-ionization or equivalently metastable helium in chambers that lie upstream of the main discharge sections. Such pre-ionization would float on top of the primary "controlled avalanche" pulses, with the controlled avalanche pulses perhaps being delayed slightly with respect to the pre-ionization pulses. (There are a number of methods, previously outlined, for generating the pre-ionization.)

For the case of the preferred embodiment, the controlled avalanche pulser—together with its pre-ionization complement—floats on top of a pure DC potential whose function is to provide the pump current under a temporally steady (although perhaps spatially graded) electric field of the order E/N=10 Td.

Finally it is the function of either this pulser or an associated pulser to provide a single, giant pulse at turn-on in order to produce the ultimate, quasi-steady-state level within a few pulse periods. This one-time intermediate "jump start" process negates the need to supply every pulse at an E/N value of approximately 180 Td. Instead, we provide only the fast pulse at the value of approximately 180 Td, then allow the quasi-continuous pulser circuit to settle down to its ionization maintenance level, which under the conditions of residual ionization (at its start) most probably falls between the value E/N=80 Td and E/N=120 Td (depending on the design level of electron number density, ionization rep rate, pressure, and gas mixture).

The pulser's circuit is designed to interact with the plasma's conductivity, such that its applied potential falls below the value of E/N required to sustain an avalanche as the peak sustained current (correspondingly the electron number density) reaches its design level. Thus, the controlled avalanche pulse potential across the discharge falls well below its impedance-matched potential value in a time much shorter than its impedance-matched, pulse-forming network's time period, as a result of the load impedance having fallen well below the network's impedance at the design point of peak plasma conductivity.

The specific requirements of the controlled avalanche pulser are:

(1) To provide a pulse sequence, wherein each pulse rises to an E/N value of ~180 Td under open circuit conditions (at 50 Torr-Amagat discharge conditions, the corresponding potential may typically reach 180 KW).

(2) Under residual ionization conditions, where the ionization level has decayed to its minimum value following the off period of the pulser and at the onset of the next pulse, the E/N value is clamped to a value of ~80 Td to ~120 Td (according to adjustment of circuit parameters).

(3) Upon completion of the avalanche needed to restore lost ionization to maintain the correct mean level of ionization, the E/N value must, by interaction with the current, have fallen to a level insufficient to contribute to further ionization—typically less than 40 Td.

(4) The rise time of the controlled avalanche pulse is less than 30 nanoseconds, but preferably less than 15 nanoseconds, and most preferably less than 5 nanoseconds.

(5) The impedance-matched pulse width is to be less than 75 nanoseconds, but preferably less than 30 nanoseconds, and most preferably less than 15 nanoseconds, provided that the rise time can be achieved on the order of 5 nanoseconds.

(6) The "jump start" pulse should be capable of sustaining current flow at the voltage corresponding to a plasma E/N of ~150 Td to ~180 Td or more, and at a current level characteristic of the controlled avalanche pulser impedance operating into a matched impedance load.

(7) The rep rate is to be adjustable and must equal or exceed 20,000 pulses per second continuously, and the pulses must be triggerable on demand.

However, in order to excite the highest density flow stream which may reach 150 Torr-Amagat for the case of ionizing very high-powered lasers, the method may require pulsing at higher repetition rates than may be derived by a single controlled avalanche pulser. This is because the ionization loss rate increases with increasing density. In such cases, the rep rate obtainable from a single pulser may be doubled, tripled, or even quadrupled to as much as 100,000 pulses per second, simply by interleaving the pulses from 2, 3, or 4 modules which individually operate at 20,000 to 25,000 pulses per second and function according to the aforementioned specifications. Each of the units must be appropriately synchronized and time-delayed with regard to each other. Then, the 2, 3, or 4 individual pulse trains are simply added.

Example of Pulser Circuit

The design of a controlled avalanche circuit depends on, for example, the power range of a particular laser. The example presented below is suitable for an approximately 20 KW continuous power laser. In general, the design principles of this example are suitable for lasers of average power falling between approximately 5 KW and approximately 150 KW.

Figure 17:
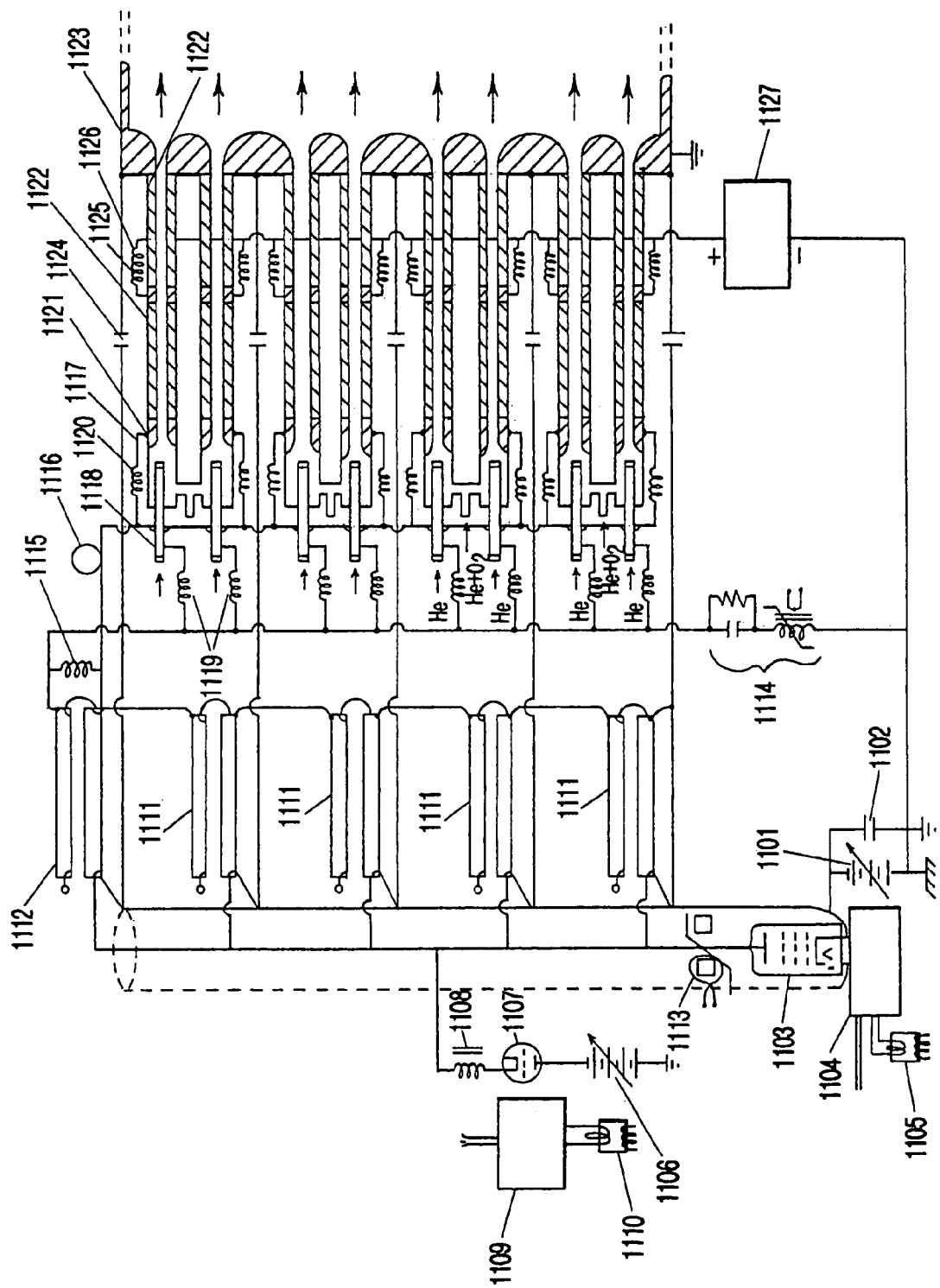
FIG. 17 is a diagrammatic view of a pulser circuit and generator according to an embodiment of the present invention.
Figure 18:
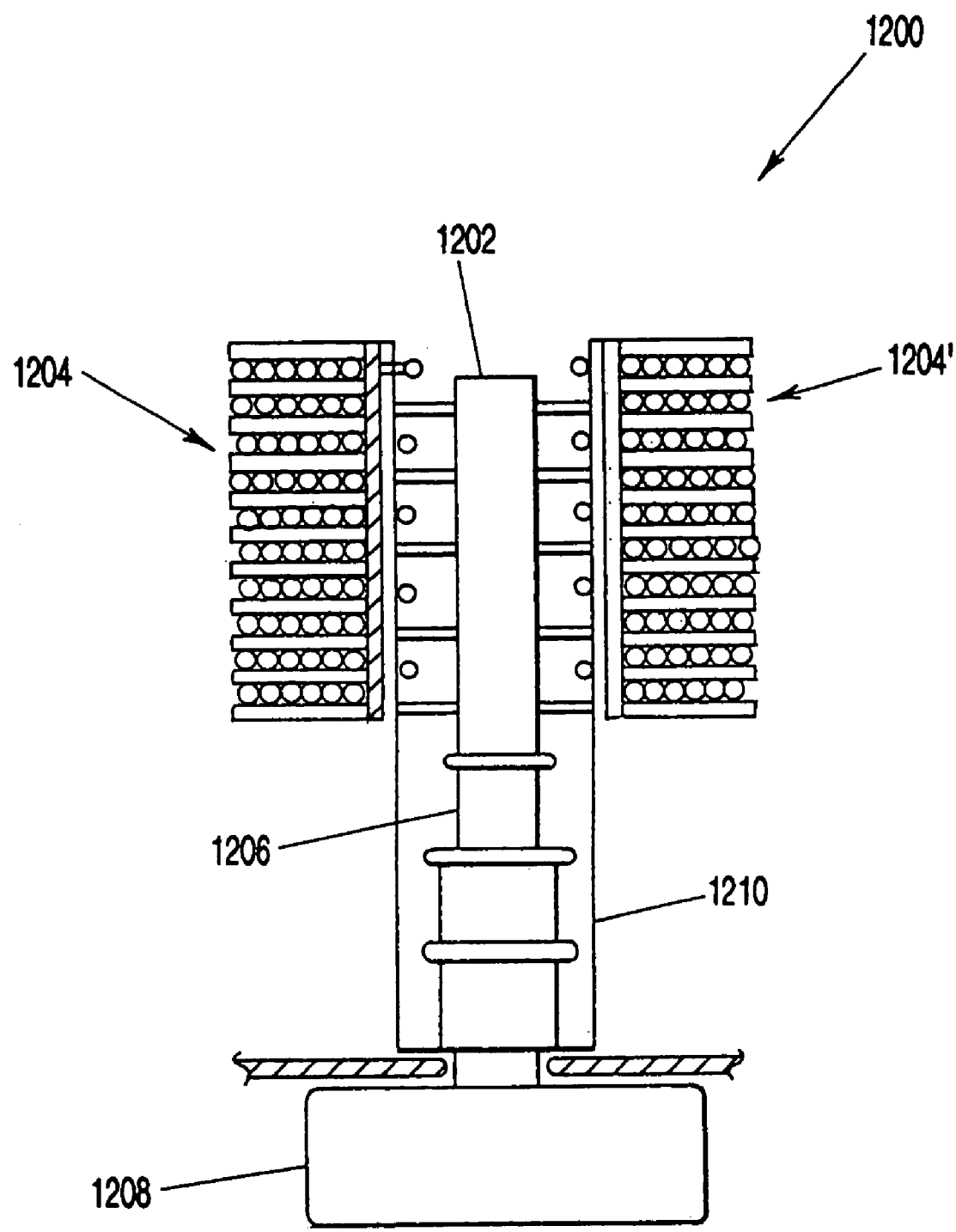
FIG. 18 is a diagrammatic view of a controlled avalanche circuit mechanical assembly according to an embodiment of the present invention.

FIG. 17 illustrates a controlled avalanche, or "pulser," circuit in schematic form. For purpose of illustration, circuit connections are shown as lines or wires. In actual circuits, high speed, impedance-matched mechanical structures such as, but not limited to, coaxial cylinders, strip lines, or wave-guides are used. An actual packaged circuit as represented by the schematic of FIG. 17, therefore, may physically resemble the circuit shown in FIG. 18, a description of this figure follows below.

Referring to FIG. 17, the pulser circuit and $O_2^1\Delta$ plasma generator are illustrated together, since in practice the two units are inseparable and do interact to form a unified circuit. As shown, the pulser circuit sits on top of the DC power supply 1101, which provides the excitation power at a potential which maintains temporally constant, but perhaps spatially graded plasma conditions at or near a value of E/N of approximately 10 Td. A large capacitor 1102 is used to stabilize voltage conditions during a fluctuating current load, and to bypass the avalanche pulses, thus referencing these to ground potential. Typically, the required pump potential will fall between approximately 7 KV and approximately 20 KV, depending on gas density and generator tube length.

The pulse forming network of the circuit consists of four sets of stacked cable Blumlein lines 1111, and are wired so that their potentials add at the output end. A fifth set of cables 1112 form a final Blumlein line whose potential is added onto the top of the first four lines. The first four stacked lines provide the primary pulse train which maintains ionization while the fifth line powers the helium meta-stable generators which are located upstream of the $O_2^1\Delta$ generator plasma tubes, and serve to provide a volume-distributed source of initial pre-ionization.

For the case of a 20 KW class laser, each of the five lines consists of two approximately 50 ohm coaxial cables, such that their switched impedance on the front end is approximately 5 ohms. If the line has been charged to approximately 20 KV, then approximately 4 KA will flow through the thyratron switch 1103. In turn, the four line segment will have an output impedance of approximately 400 ohms, thus generating an approximately 200 amp pulse at approximately −80 KV if the load were matched to the line at 400 ohms. Note, however, that in the absence of ionization, the output voltage doubles to approximately −160 KV at zero current. The fifth line provides approximately 200 amps at approximately −20 KV lying on top of the approximately −80 KV primary output in addition to the DC pump potential (perhaps −10 KV) in the case where both circuits are loaded into their matched impedances: approximately 400 ohms and approximately 100 ohms, respectively.

When impedance-matched, the pulse output is a square wave whose pulse width matches the two-way propagation time through a single cable. For example, approximately 30 nanosecond wide pulses will be produced when the cable lengths (individually) are cut to be approximately 10.6 feet long, where the cable's index of refraction is assumed to be approximately 1.4—the value which is characteristic of a 50 ohm cable.

In order for the Blumlein lines to function as intended, they must be discharged by the thyratron during a time period which is short compared to the line's two-way pulse propagation length. This is accomplished by using an ultra-fast (pre-ionized), low-inductance thyratron 1103 in combination with a METGLAS® saturable magnetic switch core 1113, and by using an impedance-matched current distribution structure. This switch is for simultaneously grounding the front ends of the Blumlein lines to launch pulses, each time the front ends are grounded one pulse is launched. The METGLAS® core may be reset between pulse firings by means of a floating DC bias current winding on the core.

The basic sequence is to pulse-charge all of the cables from a high voltage power supply 1106 through a triggered command charge circuit consisting of a vacuum tube 1107 and an inductor 1108 which transfers the charge in a time period defined by approximately the resonant half period of the reactor's inductance and the cable's net total capacitance. The tube 1107 also prevents the cable's charge from flowing backward, since the resonant transferred voltage is nearly double that of the charging supply. Note that when the positively charged cable Blumlein lines are switched to ground at the input, a negative high voltage pulse is produced at the output.

Both thyratron and vacuum tubes are controllable by electronic circuits, which are schematically represented by boxes 1104 and 1109, respectively, and which are powerable by floating isolation transformers 1105 and 1110, respectively.

The following describes how the outputs of the cable Blumlein lines are distributed to the array of plasma tubes and their meta-stable helium injection pre-ionizing sections, and also the means by which excess energy is discarded to allow rapid fall time. In general output ends of the Blumlein lines are connected serially. Before continuing this description, however, elaboration of a few details is helpful. The last cable comprising the fifth Blumlein line section is shunted across its output through inductor 1115 in order to remove residual charge prior to pulse charging it (otherwise the line would float). Next, a short length 1116 extension has been added to the output of the ionization pulse line in order to delay the main generator tube's excitation with respect to the pre-ionization.

Finally, the entire string of pulse cables are shunted with a second saturable reactor magnetic switch into a large capacitor, which in turn discharges into a resistor 1114, this is also referred to as a snubber circuit. The magnetic switch holds off conduction for a specified time period, then dumps residual energy (which may be bouncing around due to imperfect impedance matches). This allows the applied potentials to fall in direct response to the plasma, thus circumventing an elevated potential to exist beyond its desired point in time. Again, the saturable magnetic switch must be reset between pulses by means applying a DC bias current to the METGLAS® core.

A number of pulsed ground potential connections must be distributed throughout the generator plasma array to enable low inductance current return. These are each passed through blocking capacitors 1124 in order to ground the pulses while blocking the DC potential, above which the pulse network must float.

A single pulse module comprising ten cables, and one thyratron switch can power as many as, for example, but not limited to, 80 plasma tube generators with their meta-stable pre-ionizer sections. In this particular example, each tube-pre-ionizer assembly consists of a BeO or $Al_2O_3$ tube 1122, an anode/input nozzle 1121, an oxygen and helium reservoir 1117 into which all of the oxygen and most of the helium is introduced, a metal tube 1118 into which some helium (and/or optionally argon is introduced), an anode 1123, and an auxiliary electrode (or electrodes) 1125, which is used to jump-start the ionization process and possible to help grade the DC pump potential.

The pre-ionization potential is applied between the metal helium injection tube 1118 and the cathode 1121 to provide the pre-ionization pulses. Note that the main discharge cathode serves as an anode for the pre-ionization pulse (the inside of the helium injector tube forms a hot cathode space charge layer which serves to generate meta-stable helium).

The two pulse output busses, residing for example at about −160 KV open circuit and −180 KV open circuit, respectively, are distributed to the tubes through isolating/ballasting inductors 1119 and 1120, one for each of the two circuits and for each tube.

Finally, the intermediate electrodes 1125 are connected through ballasting inductors 1126 (one for each tube) to the jump-start pulser. This pulser provides upon start-up, only one low impedance pulse at a positive polarity which is opposite from the upstream negative polarity. The two potentials are additive (for example, −180 KV+50 K) over a fraction of the tube's total length, thus facilitating rapid initial breakdown.

Referring again to FIG. 18, referenced above, a controlled avalanche circuit mechanical assembly 1200 is shown. A transmission line 1202 is shown centrally surrounded by cable Blumlein lines 1204, 1204'. A thyatron 1206 is shown centrally connected to the transmission line 1202 and in connection with floating thyatron control electronics 1208. A current return 1210 is also shown.

Figure 19:
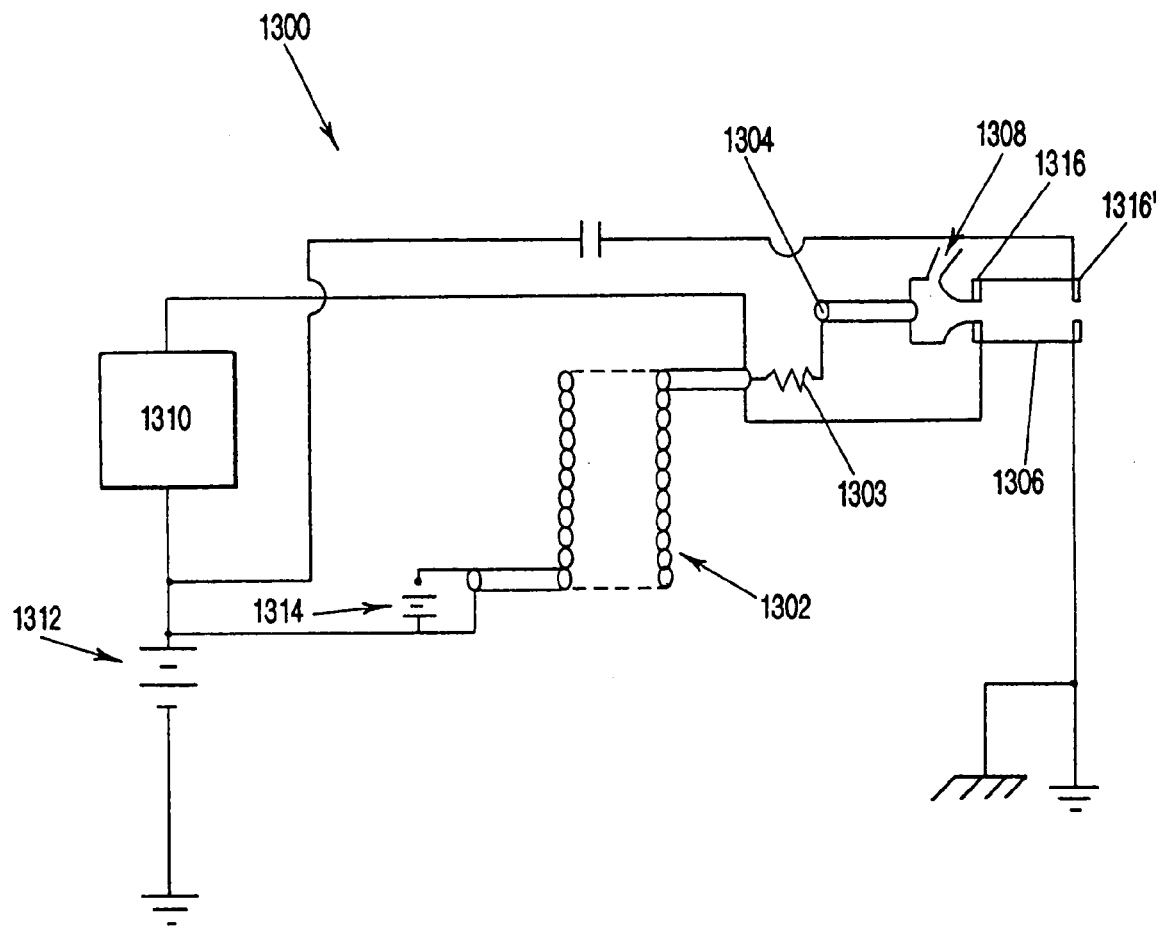
FIG. 19 is a diagrammatic view of a circuit for floating a DC potential on top of a DC jump potential and a pulsed high voltage avalanche ionization potential according to an embodiment of the present invention.

Referring to FIG. 19, an alternative means 1300 of floating a DC potential on top of a DC jump potential and the pulsed high voltage avalanche ionization potential is shown. Compare to the fifth set of cables that form a final Blumlein line whose potential is added onto the top of the first four lines 1012, as shown in FIG. 17. The alternative means 1300 comprises a high voltage blocking inductor 1302, for example, preferably wound from coaxial cable, that is connected through a resistive device 1303 to the helium supply inlet 1304 that feeds a generator tube 1306. An oxygen and/or inert gas supply inlet is also shown 1308. Also shown in FIG. 19 is a high voltage pulser 1310, a DC supply 1312, and a source of DC pre-ionization voltage 1314. Electrodes 1316, 1316' of the generator tube 1306 are shown bounding at the ends, of course, the electrodes may number more than two per tube and be located at a variety of points along the tube.

Longitudinal Beam in Supersonic Throat Arrangement

Figure 20:
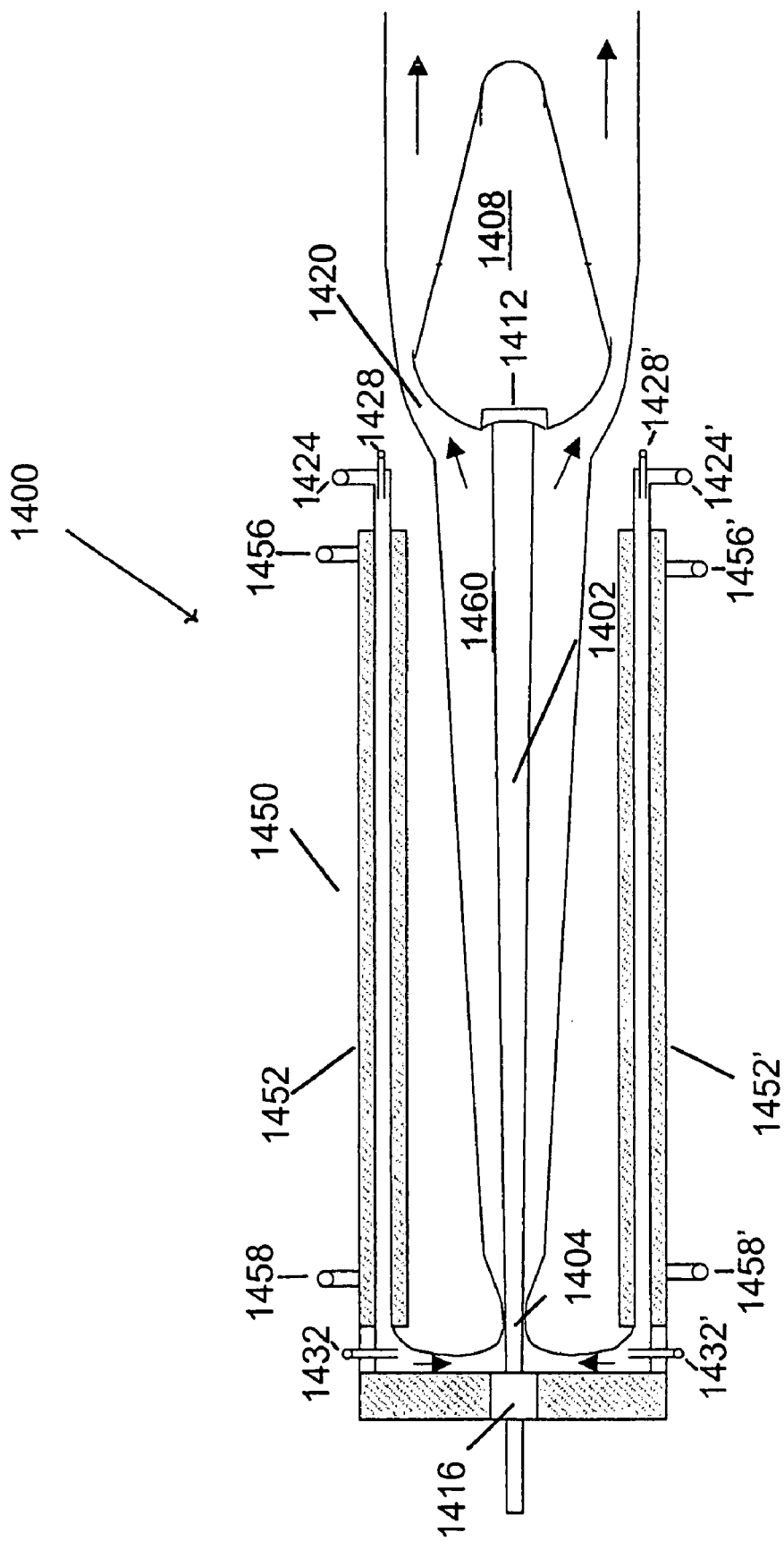
FIG. 20 is a diagrammatic view of an embodiment for producing a beam substantially parallel to the direction of gas flow.

The present invention also includes a laser comprising a gas, a beam produced by the gas and a throat wherein the gas and beam pass through the throat. In one embodiment, the throat comprises a converging region and a diverging region to achieve supersonic flow of gas passing therethrough. A laser according to this gas flow/beam arrangement embodiment 1400 is shown in FIG. 20 (e.g., an axial cross-section through a substantially cylindrical structure). Lasers according to this embodiment are optionally suitable for power outputs of approximately 5 to approximately 20 kW. According to this embodiment, a beam 1402 passes through a gas flow throat 1404. As described in other embodiments herein, this laser 1400 is capable of either closed or open cycle operation and comprises some features of, for example, the laser apparatus shown in FIGS. 15a and 15c. For instance, as shown in FIG. 20, this embodiment comprises at least two oxygen supply ports 1424, 1424', at least two helium supply ports 1428, 1428', at least two iodine supply ports 1432, 1432', an $O_2^1\Delta$ electric generator/heat sink assembly 1450, and a resonator cavity 1460. Of course, embodiments comprising a single supply port for oxygen, a single supply port for helium, and/or a single supply port for iodine are within the scope of the present invention, as are headers and/or other distributors for the same. According to one embodiment, oxygen and iodine are supplied at a ratio of approximately 50 to 1. Adjustments to the oxygen to iodine ratio are useful for controlling gain.

The $O_2^1\Delta$ electric generator/heat sink assembly 1450 of this particular embodiment comprises at least two tubes 1452, 1452'. Each tube is surrounded by a heat sink or heat exchanger, which optionally provides for flow of a coolant or heat exchange fluid (including gas), as indicated by coolant inlets 1456, 1456' and outlets 1458, 1458'. Of course, the inlets may optionally serve as outlets and vice versa. While the tubes shown in FIG. 20 are substantially parallel to the beam, embodiments comprising tubes that are arranged at other angles with respect to the beam are also within the scope of the present invention. An embodiment comprising at least one annular region that provides for carrying oxygen and/or helium gas is also within the scope of the present invention and a heat sink and/or a heat exchanger for use in such an embodiment optionally comprises an annular cross-section. Further while iodine inlets 1432, 1432' are shown in FIG. 20 positioned perpendicular to the beam axis, an inlet or a plurality of inlets are optionally positioned parallel to the beam axis or at any angle to the beam axis. While not limiting, it is preferred that iodine enters and mixes the gas prior to the throat 1404.

Based on the discussion of other embodiments presented herein (e.g., see discussion of FIG. 15), one of ordinary skill in the art would understand that the embodiment shown in FIG. 20 also comprises a power supply and electrodes. Of course for low pressure operation and other types of operation, the invention does not have to rely on this particular apparatus or method of forming metastable helium. Other methods and apparatus for providing seed volume ionization are within the scope of the present invention and known to those of ordinary skill in the art.

The laser beam of the embodiment shown in FIG. 20 is produced in the resonator cavity 1460. Gases in subsonic flow, mixed with iodine, enter the inlet side of the throat 1404. This mixture of gases expands in the supersonic expansion region of the resonator cavity to achieve supersonic flow. In a particular embodiment of the invention, gas leaving the throat comprises a velocity of approximately Mach 2.5 to approximately Mach 3. The gas further optionally comprises a temperature of approximately 112 K or lower and/or experiences a pressure drop of approximately one order of magnitude.

While the arrangement shown in FIG. 20 comprises a single beam 1402 that passes through a single gas flow throat 1404 alternative arrangements comprising a plurality of throats and/or a plurality of beams are within the scope of the present invention. In general, the beam diameter 1402 is substantially matched to the diameter of the throat 1404. In the embodiment shown in FIG. 20, the beam 1402 is bound by two mirrors 1412, 1416. One of the mirrors, for example, but not limited to, the left mirror 1416, comprises a partially reflective surface that allows for partial transmission of the beam 1402. Of course, the other mirror 1412 optionally comprises properties that allow for transmission to form, for example, a dual beam apparatus. Alternatively, the left mirror 1416 does not allow for transmission and the right mirror beam is partially reflective. This embodiment further optionally comprises an unstable resonator, for example, but not limited to, a system wherein at least one mirror comprises an annulus for output of an annular beam.

Figure 21:
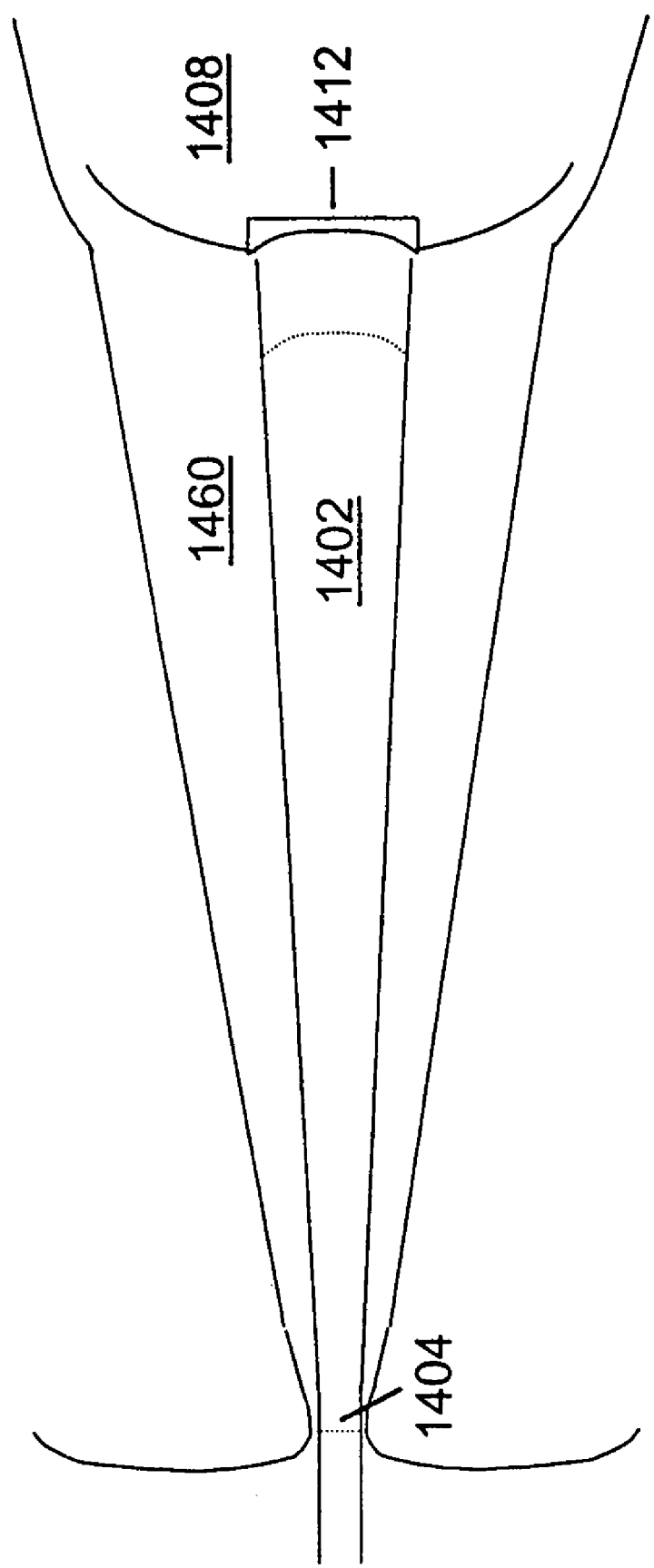
FIG. 21 is a diagrammatic view of a beam of the embodiment shown in FIG. 20.

Referring to FIG. 21, a diagram of a beam 1402 is shown. Note that the beam diameter increases from the throat 1404 to the right mirror 1412. Also note that the right mirror 1412 comprises a concave surface. The surface is concave to account for changes in the phase front (see dotted line near right mirror 1412)—in most instances, the phase front at the throat is substantially flat (see dotted line near throat 1404). Of course, compound elements are optionally used at either end to correct for phase front distortions and/or to focus the beam.

According to one embodiment, the length is sufficient to extract approximately 5% of the energy from the excited gas. The embodiment shown in FIGS. 20 and 21 is generally applicable to any transfer type laser. More specifically, such an beam/cavity arrangement is useful when kinetics allow for the lasing molecule to be recycled many times over the length of the cavity. For example, a transfer molecule (e.g., but not limited to, iodine) may be energized and lased from approximately 10 times to approximately 100 times over the length of the cavity. This allows for gain and, again, is controllable by, for example, adjusting the ratio of lasing molecule to non-lasing molecule(s) in the gas. In one embodiment, the cavity comprises a length from approximately 0.1 to approximately 2 meters.

The throat 1404 of the embodiment shown in FIG. 20 has, for example, characteristics that allow for a particular mass flow rate. Such a throat optionally comprises an upstream converging region and a downstream diverging region. Characteristics of converging, throat and/or diverging regions are useful for providing a particular Mach number, for example, but not limited to, Mach number of approximately 2 to approximately 3. As shown in FIG. 20, the resonator cavity expansion region (from throat 1404 to right mirror 1412) comprises an increasing cross-section. The increasing cross-section helps to account for boundary layer growth, which, in turn, helps to reduce shocking down of the gas in the cavity. While shocking down of the gas in the cavity may be tolerated, in most instances, shockdown occurs in a region removed from the beam path. For example, referring to FIG. 20, shockdown occurs in, or proximate to, a substantially annular region 1420 adjacent to a diffuser structure 1408 that comprises part of a subsonic diffuser. As shown in FIG. 20, the diffuser structure 1408 also optionally comprises the right mirror 1412 or provides an attachment point for such a mirror.

While the above description makes reference to particular values, such as, but not limited to, an E/N value of approximately 180 Td, it is understood to one of ordinary skill in the art that lower E/N values are within the scope of the present invention, for example, approximately 150 Td and below. The above description also makes reference to "plasma" which is used generally to describe a weakly ionized gas, for example, but not limited to, a gas with an electron density between approximately 10 to approximately $10^{15}$ electrons/cm$^3$.

Various embodiments of the present invention are useful for the following areas:

1. Energy and Nuclear Power—cut-up decomissioned reactor vessels, centrifuges, etc.; scabble radioactive layers from cement surfaces; and deep penetration welding, which may be performed robotically in contaminated areas.

2. Marine and Heavy Equipment Industries—deep penetration welding, cutting and drilling; cladding, surface modification or texturing; removal of corrosion and sea debris, such as barnacles, from marine platforms and barges; and removal of coatings and special, rubber-like layers from vessels, such as, but not limited to, submarines, ships, and barges.

3. Civil Engineering—cleaning bridges, tunnels, outdoor storage tanks (inside and out); road texturing; and tunneling, mining, and rock fracturing.

4. Steel Industry—remove scale from steel rolls and steel roll butt-joint welding.

5. NASA/Space Industry—destruction/removal of space debris; meteor deflection from Earth and other objects; rocket propulsion from ground-based laser or from solar-powered, space-based laser (at any altitude above Earth's surface); deep space communications; and space power transmission.

6. Military Applications—Target designators and ground-based (fixed or mobile), airborne, or space-based weapons.

7. Automobile Applications—reducing emissions from automobile exhaust (as well as any other combustion engine).

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A matched impedance controlled avalanche driver circuit for exciting a plasma, said circuit comprising:
    a preionization device for preionizing a gas;
    a pulse forming network charged to a first voltage;
    a transmission line connecting the pulse forming network to at least two electrodes, said transmission line and electrodes for transferring electrical energy to the preionized gas;
    wherein a capacitance of said transmission line is chosen to increase said first voltage to a second voltage sufficiently high enough to ionize the gas to a plasma; and
    wherein an impedance of the plasma matches an impedance of said pulse forming network, thereby enabling said pulse forming network to pump a laser transition in the plasma at a potential below a glow potential of the plasma.

2. The circuit of claim 1 wherein said pulse forming network comprises distributed lines.

3. The circuit of claim 1 wherein said pulse forming network comprises discrete elements.

4. The circuit of claim 1 wherein at least one of said electrodes is shaped to prevent field enhancement.

5. The circuit of claim 1 wherein said transmission line comprises at least one transfer capacitor.

6. The circuit of claim 1 further comprising a switch comprising a spark gap or a thyratron switch.

7. The circuit of claim 6 wherein said switch is low inductance.

8. The circuit of claim 1 wherein said transmission line comprises parallel cables.

9. The circuit of claim 8 wherein said cables are impedance matched to said pulse forming network and the plasma.

10. The circuit of claim 1 further comprising a snubber circuit electrically connected between said electrodes.

11. The circuit of claim 10 wherein said snubber circuit is used to adjust the second voltage, thereby ensuring that the impedance of the plasma substantial exactly matches the impedance of said pulse forming network.

12. The circuit of claim 1 generating at least one pulse comprising an ultra-high narrow voltage transient followed by a lower-voltage flat wave form.

13. The circuit of claim 12 wherein said transient and said flat wave form are independently controllable.

14. The circuit of claim 1 incorporated into a repetitively pulsed gas laser.

15. The circuit of claim 14 wherein a repetition rate of said gas laser is up to approximately 200 pulses per second.

16. The circuit of claim 1 wherein said preionization device comprises a pulsed X-ray source.

17. The circuit of claim 16 further comprising a high voltage pulser to drive said X-ray source.

18. The circuit of claim 16 wherein at least one of said electrodes comprises an X-ray window.

19. The circuit of claim 18 wherein said window comprises beryllium.

20. A controlled avalanche pulser circuit for exciting a plasma, said circuit comprising:
    one or more Blumlein lines for providing a primary pulse train;
    a pre-ionizer connected to at least one injection tube and at least one first electrode;
    an ultra-fast thyratron switch connected between input ends of said Blumlein lines and a power supply;
    at least one second electrode connected to said Blumlein lines; and
    a plurality of ground potential connections connected to said at least one first electrode for providing low inductance current return.

21. The circuit of claim 20 wherein each of said ground potential connections comprise a blocking capacitor.

22. The circuit of claim 20 wherein said pre-ionizer comprises a Blumlein line.

23. The circuit of claim 20 wherein said pre-ionizer comprises a high voltage pulser and at least one high voltage blocking inductor connected to said high voltage pulser and said at least one injection tube.

24. The circuit of claim 20 further comprising a snubber circuit connected to said pre-ionizer.

25. The circuit of claim 20 further comprising one or more auxiliary electrodes.

26. The circuit of claim 20 wherein said Blumlein lines comprise stacked cable Blumlein lines.

27. The circuit of claim 26 wherein output ends of said Blumlein lines are connected serially.

28. The circuit of claim 26 wherein each of said Blumlein lines comprises at least two approximately 50 ohm coaxial cables.

* * * * *